(12) United States Patent
Song et al.

(10) Patent No.: US 8,122,193 B2
(45) Date of Patent: Feb. 21, 2012

(54) STORAGE DEVICE AND USER DEVICE INCLUDING THE SAME

(75) Inventors: Donghyun Song, Hwaseong-si (KR); Chanik Park, Hwaseong-si (KR); Sang Lyul Min, Seoul (KR); Sheayun Lee, Seoul (KR); Taesung Jung, Seoul (KR); Sang-Jin Oh, Suwon-si (KR); Moonwook Oh, Seoul (KR); Jisoo Kim, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 18 days.

(21) Appl. No.: 12/775,767

(22) Filed: May 7, 2010

(65) Prior Publication Data
US 2010/0217927 A1   Aug. 26, 2010

Related U.S. Application Data

(63) Continuation-in-part of application No. 11/230,994, filed on Sep. 20, 2005, now Pat. No. 7,802,054, and a continuation-in-part of application No. 11/673,228, filed on Feb. 9, 2007, now abandoned, and a continuation-in-part of application No. 12/016,737, filed on Jan. 18, 2008, and a continuation-in-part of application No. 12/255,759, filed on Oct. 22, 2008, and a continuation-in-part of application No. 12/347,243, filed on Dec. 31, 2008, and a continuation-in-part of application No. 12/453,589, filed on May 15, 2009, now Pat. No. 8,069,284.

(60) Provisional application No. 61/253,597, filed on Oct. 21, 2009.

(30) Foreign Application Priority Data

| Dec. 21, 2004 | (KR) | 10-2004-0109826 |
| Feb. 4, 2005 | (KR) | 10-2005-0010750 |
| Feb. 20, 2007 | (KR) | P10-2007-0014980 |
| Nov. 6, 2007 | (KR) | 10-2007-0112791 |
| May 22, 2008 | (KR) | 10-2008-0046717 |
| May 8, 2009 | (KR) | 10-2009-0040404 |

(51) Int. Cl.
*G06F 12/00* (2006.01)

(52) U.S. Cl. ........ 711/117; 711/118; 711/144; 711/156; 711/202

(58) Field of Classification Search .................. None
See application file for complete search history.

(56) References Cited

U.S. PATENT DOCUMENTS 5,530,828 A   6/1996   Kaki et al.
(Continued)

FOREIGN PATENT DOCUMENTS
JP   06-131123   5/1994
(Continued)

OTHER PUBLICATIONS

Jim Handy, "The Cache Memory Book," 1998, Academic Press, 2nd edition, pp. 16, 47-48.

*Primary Examiner* — Shawn X Gu
(74) *Attorney, Agent, or Firm* — Volentine & Whitt, PLLC

(57) ABSTRACT

A storage device includes a host interface, a buffer memory, a storage medium, and a controller. The host interface is configured to receive storage data and an invalidation command, where the invalidation command is indicative of invalid data among the storage data received by the host interface. The buffer memory is configured to temporarily store the storage data received by the host interface. The controller is configured to execute a transcribe operation in which the storage data temporarily stored in the buffer memory is selectively stored in the storage medium. Further, the controller is responsive to receipt of the invalidation command to execute a logging process when a memory capacity of the invalid data indicated by the invalidation command is equal to or greater than a reference capacity, and to execute an invalidation process when the memory capacity of the invalid data is less than the reference capacity. The logging process includes logging a location of the invalid data, and the invalidation process includes invalidating the invalid data.

20 Claims, 44 Drawing Sheets

U.S. PATENT DOCUMENTS

| | | |
|---|---|---|
| 5,561,823 A | 10/1996 | Anderson |
| 5,594,926 A | 1/1997 | Chang et al. |
| 5,671,388 A | 9/1997 | Hasbun |
| 5,696,929 A | 12/1997 | Hasbun et al. |
| 5,802,344 A | 9/1998 | Menon et al. |
| 5,809,515 A | 9/1998 | Kaki et al. |
| 5,890,192 A | 3/1999 | Lee et al. |
| 5,907,716 A | 5/1999 | Yoshimura |
| 6,134,610 A | 10/2000 | Chung |
| 6,219,752 B1 | 4/2001 | Sekido |
| 6,233,648 B1 | 5/2001 | Tomita |
| 6,272,589 B1 | 8/2001 | Aoki |
| 6,473,835 B2 | 10/2002 | Luick |
| 6,601,147 B1 | 7/2003 | Bealkowski et al. |
| 6,708,251 B1 | 3/2004 | Boyle et al. |
| 6,728,826 B2 | 4/2004 | Kaki et al. |
| 6,785,767 B2 | 8/2004 | Coulson |
| 6,910,107 B1 | 6/2005 | Boucher |
| 6,985,992 B1 | 1/2006 | Chang et al. |
| 7,039,788 B1 | 5/2006 | Chang et al. |
| 7,113,402 B2 | 9/2006 | Rutledge et al. |
| 7,234,036 B1 | 6/2007 | Chang et al. |
| 2002/0184436 A1 | 12/2002 | Kim et al. |
| 2003/0202383 A1 | 10/2003 | Shiota et al. |
| 2004/0083405 A1 | 4/2004 | Chang et al. |
| 2005/0055531 A1 | 3/2005 | Asami et al. |
| 2006/0136676 A1 | 6/2006 | Park et al. |

FOREIGN PATENT DOCUMENTS

| | | |
|---|---|---|
| JP | 06-301586 A | 10/1994 |
| JP | 2002-269065 | 9/2002 |
| JP | 2003015928 A | 1/2003 |
| JP | 2003044351 A | 2/2003 |
| JP | 2003308234 | 10/2003 |
| JP | 2003-199014 | 11/2003 |
| JP | 2004118989 A | 4/2004 |
| JP | 2005-085011 A | 3/2005 |
| KR | 1990-0003744 | 3/1990 |
| KR | 1020000067341 A | 11/2000 |
| KR | 1020010077401 A | 8/2001 |
| KR | 1020010110073 A | 12/2001 |
| KR | 1020020092487 A | 12/2002 |
| KR | 10-2003-0010987 A | 2/2003 |
| KR | 1020030061948 A | 7/2003 |
| KR | 1020040013854 A | 2/2004 |
| KR | 10-2005-0026330 A | 3/2005 |
| KR | 10-2004-0109826 B1 | 5/2006 |
| KR | 100578143 B1 | 5/2006 |
| TW | 591510 | 6/2004 |
| WO | WO0217084 A2 | 2/2002 |
| WO | WO02058074 A2 | 7/2002 |

Fig. 5

| | BBN | DCN | WSI |
|---|---|---|---|
| File1 | 0 | 3 | V |
| | 1 | 4 | V |
| | 2 | 5 | V |
| File2 | 3 | 8 | V |
| | 4 | 9 | V |
| | 5 | 10 | V |
| File3 | 6 | 18 | V |
| | 7 | 19 | V |
| | 8 | 20 | V |
| | 9 | 21 | V |
| | 10 | 23 | V |
| | ⋮ | | |
| | M-1 | | |
| | M | | |

Fig. 6

| | BBN | DCN | WSI |
|---|---|---|---|
| File1 | 0 | 3 | V |
| | 1 | 4 | V |
| | 2 | 5 | V |
| File2 | 3 | 8 | X |
| | 4 | 9 | X |
| | 5 | 10 | X |
| File3 | 6 | 18 | V |
| | 7 | 19 | V |
| | 8 | 20 | V |
| | 9 | 21 | V |
| | 10 | 23 | V |
| | ⋮ | | |
| | M-1 | | |
| | M | | |

| Logical Address | Physical Address | Invalid Y/N |
|---|---|---|
| 0 | 1 | Y |
| 1 | 2 | Y |
| 2 | 3 | Y |
| 3 | 4 | Y |
| 4 | 5 | N |
| 5 | 6 | N |
| 6 | 7 | N |

Block: { rows 0–3 }

Fig. 21

Structure of a Master Boot Record:

| Address | | Description | Size in bytes |
|---|---|---|---|
| Hex | Dec | | |
| 0000 | 0 | Code Area | max. 446 |
| 01B8 | 440 | Optional Disk signature | 4 |
| 01BC | 444 | Usually Nulls:0x0000 | 2 |
| 01BE | 446 | Table of primary partitions (Four 16-byte entries, IBM Partition Table scheme) | 64 |
| 01FE | 510 | 55h | MBR signature: 0xAA55 | 2 |
| 01FF | 511 | AAh | | |
| MBR, total size:446+64+2 = | | | 512 |

Fig. 22

Layer of one 16-byte partition record

| Offset | Description |
|---|---|
| 0x00 | (1 byte) Status[2] (0x80=bootable, 0x00=non-bootable, other=malformed[3]) |
| 0x01 | (3 byte) Cylinder-head-sector address of the first sector in the partition[4] |
| 0x04 | (1 byte) Partition type[5] |
| 0x05 | (3 byte) Cylinder-head-sector address of the last sector in the partition[5] |
| 0x08 | (4 byte) Logical block address of the first sector in the partition |
| 0x0C | (4 byte) Length of the partition, in sectors |

Fig. 23

| Partition Type ID Value | |
|---|---|
| 0x01 | FAT12 primary partition or logical drive (fewer then 32,680 sectors in the volume) |
| 0x04 | FAT16 partition or logical drive (32,680-65,535 sectors or 16 MB-33 MB) |
| 0x05 | Extended partition |
| 0x06 | BIGDOS FAT16 partition or logical drive (33 MB-4GB) |
| 0x07 | Installable File System (NTFS partition or logical drive) |
| 0x0B | FAT32 partition or logical drive |

| LSN | PSN | Valid or Invalid |
|---|---|---|
| 1 | 1 | Valid |
| 2 | 2 | Valid |
| 3 | 3 | Valid |
| 4 | 4 | Valid |
| ... | ... | ... |
| 10 | 10 | Valid |

↓ Deletion (b)

| LSN | PSN | Valid or Invalid |
|---|---|---|
| 1 | 1 | Invalid |
| 2 | 2 | Invalid |
| 3 | 3 | Invalid |
| 4 | 4 | Invalid |
| ... | ... | ... |
| 10 | 10 | Invalid |

# STORAGE DEVICE AND USER DEVICE INCLUDING THE SAME

CROSS-REFERENCE TO RELATED APPLICATIONS

This is a Continuation-In-Part (CIP) of the following U.S. non-provisional applications: (i) application Ser. No. 11/230,994, filed Sep. 20, 2005; (ii) application Ser. No. 11/673,228, filed Feb. 9, 2007; (iii) application Ser. No. 12/016,737, filed Jan. 18, 2008; (iv) application Ser. No. 12/255,759, filed Oct. 22, 2008; (v) application Ser. No. 12/347,243, filed Dec. 31, 2008, and (vi) application Ser. No. 12/453,589, filed May 15, 2009. U.S. non-provisional application Ser. No. 12/347,243 is a Continuation-In-Part (CIP) of U.S. non-provisional application Ser. No. 11/319,281, filed Dec. 29, 2005, and now U.S. Pat. No. 7,487,303. The disclosures of all of the aforementioned U.S. non-provisional applications are incorporated herein by reference in their entirety.

A claim of priority under 35 U.S.C. §119 is made to: (i) U.S. provisional Application No. 61/253579, filed Oct. 21, 2009; (ii) Korean patent Application No. 10-2009-0040404, filed May 8, 2009; and (iii) any application for which a claim of priority is made in all of the aforementioned U.S. non-provisional applications. The disclosures of all of the aforementioned priority applications are incorporated herein by reference in their entirety.

BACKGROUND

The inventive concepts described herein generally relate to data storage devices, and to user devices including data storage devices.

Data storage devices are utilized in a wide variety of applications, referred to broadly herein as "user devices." Examples of data storage devices include solid state drives (SSD), hard disc drives (HDD) memory cards, USB memories, and so on. Examples of user devices include personal computers, digital cameras, camcorders, cellular phones, MP3 players, portable multimedia players (PMP), personal digital assistants (PDA), and so on.

User systems typically include a host device (CPU, main memory, etc.) and a data storage device. The storage device may or may not be portable and detachable from the host device, and may include non-volatile memory and/or volatile memory. Examples of volatile memory include DRAM and SRAM, and examples of nonvolatile memory EEPROM, FRAM, PRAM, MRAM and flash memory.

Conventional memory systems such as hard disks and floppy disk drives are not as rugged or power efficient as flash memory because they have moving parts that can be easily damaged. As a result, some conventional computer systems are replacing hard disk drives and floppy drives with solid state drives (SSD).

Replacing a conventional disk drive with an SSD is not entirely straightforward. One reason is because data stored in a conventional disk drive can be overwritten in its current location, but data stored in a flash memory, for example, of the SSD cannot be overwritten without first erasing an entire block of data. In other words, conventional disk drives have "write in place" capability, whereas flash memory does not. As a result, when a flash memory is required to coordinate with a host system that uses the memory access conventions of a conventional disk drive, the flash memory typically uses a flash translation layer (FTL), which is a driver that reconciles a logical address space used by the operating system with a physical address space used by the flash memory.

The flash translation layer generally performs at least three functions. First, it divides the flash memory into pages that can be accessed by the host system. Second, it manages data stored in the flash memory so that the flash memory appears to have write in place capability, when in reality, new data is written to erased locations of the flash memory. Finally, the flash translation layer manages the flash memory so that erased locations are available for storing new data.

Managing the flash memory involves various operations. For example, whenever a logical address is overwritten, a page of data stored at a corresponding physical address is invalidated and new page of data is stored at a new physical address of the flash memory. Whenever a sufficient number of pages in the flash memory are invalidated, the FTL performs a "merge" operation whereby "valid" pages are transferred from source blocks containing invalid pages to destination blocks with available space. The purpose of the merge operation is to free up memory space occupied by invalidated blocks by erasing the source blocks.

The flash memory comprises a plurality memory cells arranged in a memory cell array. The memory cell array is divided into a plurality of blocks, and each of the blocks is divided into a plurality of pages. The flash memory can be erased a block at a time, and it can be programmed or read a page at a time. However, once programmed, a page must be erased before it can be programmed again.

Within a flash memory, each block is designated by a physical block address, or "physical block number" (PBN) and each page is designated by a physical page address, or "physical page number" (PPN). However, the host system accesses each block by a logical block address, or "logical block number" (LBN) and each page by a logical page address, or "logical page number" (LPN). Accordingly, to coordinate the host system with the flash memory, the FTL maintains a mapping between the logical block and page addresses and corresponding physical block and page addresses. Then, when the host system sends a logical block and page address to the flash memory, the FTL translates the logical block and page address into a physical block and page address.

One problem with conventional merge operations is that the host system can not determine when a merge operation occurs, since merge operations are determined by operations of the FTL which are transparent to the host system. Since FTL does not store information about a file system, such as a file allocation table, the FTL can not determine whether the host system considers a page invalid. Accordingly, in some instances, a file system for the host system may mark certain pages for deletion without the awareness of the FTL. As a result, a merge operation performed by the FTL may copy pages that are invalid from the host system's point of view. As a result, the merge operation takes more time than it should, thus degrading the performance of the memory system.

According to one of many aspects of the inventive concepts, a storage device is provided which includes a host interface, a buffer memory, a storage medium, and a controller. The host interface is configured to receive storage data and an invalidation command, where the invalidation command is indicative of invalid data among the storage data received by the host interface. The buffer memory is configured to temporarily store the storage data received by the host interface. The controller is configured to execute a transcribe operation in which the storage data temporarily stored in the buffer memory is selectively stored in the storage medium. Further, the controller is responsive to receipt of the invalidation command to execute a logging process when a memory capacity of the invalid data indicated by the invalidation command is equal to or greater than a reference capacity, and to execute an invalidation process when the memory capacity of the invalid data is less than the reference capacity. The logging process includes logging a location of the invalid data, and the invalidation process includes invalidating the invalid data.

According to another of many aspects of the inventive concepts, a memory system is provided which includes a host device and a storage device. The host device includes a processor and a main memory, and is configured to transmit storage data and to transmit an Invalidity Command, where the invalidation command is indicative of invalid data among transmitted storage data. The storage device is operatively connected to the host device, and includes a buffer memory configured to temporarily store the storage data transmitted by the host, a storage medium, and a controller configured to execute a transcribe operation in which the storage data temporarily stored in the buffer memory is selectively stored in the storage medium. Further, the controller is responsive to the invalidation command to execute a logging process when a memory capacity of the invalid data indicated by the invalidation command is equal to or greater than a reference capacity, and to execute an invalidation process when the memory capacity of the invalid data is less than the reference capacity. The logging process includes logging a location of the invalid data, and the invalidation process comprises invalidating the invalid data.

According to yet another of many aspects of the inventive concepts, a method of controlling a storage device is provided, where the storage device includes a host interface, a buffer memory, a storage medium, and a controller. The method includes receiving storage data and an invalidation command via the host interface, where the invalidation command is indicative of invalid data among storage data received by the host interface. The method further includes temporarily storing the storage data in the buffer memory, executing a transcribe operation in which the storage data temporarily stored in the buffer memory is selectively stored in the storage medium, executing a logging process in response to the invalidation command when a memory capacity of the invalid data indicated by the invalidation command is equal to or greater than a reference capacity, and executing an invalidation process in response to the invalidation command when the memory capacity of the invalid data is less than the reference capacity. The logging process includes logging a location of the invalid data, and the invalidation process includes invalidating the invalid data.

BRIEF DESCRIPTION OF THE DRAWINGS

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings:

FIGS. 5 and 6 are diagrams showing a mapping table of a storage system in accordance with one or more embodiments of the inventive concepts;

FIG. 21 is a schematic diagram illustrating the structure of a Master Boot Record (MBR);

FIG. 22 is a schematic diagram illustrating a partition record contained in the MBR of FIG. 21;

FIG. 23 is a table illustrating partition types and corresponding ID values;

FIG. 35 illustrates a block diagram of a method in which mapping data corresponding to data to be deleted is invalidated during a data delete operation according to one or more embodiments of the inventive concepts;

DETAILED DESCRIPTION OF THE EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Various embodiments of user devices and storage devices which execute invalidation and related operations will be described below in detail.

Embodiments in accordance with one or more of the inventive concepts will be now be described with reference to FIGS. 1-3 in which a merge operation is executed through utilization of file system information.

Figure 1:
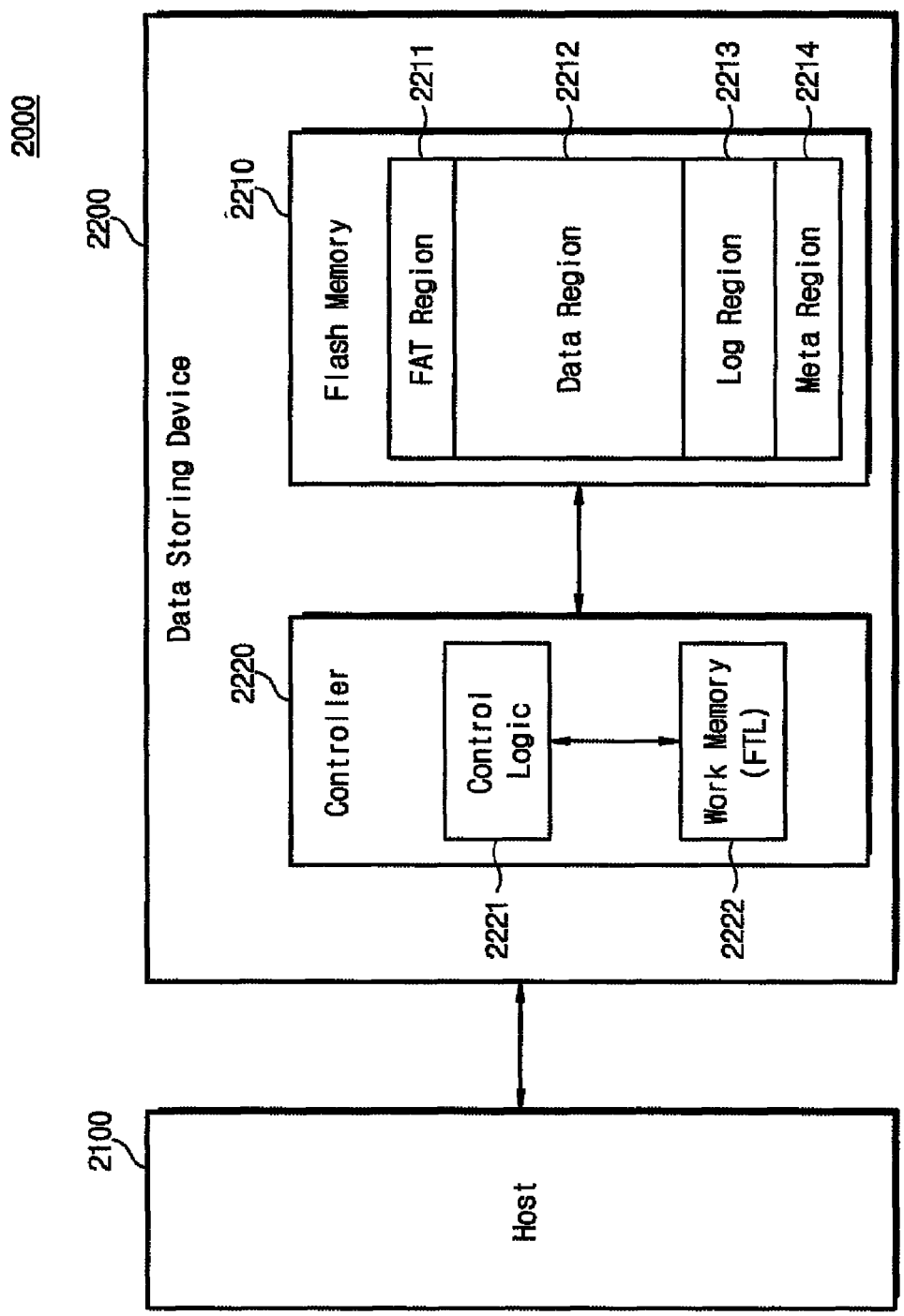
FIG. 1 is a block diagram schematically showing a data storage device in accordance with one or more embodiments of the inventive concepts.

FIG. 1 is a block diagram of an electronic device 2000 according to one embodiment of the invention. Referring to FIG. 1, electronic device 2000 includes a host system 2100 and a memory system 2200. Memory system 2200 comprises a flash memory 2210 and a controller 2220 for interfacing between flash memory 2210 and host system 2100.

Flash memory 2210 comprises a plurality of memory cells arranged in a memory cell array. The memory cell array is divided into a plurality of blocks, and each block is divided into a plurality of pages. Each page comprises a plurality of memory cells sharing a common wordline. Flash memory 2210 is erased a block at a time, and read or programmed a page at a time. However, pages of flash memory 2210 can only be programmed when in an erased state. In other words, flash memory 2210 does not have "write in place" capability. Typically, flash memory 2210 comprises a NAND flash memory.

Host system 2100 accesses memory system 2200 as if it were a conventional hard disk with write in place capability. Since flash memory 2210 does not have write in place capability, controller 2220 comprises a flash translation layer (FTL), which gives host system 2100 the appearance of write in place capability while actually programming data to different pages of flash memory 2210.

Flash memory 2210 comprises a file allocation table (FAT) region 2211 storing a file allocation table, a data region 2212, a log region 2213, and a meta region 2214.

Log region 2213 comprises a plurality of log blocks 2213 corresponding to a plurality of respective data blocks in data region 2212. Accordingly, when host system 2100 initiates a program operation for a data block in data region 2212, data for the program operation is programmed in a corresponding log block of log region 2213.

Where a data block in data region 2212 does not have a corresponding log block in log region 2213, or where there is no empty page in a log block in log region 2213, or where a host makes a merge request, a merge operation is performed. In the merge operation, valid pages of data blocks and corresponding log blocks are copied to new data and log blocks. Once the merge operation is performed, mapping information for logical addresses and physical addresses of flash memory 2210 are stored in meta region 2214.

Figure 4:
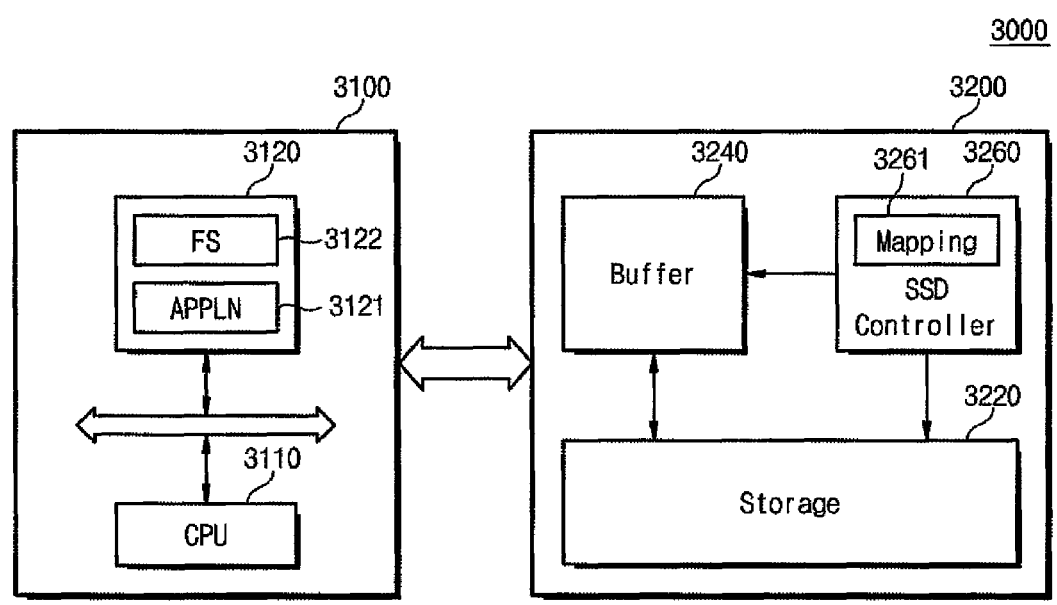
FIG. 4 is a block diagram illustrating a computing system including a storage system in accordance with one or more embodiments of the inventive concepts.

Controller 2220 is configured to control memory system 2200 when host system 2100 performs a memory access operation. As shown in FIG. 4, controller 2220 comprises a control logic circuit 2221 and a working memory 2222. The FTL is stored in working memory 2222. When host system 2100 initiates a memory access operation, control logic circuit 2221 controls the FTL.

Figure 2:
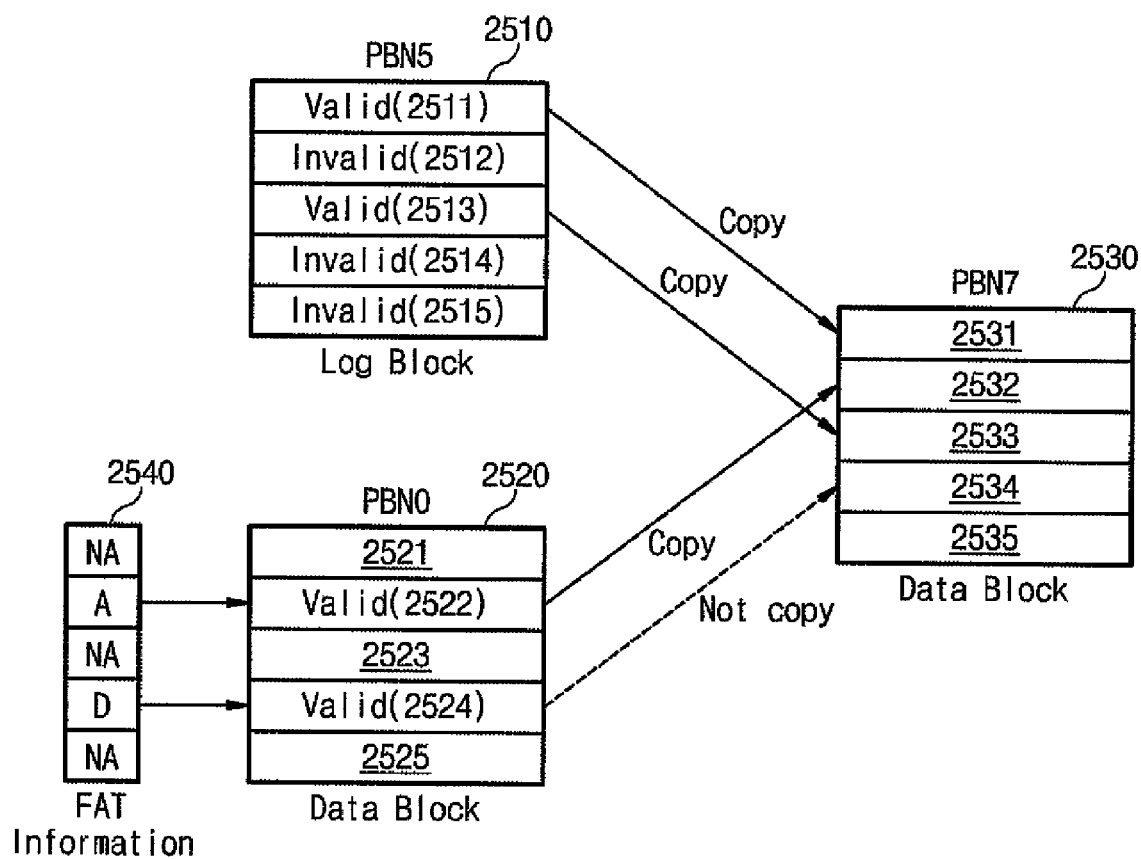
FIG. 2 is a concept diagram illustrating a method of merging in a data storage device in accordance with one or more embodiments of the inventive concepts.

FIG. 2 is a block diagram illustrating a method of performing a merge operation in memory system 2200 according to an embodiment of the inventive concepts. Referring to FIG. 2, valid pages 2511 and 2513 of a log block 2510 and a valid page 2522 of a data block 2520 are copied to a new data block 2530. Pages 2511 and 2513 are respectively copied to pages 2531 and 2533 of data block 2530, and page 2522 is copied to a page 2532 of data block 2530. A valid page 2524 in data block 2520 is not copied to data block 2530 based on FAT information 2540 stored in FAT region 2211.

FAT information 2540 indicates whether pages of data in data block 2520 have been allocated by host system 2100 or whether the pages have been marked for deletion. For instance, pages 2521, 2523, and 2525 in data block 2520 do not store any data, and therefore they are marked as Not Allocated (NA) in FAT information 2540. On the other hand, page 2522 stores valid data, so it is marked as allocated (A). Page 2524, however, stores valid data, but it is regarded by the host system as a deleted page, and therefore it is marked as Deleted (D). Since the host system regards page 2524 as deleted, page 2524 is not copied to block PBN7 in a merge operation.

Figure 3:
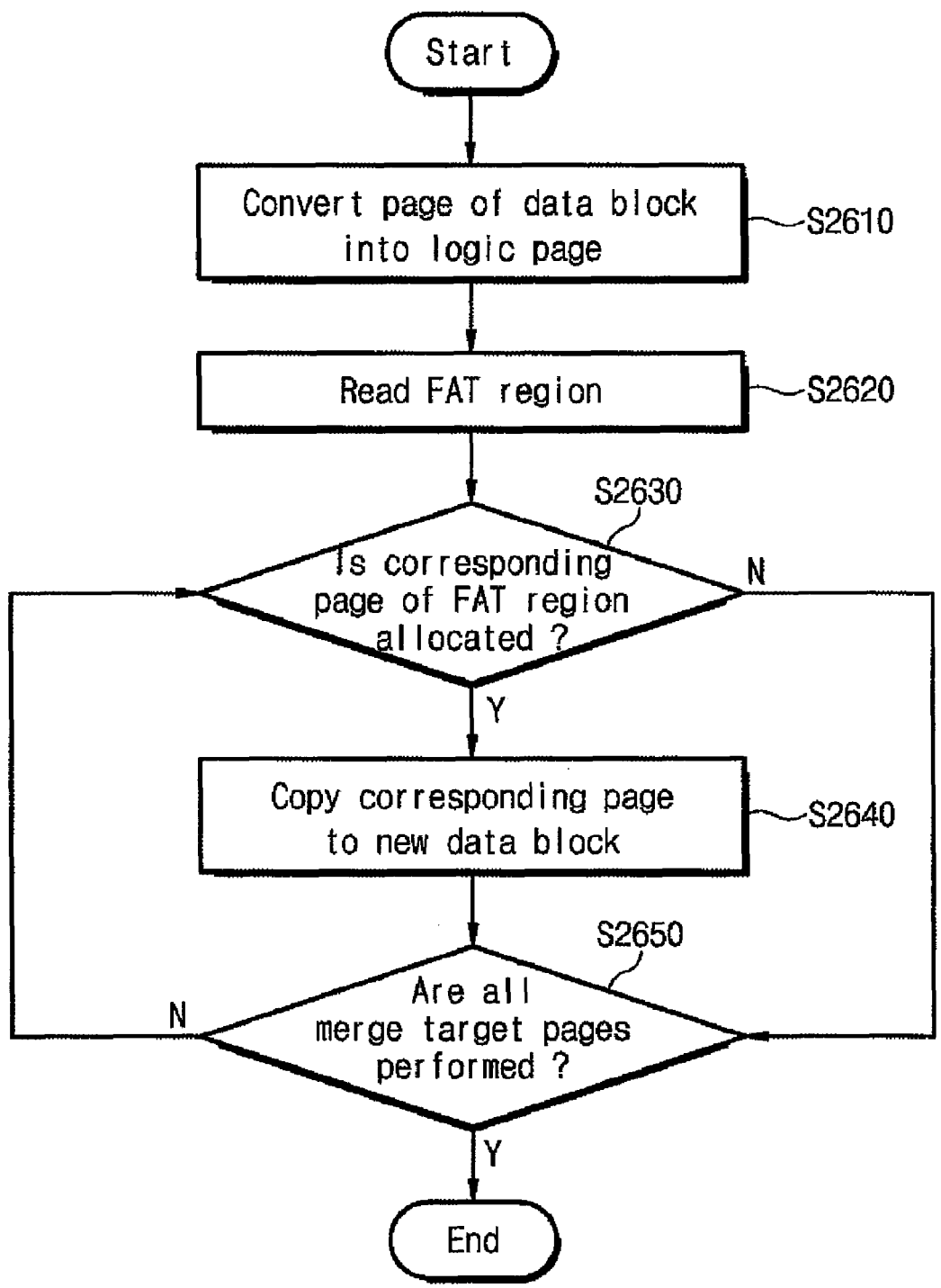
FIG. 3 is flowchart illustrating a selective merge method of a data storage device in accordance with one or more embodiments of the inventive concepts.

FIG. 3 is flowchart illustrating a method of performing a merge operation according to an embodiment of the inventive concepts. The method is described in relation to the system illustrated in FIGS. 1 and 2. In the following description, exemplary method steps are denoted by parentheses (SXXXX) to distinguish them from exemplary system elements, such as those shown in FIG. 3.

Referring to FIG. 3, the method comprises converting a physical page of data block 2530 into a logical page (S2610), or in other words, associating an appropriate logical address used by host system 2100 with data block 2520. The method further comprises reading FAT information 2540 stored in FAT region 2211 using the FTL (S2620). The method further comprises determining whether a page in data block 2520 corresponding to the logical page in data block 2530 is valid and determining whether the page in data block 2520 is allocated according to FAT information 2540 (S2640). Where the page in data block 2520 is a not allocated or it is marked for deletion in FAT information 2540, the page is not copied to data block 2530. In contrast, where the page in data block 2520 is valid and allocated according to FAT information 2540, the data block is copied to data block 2530 (S2640). After determining whether the page in data block 2520 is valid or allocated, the method determines whether all pages in data block 2520 have been checked by step S2630 (S650). Where all of the pages in data block 2520 have been checked, the method terminates. Otherwise, steps S2630, S2640, and S2650 are repeated.

The method illustrated in FIG. 3 prevents data that has been marked for deletion by the host system from being copied to another memory block in a merge operation. As a result, the time required to perform the merge operation is reduced, and the overall efficiency of the memory system improves.

For example, referring to FIG. 2, assume that the number of valid/allocated pages in log block 2510 is "x", the number of valid/deleted pages is "y", and the time required to copy one page is "z". The total time required to perform a merge operation where the valid/deleted pages are copied is therefore (x+y)*z. However, by not copying the valid/deleted pages, the time to perform a merge operation is reduced by y*z.

In addition, the user device 2000 shown in FIG. 1 may perform an invalidation operation using a later-described logging scheme (described later in connection with FIGS. 43-47). That is, the user device 2000 may apply a logging scheme by which a position of an area to be deleted is recorded when the size of data to be deleted exceeds a reference size. On the other hand, the user device 200 may directly invalidate data to be deleted when the size of the data does not exceed a reference size. Moreover, as describe later (in connection with FIG. 47), the user device 2000 may perform an invalidation operation depending on whether general data is deleted or security data is deleted.

Embodiments in accordance with one or more of the inventive concepts will be now be described with reference to FIGS. 4-11 in which the user device executes invalidity of a buffer memory.

FIG. 4 is a block diagram illustrating a user device 3000 in accordance with some embodiments of the inventive concepts. The user device 3000 includes a host 3100 and a storage device 3200. The storage device 3200 may include, for example, a storage device coupled to the host 3100 using a standardized interface, such as PATA, SCSI, ESDI, PCI-Express, SATA, wired USB, wireless USB and/or IDE interfaces. It will be appreciated that other types of interfaces, including nonstandard interfaces, may be used to couple the host 3100 and the storage device 3200. The storage device 3200 may include memory integrated with the host 3100.

The host 3100 includes a central processing unit (CPU) 3110 and a memory 3120. The memory 3120 may include a main memory of the host 3100. An application program 3121 and a file system 3122 are embodied in the memory 3120. The file system 3122 may include one or more file systems having a file allocation table (FAT) or other file system.

The host 3100 outputs an Invalidity Command to the storage device 3200 when all or some of the data of a file processed by the application program 3121 is to be deleted. The host 3100 may, for example, transmit the Invalidity Command accompanied by information relating to an address and/or size of the data to be deleted to the storage device 3200.

A FAT file system may include a master boot record (MBR), a partition boot record (PBR), first and second file allocation tables (primary FAT, copy FAT) and a root directory. The data stored or to be stored in the storage device 3200 can, for example, be identified using two items of information, such as a file name including the data and a path of a directory tree for reaching a place where the file is stored. Each entry of a directory stores information, such as a length of file (e.g., 32 bytes long), a file name, an extension name, a file property byte, a last modification date and time, a file size and a connection of a start-up cluster.

A predetermined character may be used as a first character of a file name to indicate a deleted file. For example, a hexadecimal number byte code E5h may be assigned to the first character of the file name for a deleted file to serve as a tag for indicating that the file is deleted. When a file is deleted, the CPU 110 may assign a predetermined character as the first character of the file name of the deleted file and also output an Invalidity Command and/or other invalidity information corresponding to the deleted file to the storage device 3200.

Still referring to FIG. 4, the storage device 3200 includes a storage medium 3220, a buffer memory 3240 and a SSD controller 3260. The storage device 3200 prevents writing of data stored in the buffer memory 3240 to the storage medium 3220 when the data of a file is considered deleted at a higher level of the storage device 3200 and an invalidity indicator has been input to the storage device 3200. The invalidity indicator may include the Invalidity Command, along with information about an address and a size of the deleted data.

The storage medium 3220 may store all types of data, such as text, images, music and programs. The storage medium 3220 may be a nonvolatile memory, such as a magnetic disk and/or a flash memory. However, it will be understood that the storage medium 3220 is not limited to nonvolatile memory.

The buffer memory 3240 is used to buffer data transfer between the host 3100 and storage medium 3220. The buffer memory 3240 may include high speed volatile memory, such as dynamic random access memory (DRAM) and/or static random access memory (SRAM), and/or nonvolatile memory, such as magnetoresistive random access memory (MRAM), parameter random access memory (PRAM), ferroelectric random access memory (FRAM), NAND flash memory and/or NOR flash memory.

The buffer memory 3240 serves as a write buffer. For example, the buffer memory 3240 may temporarily store data to be written in the storage medium 3220 responsive to a request of the host 3100. The write buffer function of the buffer memory 3240 can be selectively used. Occasionally, in a "write bypass" operation, data transferred from the host system may be directly transferred to the storage medium 3220 without being stored in the buffer memory 3240. The buffer memory 3240 may also work as a read buffer. For example, the buffer memory 3240 may temporarily store data read from the storage medium 3220. Although FIG. 4 shows only one buffer memory, two or more buffer memories can be provided. In such embodiments, each buffer memory may be used exclusively as a write buffer or read buffer, or may serve as a write and read buffer.

The SSD controller 3260 controls the storage medium 3220 and the buffer memory 3240. When a read command is input from the host 3100, the SSD controller 3260 controls the storage medium 3220 to cause transfer of data stored in the storage medium 3220 directly to the host 3100 or to cause transfer of data stored in the storage medium 3220 to the host 3100 via the buffer memory 3240. When a write command is input from the host 3100, the SSD controller 3260 temporarily stores data related to the write command in the buffer memory 3240. All or part of the data stored in the buffer memory 3240 is transferred to the storage medium 3220 when the buffer memory 3240 lacks room for storing additional data or when the storage device 3200 is idle. The storage device 3200 may be considered idle when no requests have been received from the host 3100 within a predetermined time.

The SSD controller 3260 holds address mapping information for the storage medium 3220 and the buffer memory 3240 and a mapping table 3261 for storing write state information representing validity/invalidity of stored data. The write state information is updated by invalidity information (e.g., an indicator) provided from an external device. The SSD controller 3260 controls the storage medium 3220 and the buffer memory 3240 to write all or part of data stored in the buffer memory 3240 to the storage medium 3220 based on the write state information in the mapping table 3261. In some embodiments of the inventive concepts, the storage medium 3220 and the buffer memory 3240 may be embodied using a flash memory.

As described above, the storage device 3200 of the illustrated embodiments of the inventive concepts determines whether or not to transfer all or part of data stored in the buffer memory 3240 to the storage medium 3220 by referring to the write state information. That is, the storage device 3200 of the present embodiment receives the invalidity or other information representing that data stored in the buffer memory 3240 is invalid data from an external source device, such as the host 3100. In response to the invalidity or other invalidity indicator, the storage device 3200 prevents writing of invalid data to the storage medium 3220 from the buffer memory 3240. In other words, the storage device 3200 assigns a tag representing invalidity of data stored in the buffer memory 3240 and selectively transfers data stored in the buffer memory 3240 to the storage medium 3220 based on the assigned tag. Accordingly, a write performance of the storage device 3200 may be improved, which can reduce shortening of the lifetime of the storage device 3200 caused by unnecessary write operations. Furthermore, power consumed by unnecessary write operations may be reduced.

FIGS. 5 and 6 are diagrams showing exemplary mapping tables which may be used by the SSD controller 3260 of FIG. 4 according to some embodiments of the inventive concepts. In FIGS. 5 and 6, "BBN" represents a block number of the buffer memory 3240, "DCN" represents a cluster number of the storage medium 3220, and "WSI" represents the write state information indicating whether the data stored in the buffer memory 3240 is a valid or invalid. In the illustrated embodiments, it is assumed that the block size of the buffer memory 3240 is identical to a size of a cluster having a plurality of sectors. However, the storage medium 3220 need not be limited to this assumption. For example, an allocation unit of the storage medium 3220 can correspond to a sector of a magnetic disc, or a page, sector or block of flash memory. In the FIGS. 5 and 6, invalid data is indicated by an "X" and valid data is indicated by a "V".

In FIG. 5, it is also assumed that data sets FILE1, FILE2, FILE3 corresponding to three files is stored in the buffer memory 3240 as valid data. The data sets FILE1, FILE2, FILE3 may not be stored in the storage medium 3220 yet. The stored file data sets FILE1, FILE2, FILE3 are transferred to the storage medium 3220 when the buffer memory 3240 lacks room for storing new data or when the storage medium 3220 becomes idle, as described above. The SSD controller 3260 updates the write state information of the file data sets FILE1, FILE2, FILE3 stored in the buffer memory 3240 according to invalidity information transferred from the host 3100. For example, the file data set FILE2 is deleted in the host 3100 and the host 3100 transmits Invalidity Command invalidity information for the file data set FILE2 to the SSD controller 3260, the Invalidity Command or invalidity information indicating that the file data set FILE2 has been deleted at the host 3100. When the SSD controller 3260 receives the invalidity information for the file data set FILE2, the SSD controller 3260 changes the write state information WSI of the file data set FILE2 to "X" to indicate that the file data set FILE2 is invalid.

Figure 7:
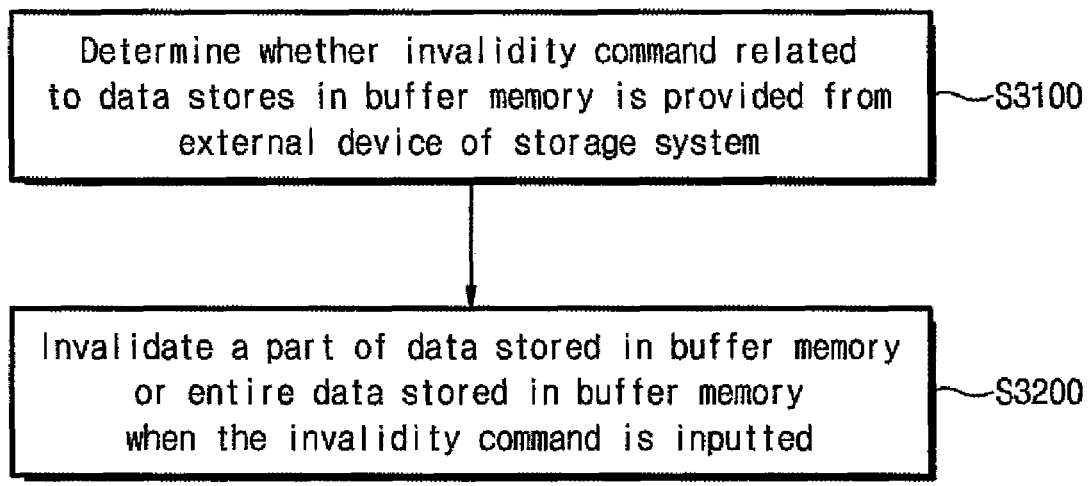
FIG. 7 is a flowchart illustrating exemplary operations for managing data stored in a storage system of a computing system in accordance with one or more embodiments of the inventive concepts.

FIG. 7 is a flowchart illustrating exemplary operations for managing data stored in a storage system in a computing system in accordance with some embodiments of the inventive concepts. As mentioned above, a storage device 3200 includes the storage medium 3220 for storing data and the buffer memory 3240 for temporally storing data to be written to the storage medium 3220. As shown in FIG. 7, in a step S3100, it is determined whether Invalidity Command or other invalidity information is provided to the storage device 3200. In a step S3200, all or part of the corresponding data temporarily stored in the buffer memory 3240 is marked invalid in response to the Invalidity Command. After invalidity, the invalid data is not written to the storage medium 3220.

Figure 8:
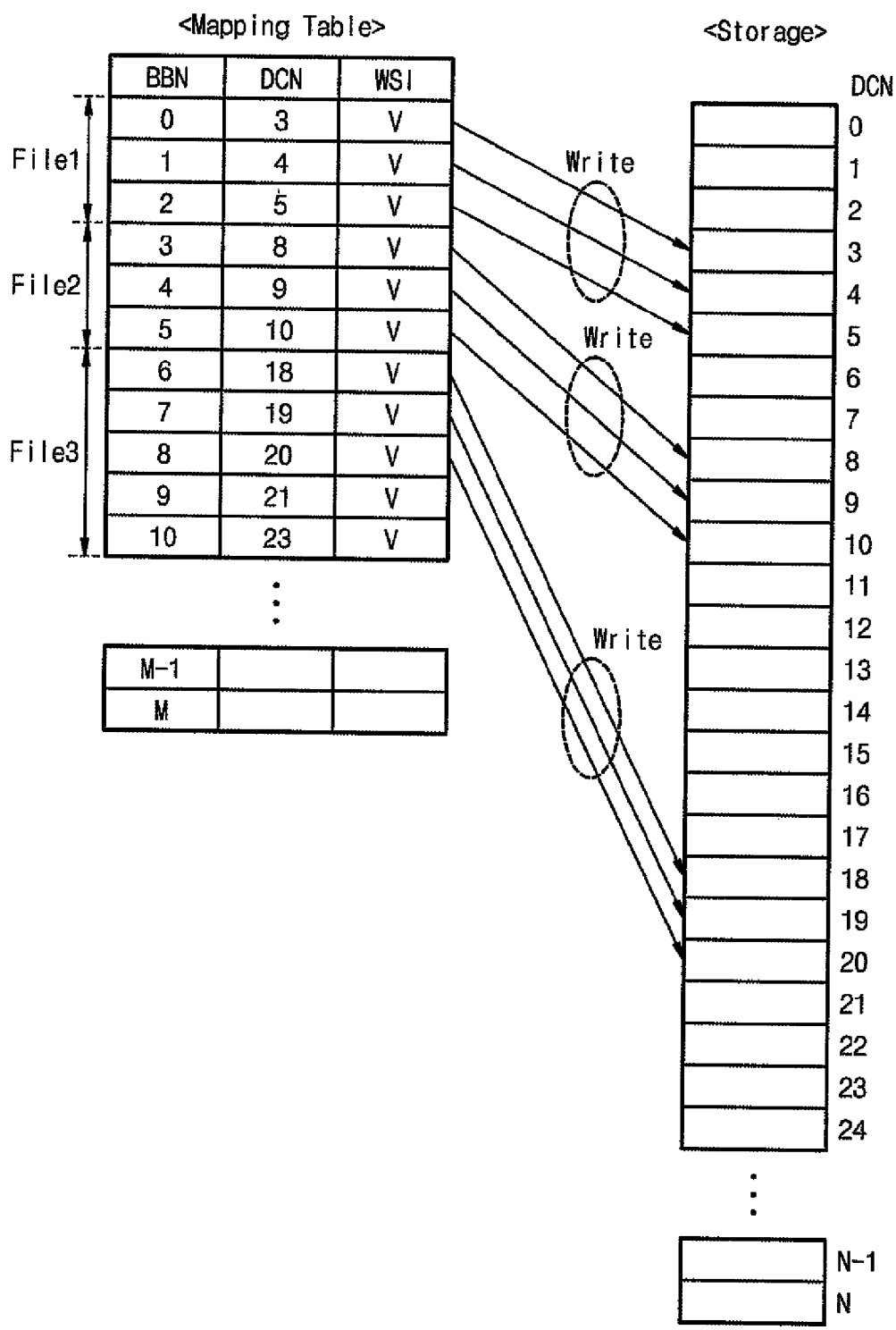
FIGS. 8, 9, and 10 are mapping diagrams illustrating exemplary write operations based on invalidity information for data stored in a buffer memory in a storage system of a computing system in accordance with one or more embodiments of the inventive concepts.
Figure 9:
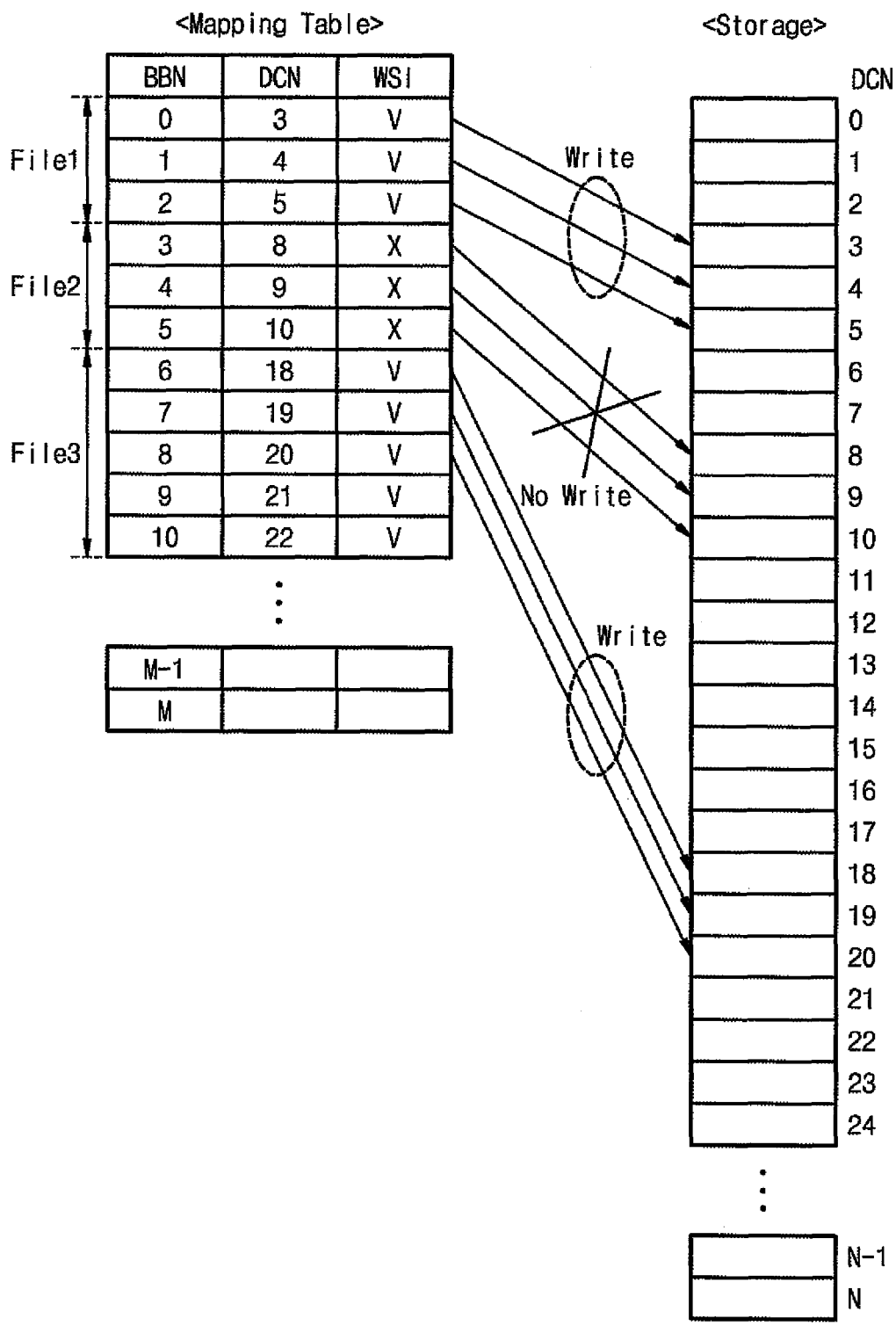
Figure 10:
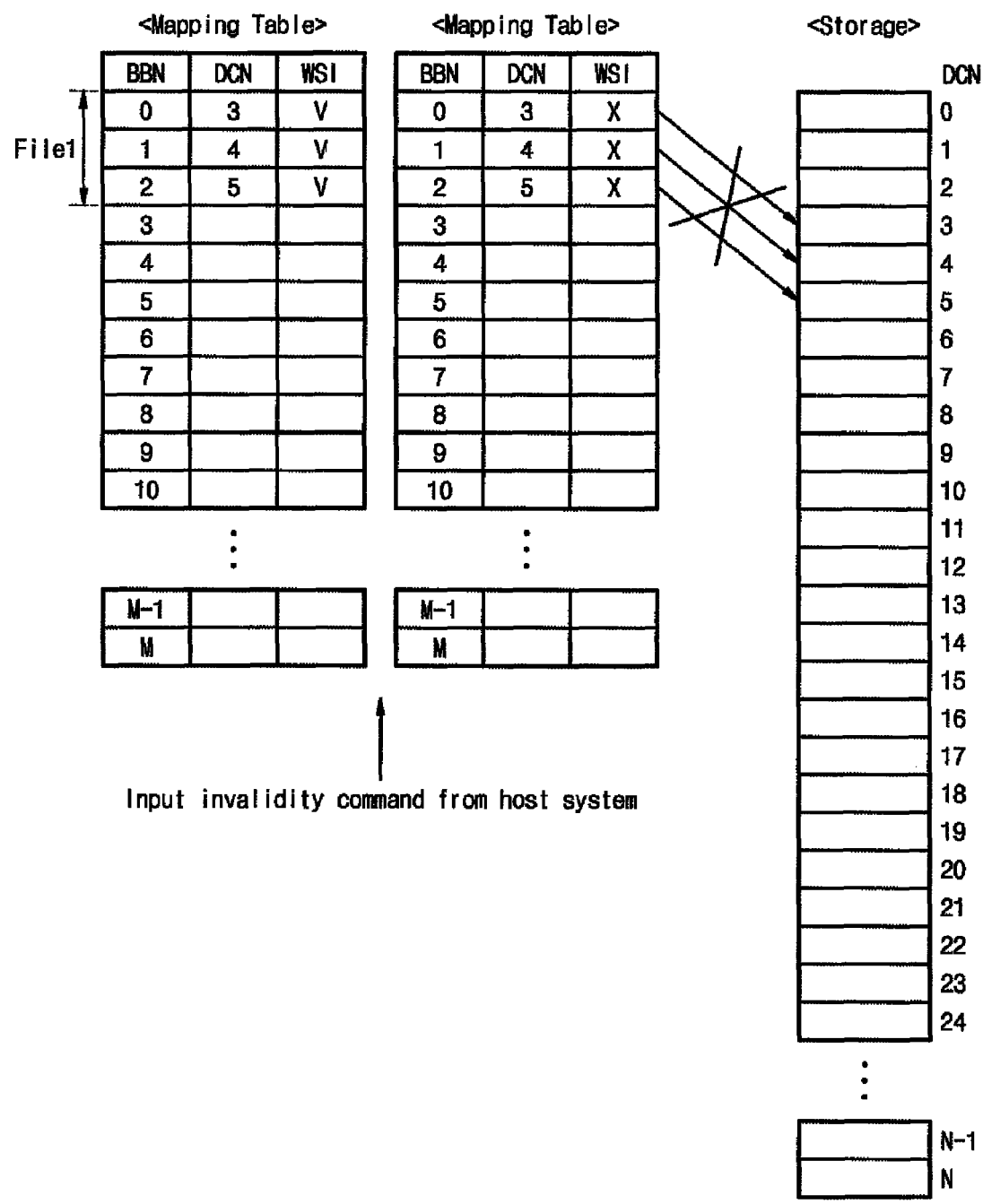

FIGS. 8, 9 and 10 are diagrams illustrating exemplary data management operations in accordance with further embodiments of the inventive concepts. As described above, the SSD controller 3260 of the storage device 3200 transfers data stored in the buffer memory 3240 to the storage medium 3220 by referring to the mapping table 3261. Referring to FIG. 8, it is assumed that there are three file data sets FILE1, FILE2, FILE3 stored in the buffer memory 3240 as valid data. The SSD controller 3260 of the storage device 3200 determines which data stored the buffer memory 3240 is invalid based on the write state information WSI in the mapping table 3261 that corresponds to the stored file data sets FILE1, FILE2, FILE3. As shown in FIG. 8, the SSD controller 3260 controls the buffer memory 3240 and the storage medium 3220 to transfer the file data sets FILE1, FILE2, FILE3 from the buffer memory 3240 to corresponding locations in the storage medium 3220, as all of the file data sets FILE1 to FILE3 are tagged as being valid by the mapping table 3261.

If invalidity information including, for example, an Invalidity Command, address information for the invalid data file and size information for the invalid data file, is input to the SSD controller 3260 before the transfer of corresponding data to the storage medium 3220, the SSD controller 3260 invalidates data related to the invalidity information. For example, as shown in FIG. 9, if the invalid data corresponds to the file data set FILE2, the SSD controller 3260 updates the write state information WSI of the mapping table 3261 related to the file data set FILE2 to indicate that the file data set FILE2 is invalid. The SSD controller 3260 may then determine which data stored in the buffer memory 3240 is invalid based on the write state information WSI in the mapping table 3261. As shown in FIG. 9, the file data FILE1 and FILE3 are tagged as valid data and the file data FILE2 is tagged as invalid data in the mapping table 3261. Accordingly, the SSD controller 3260 controls the buffer memory 3240 and the storage medium 3220 to transfer the file data sets FILE1 and FILE3 to corresponding locations of the storage medium 3220, while foregoing transfer the file data FILE2 to a corresponding location of the storage medium 3220. Space in the buffer memory 3240 occupied by the invalid file data set FILE2 may be used for storing new data in a subsequent new write/read operation.

In another example shown in FIG. 10, it is assumed that only one data file set FILE1 is stored in the buffer memory 3240. If invalidity information is input to the SSD controller 3260 before transfer of the data file set FILE1 to the storage medium 3220, the SSD controller 3260 invalidates the data file set FILE1. In particular, the SSD controller 3260 updates the write state information WSI of the mapping table 3261 related to the file data set FILE1 to show that the file data set FILE1 is invalid. After the updating, the SSD controller 3260 may then determine whether the data stored in the buffer memory 3240 is invalid by referring to the write state information WSI of the mapping table 3261 related to the file data FILE1. As shown in FIG. 10, the file data set FILE1 is not transferred to the storage medium 3220 because of the "X" state of the write state information WSI. Accordingly, transfer of invalid data may be limited or prevented when the storage medium 3220 is idle. The space of the buffer memory 3240 occupied by the invalid data may be used to store new data in a subsequent write operation.

Although the invalid data is written in the storage medium 3220, files related to the invalid data stored in the storage medium 3220 are not influenced by the stored invalid data. Furthermore, the SSD controller 3260 may selectively transfer the invalid data to the storage medium 3220. That is, although the data stored in the buffer memory 3240 is invalidated by the Invalidity Command, the SSD controller 3260 may selectively transfer the invalid data to the storage medium 3220.

The storage device 3200 described above controls data transfer operations between the buffer memory 3240 and the storage medium 3220 by referring to the mapping table including the write state information representing whether the data stored in the buffer memory 3240 is invalid or valid. As described above, the write state information of the data may be provided from a source external to the storage device 3200. Also, the data may be new data read and modified by the external source. It will be appreciated that storage systems according to various embodiments of the inventive concepts may be used not only in computing systems, but also in devices that store data on a hard disk or in a flash memory, such as a MP3 player or other portable electronic device. By reducing transfer of invalid from a buffer memory to a storage medium, write performance and/or lifetime of the storage system can be improved. In addition, power consumption associated with unnecessary write operations can be reduced.

Figure 11:
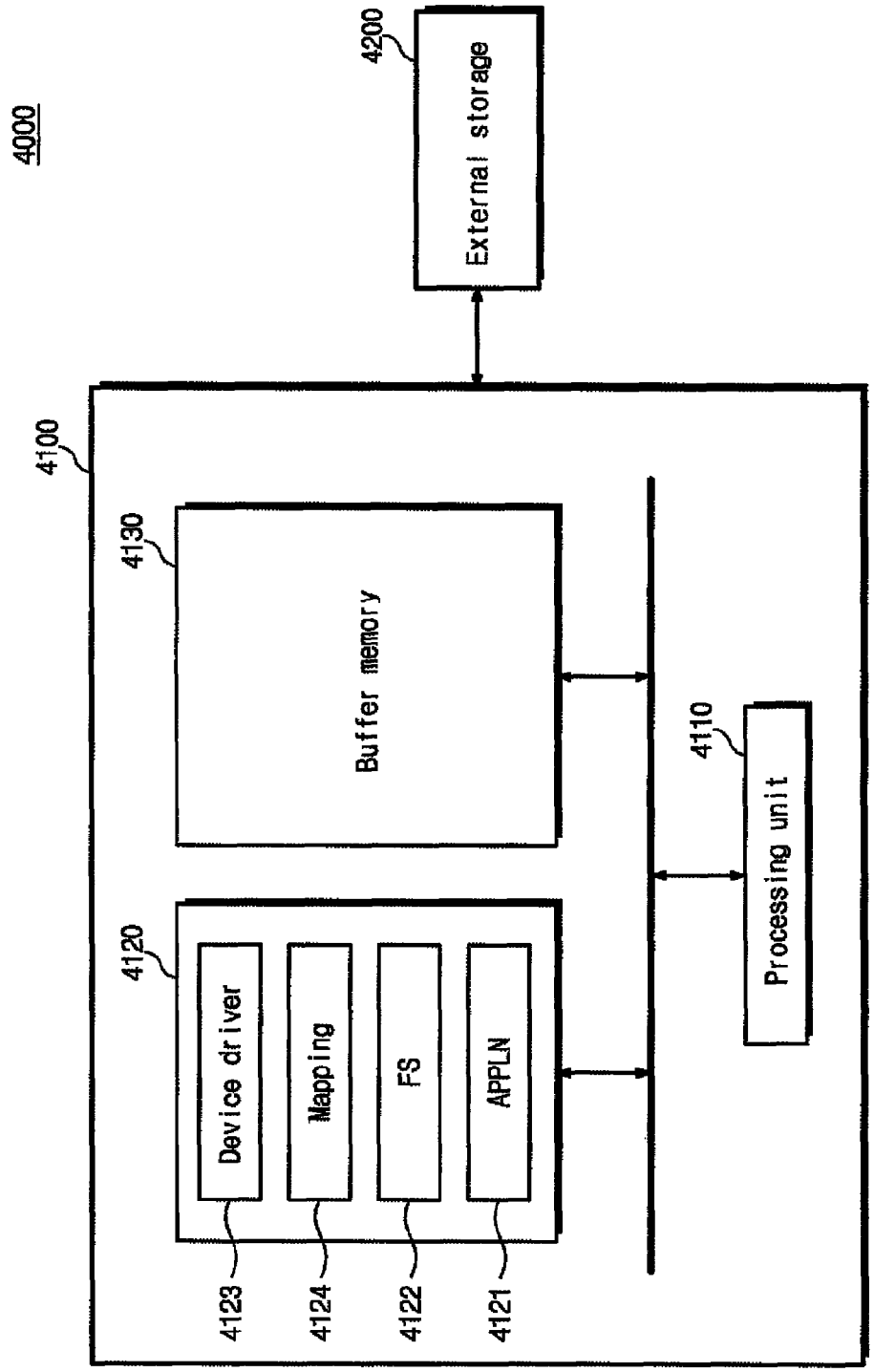
FIG. 11 is a block diagram illustrating a computing system according to one or more embodiments of the inventive concepts.

FIG. 11 is a block diagram showing a user device according to further embodiments of the inventive concepts. Referring to FIG. 11, a user device 4000 according to further embodiments of the inventive concepts includes a host 4100 and an external storage 4200.

The host 4100 includes a processing unit 4110, a memory 4120, and a buffer memory 4130. The processing unit 4110 may include a central processing unit (CPU), a microprocessor, and the like. The processing unit 4110 may be configured to control operations of the user device 4000. In particular, the user device 4000 may be configured to perform a similar role to that of the SSD controller 3260 illustrated in FIG. 4. For example, the processing unit 4110 may be configured to limit or prevent data in the buffer memory 4130 from being written to an external storage device 4200 according to a mapping table of the memory 4120, as described in detail below.

Referring still to FIG. 11, the memory 4120 may serve all or in part as a main memory of the user device 4000. An application program 4121 and a file system 4122 may be provided in the memory 4120. The file system 4122 may include, for example, file systems including a file allocation table file system, but the invention is not limited to such embodiments. A device driver 4123 and a mapping table 4124 may be further provided in the memory 4120. The device driver 4123 may control an interface with external storage device 4200, and the processing unit 4110 may control the interface with the external storage device 4200 using the device driver 4123. Further, the processing unit 4110 may be configured to manage address mapping between the external storage device 4200 and the buffer memory 4130 using the device driver 4123. The mapping table 4124 in the memory 4120 may be used to store interface information with the external storage device 4200, address mapping information between the external storage device 4200 and the buffer memory 4130, and write state information indicating whether data in the buffer memory 4130 is valid information, along lines described above. The processing unit 4110 may update the write state information. For example, when all data of a file processed by the application program 4121 is deleted or when a part of data of a file processed by the application program 4121 is deleted, the processing unit 4110 may update the write state information in the mapping table 4124 based on the device driver 4123. The processing unit 4110 may control the buffer memory 4130 and the external storage device 4200 so that at least a part of data stored in the buffer memory 4130 is written in the external storage device 4200 according to the write state information of the mapping table 4124. Accordingly, it is possible to limit or prevent data in the buffer memory 4130 corresponding to previously deleted data from being written in the external storage device 4200.

The buffer memory 4130 may be used to smooth data transfer between the user device 4000 and the external storage device 4200. The buffer memory 4130 may include high-speed volatile memory, such as DRAM or SRAM, and non-volatile memory, such as MRAM, PRAM, FRAM, NAND flash memory, NOR flash memory, or the like. In exemplary embodiments, the buffer memory 4130 may include a NAND flash memory.

The buffer memory 4130 may function as a write buffer. For example, the buffer memory 4130 may function as a write buffer that temporarily stores data to be written in the external storage device 4200 according to request of the processing unit 4110. The write buffer function may be used selectively. For example, data processed by the processing unit 4110 can be directly transferred to the external storage device 4200 without passing through the write buffer, that is, the buffer memory 4130. The buffer memory 4130 may also serve as a read buffer. For example, the buffer memory 4130 may function as a read buffer that temporarily stores data read out from the external storage device 4200 according to a request of the processing unit 4110. Although only one buffer memory 4130 is illustrated in FIG. 11, two or more buffer memories can be provided to the user device 4000. In this case, each buffer memory may be used as a write buffer, a read buffer, or a buffer having write and read buffer functions.

Referring still to FIG. 11, the external storage device 4200 may be used to store data including document data, image data, music data, and program, and may include a magnetic disk and/or a non-volatile semiconductor memory, such as a flash memory. No buffer memory is provided in the external storage device 4200. The buffer memory 4130 of the user device 4000 may be used as a cache memory, e.g., a write buffer/read buffer. The buffer memory 4130 and the external storage device 4200 may function as a hybrid hard disk (HHD).

The processing unit 4110 may be configured to control the external storage device 4200 and the buffer memory 4130. The processing unit 4110 may control the external storage device 4200 using the device driver 4123 so that data in the external storage device 4200 is transferred to the user device 4000 as necessary. The processing unit 4110 may control the buffer memory 4130 and the external storage device 4200 using the device driver 4123 so that data in the external storage device 4200 is transferred to the user device 4000 via the buffer memory 4130 as necessary. The processing unit 4110 can cause data in the external storage device 4200 to be stored temporarily in the buffer memory 4130. For example, all or a part of data temporarily stored in the buffer memory 4130 may be transferred to the external storage device 4200 under control of the processing unit 4110 when the buffer memory 4130 lacks room for storing new data or when an idle time period of the processing unit 4110 exists. In order to perform the above-described operations, as set forth above, the processing unit 4110 may manage the mapping table 4124 for storing address mapping information between the external storage device 4200 and the buffer memory 4130 and write state information indicating whether data in the buffer memory 4130 is valid information. In some embodiments, the user device 4000 and the external storage device 4200 may be interconnected by a standardized interface, such as PATA, SCSI, ESDI, PCI-Express, SATA, wired USB, wireless USB and/or IDE interfaces, or by other types of interfaces including non-standard interfaces.

When the buffer memory 4130 lacks room for storing new data or when the processing unit 4110 is idle for a sufficient time period, the user device 4000 may refer to write state information of the mapping table and prevent at least a part of data stored in the buffer memory 4130 from being transferred to the external storage device 4200. The user device 4000 may limit or prevent invalid data in the buffer memory 4130 from being written in the external storage device 4200, based on write state information indicating whether data stored in the buffer memory 4130 is valid data or invalid data. In other words, the user device 4000 may selectively control a data transfer operation to the external storage device 4200 by fastening a tag of valid/invalid information to data stored in the buffer memory 4130. An operation of transferring data stored in the buffer memory 4130 to the external storage device 4200 may be substantially the same as described in FIGS. 5 to 10, and description thereof is thus omitted. According to the illustrated embodiments, write performance of the user device 4000 may be improved, and it may be possible to prevent the lifetime of the external storage device 4200 from being unduly shortened due to unnecessary write operations. It may also be possible to increase battery life.

In some embodiments, the buffer memory 4130 may be integrated with the processing unit 4110 in a common circuit board assembly, e.g., mounted on an on-board type of computing system. In further embodiments, the buffer memory 4130 may be connected to the processing unit 4110 via a PCI bus or a PCI-E bus. Other interconnection techniques may also be used. For example, commonly used interfaces for a desktop and notebook computers may be used.

In the event that the buffer memory 4130 is realized with a non-volatile memory, such as a NAND flash memory or a NOR flash memory, it can be used for various functions. For example, the buffer memory 4130 may be used as a boot-up memory for storing a boot code that is used at booting. A buffer memory 3240 in FIG. 4 or a buffer memory 4130 in FIG. 11 may also be used as a boot-up memory. Furthermore, important software can be stored in the buffer memory 4130 in order to improve system performance.

In some embodiments of the inventive concepts, various functions of constituent elements are described. However, an interface function (including a control function) can be provided in each constituent element if necessary. Although a bus of a computing system in FIG. 11 is simplified, such a bus may include various buses that are well known in a computing system.

The user device 3000 or 4000 shown in FIG. 4 or 11 may also perform an invalidation operation using a later-described logging scheme (in connection with FIGS. 43-47). That is, the user device 3000 or 4000 may apply a logging scheme by which a position of an area to be deleted is recorded when the size of to-be-deleted data stored in a buffer memory exceeds a reference size. On the other hand, the user device 3000 or 4000 may directly invalidate data to be deleted when the size of the data does not exceed a reference size. Moreover, as set forth latter (in connection with FIG. 47), the user device 3000 or 4000 may perform an invalidation operation depending on whether general data is deleted or security data is deleted.

Embodiments in accordance with one or more of the inventive concepts will be now be described with reference to FIGS. 12-18 in which the user device executes an invalidity operation via an Invalidity Command.

Figure 12:
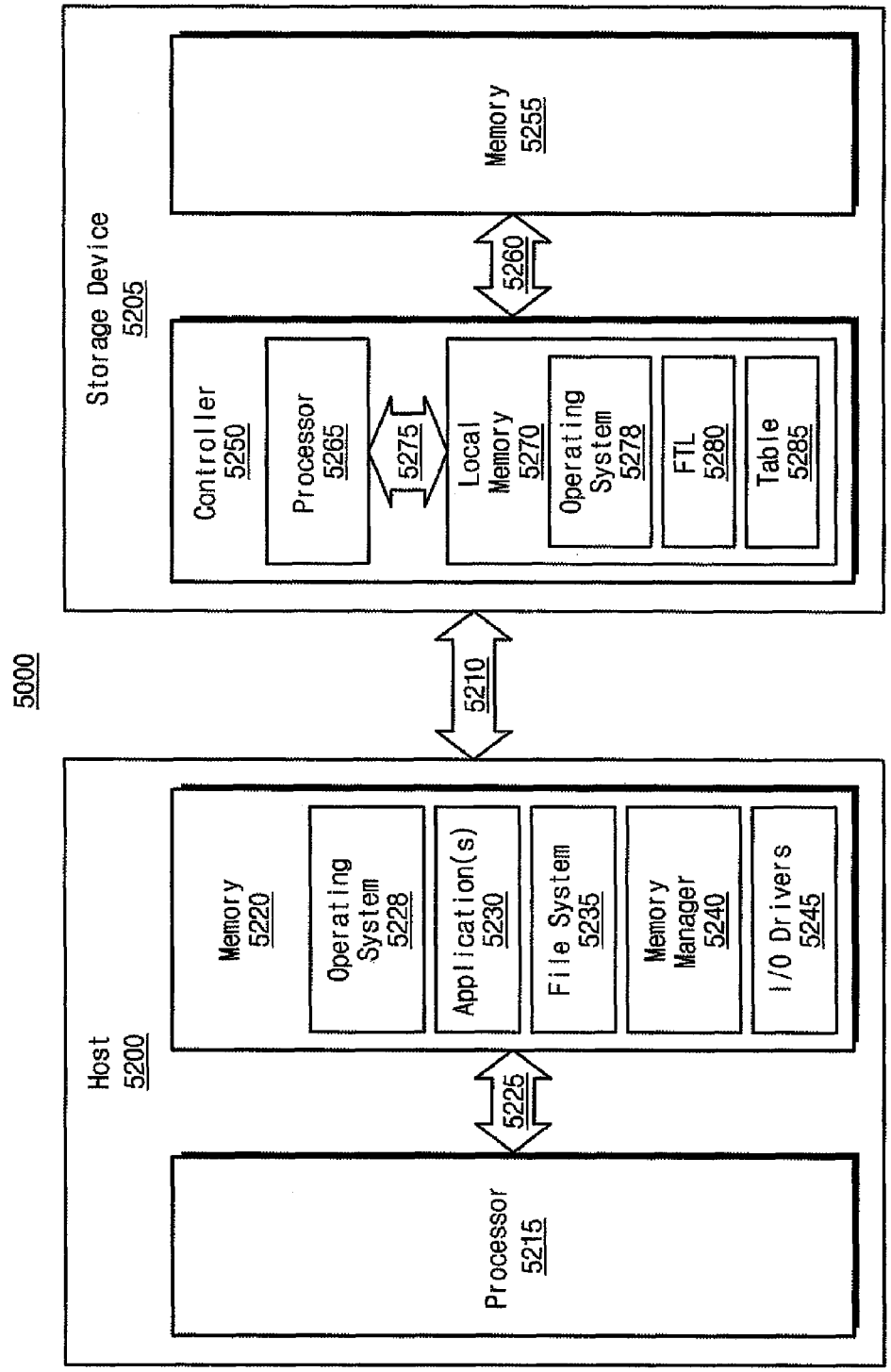
FIG. 12 is a block diagram that illustrates a data processing system in accordance with one or more embodiments of the inventive concepts.

FIG. 12 is a block diagram that illustrates a user device in accordance with some embodiments of the inventive concepts. Referring now to FIG. 12, a user interface comprises a host 5200 and a storage device 5205 that are coupled by an interface 5210. The interface 5210 may be a standardized interface, such as ATA, SATA, PATA, USB, SCSI, ESDI, IEEE 1394, IDE, PCI-Express and/or a card interface. The host 5200 comprises a processor 5215 that communicates with a memory 5220 via an address/data bus 5225. The processor 5215 may be, for example, a commercially available or custom microprocessor. The memory 5220 is representative of the one or more memory devices containing the software and data used to operate the data processing system in accordance with some embodiments of the inventive concepts. The memory 5220 may include, but is not limited to, the following types of devices: cache, ROM, PROM, PRAM, EPROM, EEPROM, flash memory, SRAM, and DRAM.

As shown in FIG. 12, the memory 5220 may contain five or more categories of software and/or data: an operating system 5228, application(s) 5230, a file system 5235, a memory manager 5240, and I/O drivers 5245. The operating system 5228 generally controls the operation of the host 5200. In particular, the operating system 5228 may manage the host's 5200 software and/or hardware resources and may coordinate execution of programs by the processor 5215. The application(s) 5230 represent the various application programs that may run on the host 5200. The file system 5235 is the system used for storing and organizing computer files and/or data in the memory 5220 and/or in storage locations, such as the storage device 5205. The file system 5235 used may be based on the particular operating system 5228 running on the host 5200. The memory manager 5240 may manage memory access operations performed in the memory 5220 and/or operations performed in an external device, such as the storage device 5205. The I/O drivers 5245 may be used to transfer information between the host 5200 and another device (e.g., storage device 5205), computer system, or a network (e.g., the Internet).

In accordance with various embodiments of the inventive concepts, the host 5200 may be a Personal Digital Assistant (PDA), a computer, a digital audio player, a digital camera, and/or a mobile terminal.

The storage device 5205 comprises a controller 5250 that communicates with a memory 5255 via an address/data bus 5260. The memory 5255 may be a variety of different memory types and may be described generally as an erase before write type memory. Thus, the storage device 5205 may be a memory card device, Solid State Drive (SSD) device, ATA bus device, Serial ATA (SATA) bus device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device in accordance with various embodiments of the inventive concepts. The controller 5250 comprises a processor 5265 that communicates with a local memory 5270 via an address/data bus 5275. The processor 5265 may be, for example, a commercially available or custom microprocessor. The local memory 5270 is representative of the one or more memory devices containing the software and data used to operate the storage device 5205 in accordance with some embodiments of the inventive concepts. The local memory 5270 may include, but is not limited to, the following types of devices: cache, ROM, PROM, EPROM, EEPROM, flash, SRAM, and DRAM.

As shown in FIG. 12, the local memory 5270 may contain three or more categories of software and/or data: an operating system 5278, a Flash Translation Layer (FTL) module 5280, and a table 5285. The operating system 5278 generally controls the operation of the storage device 5205. In particular, the operating system 5278 may manage the storage device's 5205 software and/or hardware resources and may coordinate execution of programs by the processor 5265. In certain embodiments, the local memory 5270 may not include the operating system 5278. The FTL module 5280 may be used in flash memory devices. As discussed above, a flash chip is erased in units of blocks. The typical lifetime of a flash memory is around 100,000 erase operations per block. To avoid having one portion of a flash memory wear out sooner than another, flash devices are generally designed to distribute erase cycles around the memory, which may be called "wear leveling." The FTL module 5280 may be used as an interface between the file system 5235 and the location of files/data in the memory 5255 so that the file system 5235 does not have to keep track of the actual location of files/data in the memory 5255 due to wear leveling. The table 5285 may be maintained by the FTL module 5280 and may be used to associate physical addresses for units of memory allocation in the memory 5255 with indications of whether the units of memory allocation contain invalid data.

Figures 13, 14:
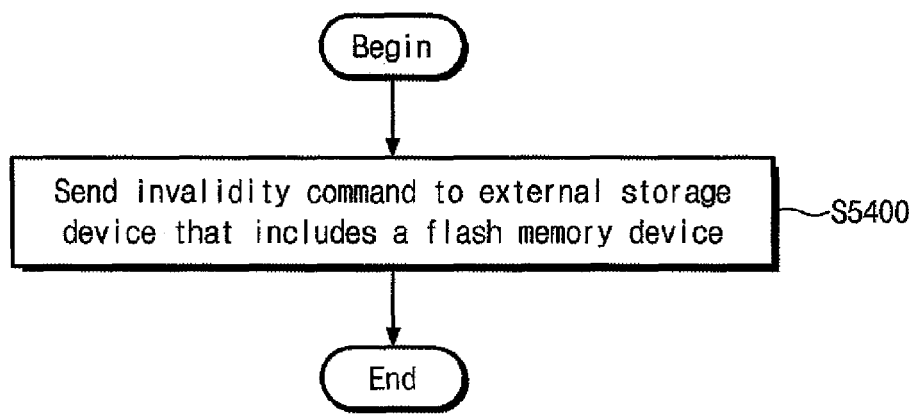
FIG. 13 is a block diagram that illustrates a data structure for associating units of memory allocation in a storage device with an indication of whether the units of memory allocation contain valid or invalid data in accordance with one or more embodiments of the inventive concepts.
FIGS. 14 to 18 are flowcharts that illustrate operations of the data processing system of FIG. 12 in accordance with one or more embodiments of the inventive concepts.
Figure 15:
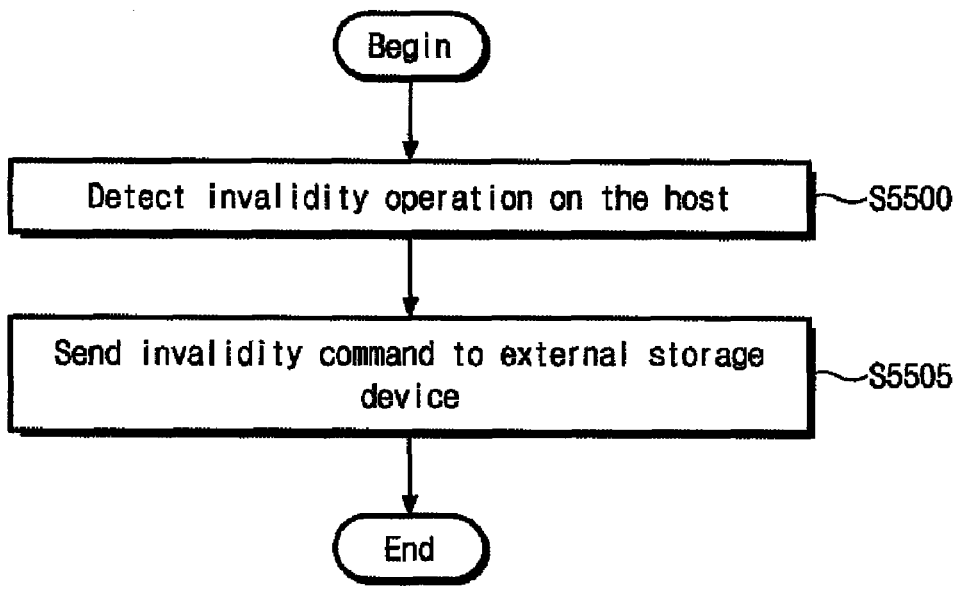

An example of the table 5285 is shown in FIG. 13 for a flash type memory in which a page is used as a unit of memory allocation and a block comprises fur pages. As shown in FIG. 13, the table 5285 associates the physical addresses of pages in the flash memory 5255 with the logical addresses used by the file system 5235. Moreover, the table 5285 includes a column that indicates whether each particular page in the flash memory 5255 contains invalid data or valid data. In the example shown in FIG. 13, the block of pages comprising logical addresses 0-3 contain invalid data and, therefore, can be erased. The table 5285 may be used to trigger an erase operation when all of the pages in a block are determined to contain invalid data. Conventionally, for example, if a second write operation was attempted on logical address page address 0, then it can be concluded that logical page address 0 contains invalid data. It is not clear, however, whether logical page addresses 1-3 also contain invalid data. Therefore, to free up logical page address 0, the data in logical page addresses 1-3 is copied elsewhere so the entire block comprising logical page addresses 0-3 can be erased. This copy operation may be unnecessary if logical page addresses 1-3 contain invalid data. The table 5285 may provide an indication of which pages contain invalid data to reduce unnecessary copy operations as described above. Although illustrated herein as a table, it will be understood that the table 5285 may be implemented as other types of data structures in accordance with various embodiments of the inventive concepts.

Although FIG. 13 illustrates a data processing system software architecture in accordance with some embodiments of the inventive concepts, it will be understood that the inventive concepts is not limited to such a configuration but is intended to encompass any configuration capable of carrying out operations described herein.

Computer program code for carrying out operations of devices and/or systems discussed above with respect to FIG. 12 may be written in a high-level programming language, such as Java, C, and/or C++, for development convenience. In addition, computer program code for carrying out operations of embodiments of the inventive concepts may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

It is noted that inventive concepts are described herein with reference to message flow, flowchart and/or block diagram illustrations of methods, systems, devices, and/or computer program products in accordance with some embodiments of the invention. These message flow, flowchart and/or block diagrams further illustrate exemplary operations for operating a data processing system that includes an external data storage device. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Referring to FIG. 14, operations begin at block S5400 where the host 5200 sends Invalidity Command for one or more files to the external storage device 5205, which includes an erase before write memory device, such as a flash memory device. In accordance with various embodiments of the inventive concepts illustrated in FIG. 15, an invalidity operation may be detected on the host 5200 at block S5500. This may be done, for example, by detecting that metadata associated with a file system has been updated with a delete code for a deleted file. In response to detecting the invalidity operation on the host 5200, the Invalidity Command can be sent to the external storage device 5205. In some embodiments, the Invalidity Command can specify a logical address and data to be invalided that are associated with the deleted file.

Figure 16:
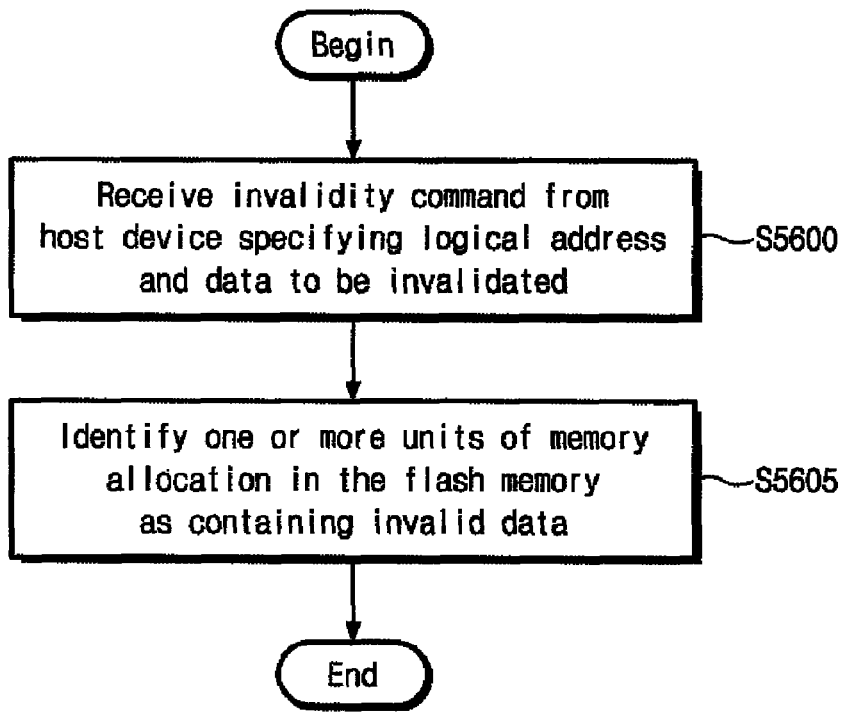
Figure 17:
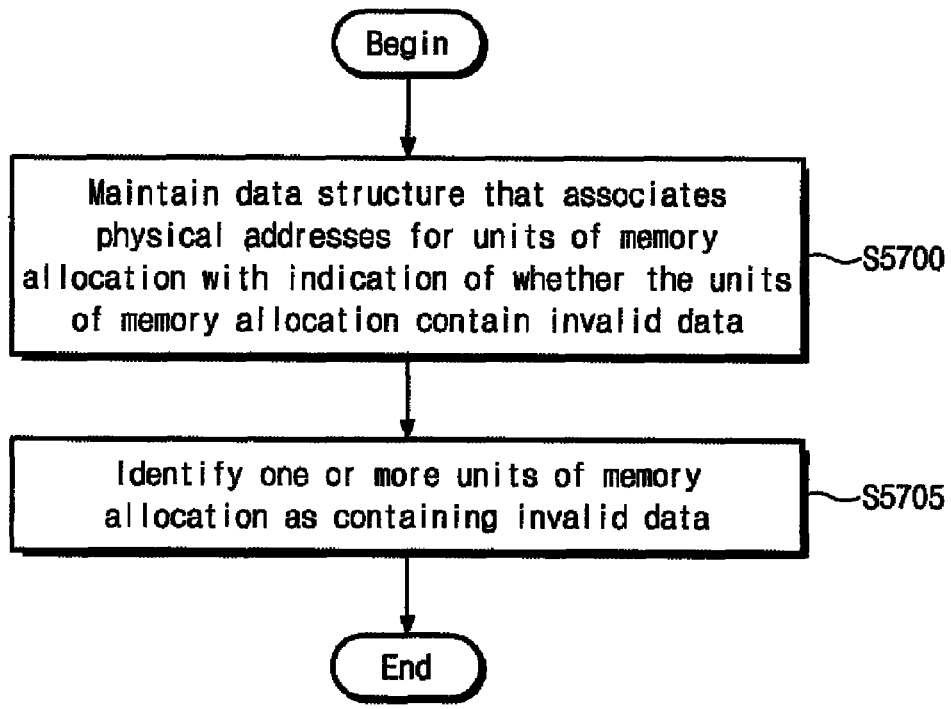

Referring to FIG. 16, exemplary file delete operation on the external storage device 5205 begin at block S5600 where the Invalidity Command that specifies the logical address and data to be invalidated for one or more files is received from the host 5200. The storage device 5205 identifies one or more units of memory allocation in the memory 5255 as containing invalid data based on the specified logical address and data to be invalidated. In some embodiments illustrated in FIG. 17, the FTL module 5280 may maintain a data structure, such as the table 5285 shown in FIG. 13, that associates logical addresses with physical addresses for the units of memory allocation in the memory 5255 at block S5700. The data structure may also include an indication of whether the various units of memory allocation contain invalid data. When a physical address of a unit of memory allocation is identified as being associated with a deleted file, the FTL module 5280 may update the data structure to indicate that the identified unit of memory allocation contains invalid data at block S5705.

Figure 18:
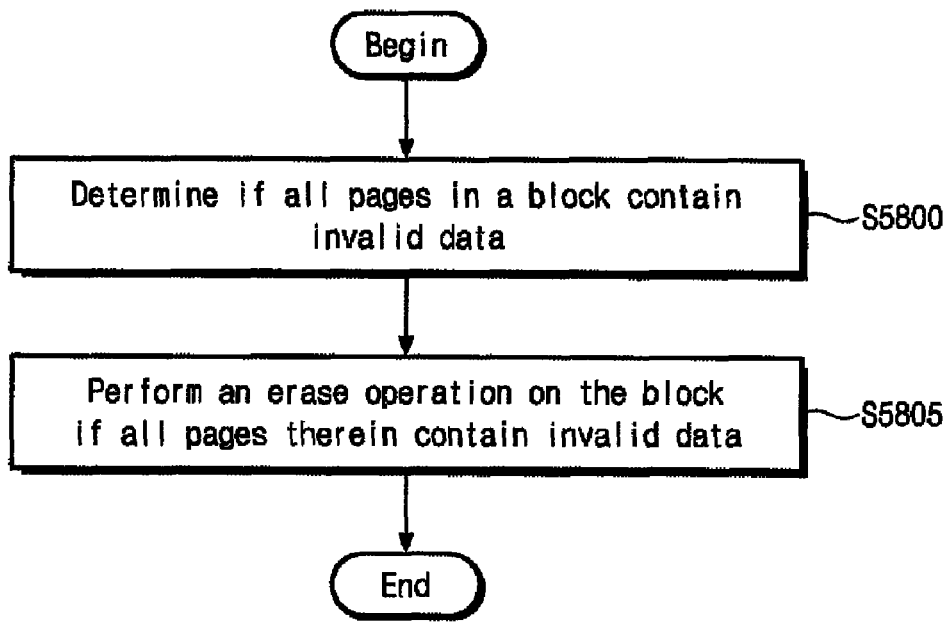

As various memory operations are performed on the storage device, it may be desirable to perform a "garbage collection" operation to form larger blocks of free, contiguous memory. In accordance with some embodiments of the inventive concepts, rather than wait for the operating system 5228 of the host 5200 or the operating system 5278 of the storage device 5205 to trigger a periodic garbage collection operation, the FTL module 5280 may use the table 5285 to determine when to collect memory units that contain invalid data. Referring to FIG. 18, the FTL module 5280 may determine if all of the read/write operation units (e.g., pages for a flash memory device) in an erase operation unit (e.g., block for a flash memory device) contain invalid data by examining the invalid data field (see FIG. 13) for each of the read/write operation units at block S5800. At block S5805, an erase operation on the erase operation unit can be performed once all of the read/write operation units are marked as containing invalid data. In this way, the actual physical file data may be erased as soon as an erase operation unit is ready for erasure. This may be desirable for applications involving personal or sensitive data as the physical erasure of a file from a storage device memory may be done more quickly than waiting for the file to be erased by chance due to multiple file write operations being performed on the storage device.

The flowcharts of FIGS. 15-18 illustrate the architecture, functionality, and operations of some embodiments of methods, systems, and computer program products for operating a data processing system that includes an external data storage device. In this regard, each block represents a module, segment, or portion of code, which comprises one or more executable instructions for implementing the specified logical function(s). It should also be noted that in other implementations, the function(s) noted in the blocks may occur out of the order noted in FIGS. 15-18. For example, two blocks shown in succession may, in fact, be executed substantially concurrently or the blocks may sometimes be executed in the reverse order, depending on the functionality involved.

Also, the user device 5000 shown in FIG. 12 may also perform an invalidation operation using a later-described logging scheme (described in connection with FIGS. 43-47). That is, the user device 5000 may apply a logging scheme by which a position of an area to be deleted is recorded when the size of data to be deleted exceeds a reference size. On the other hand, the user device 5000 may directly invalidate data to be deleted when the size of the data does not exceed a reference size. Moreover, as described later (in connection with FIG. 47), the user device 5000 may perform an invalidation operation depending on whether general data is deleted or security data is deleted.

Embodiments in accordance with one or more of the inventive concepts will be now be described with reference to FIGS. 19-30 in which a storage device executes a self-invalidity operation.

Figure 19:
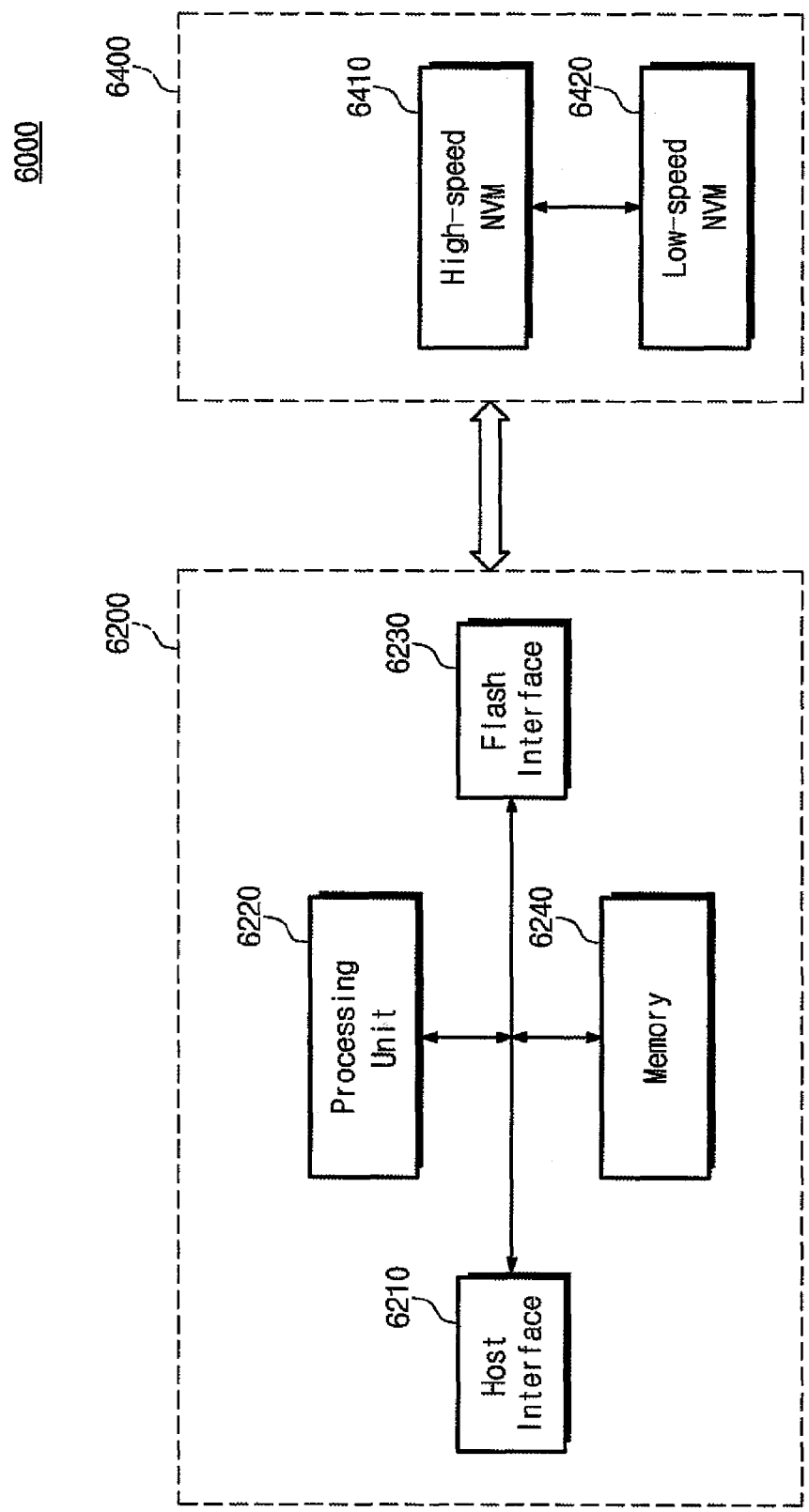
FIG. 19 is a block diagram of a solid state drive (SSD) according to one or more embodiments of the inventive concepts.

FIG. 19 illustrates a block diagram of a storage device executing self-invalidity operation without interference of a host. As an example of the storage device, solid state drive (SSD) 6000 is shown in FIG. 19. As shown, the SSD 6000 of this example includes an SSD controller 6200 and non-volatile storage media 6400.

The SSD controller 6200 includes first and second interfaces 6210 and 6230, a processing unit 6220, and a memory 6240. Wherein the first interface 6210 is a host interface and the second interface 6230 is a flash interface The first interface 6210 functions as a data I/O interface with a host device, such as a host central processing unit (CPU) (not shown). Non-limiting examples of the first interface 6210 include Universal Serial Bus (USB) interfaces, Advanced Technology Attachment (ATA) interfaces, Serial ATA (SATA) interfaces, Small Computer System Interface (SCSI) interfaces.

The second interface 6230 functions as a data I/O interface with the non-volatile storage media 6400. In particular, the second interface 6230 is utilized to transmit/receive various commands, addresses and data to/from the non-volatile storage media 6400. As will be apparent to those skilled in the art, a variety of different structures and configurations of the second interface 6230 are possible, and thus a detailed description thereof is omitted here for brevity.

The processing unit 6220 and memory 6240 are operatively connected between the first and second interfaces 6210 and 6230, and together function to control/manage the flow of data between the host device (not shown) and the non-volatile storage media 6400. The memory 6240 may, for example, be a DRAM type of memory device, and the processing unit

6220 may, for example, include a central processing unit (CPU), a direct memory access (DMA) controller, and an error correction control (ECC) engine. The operations generally executed by processing unit 6220 (and memory 6240) to transfer data between the host device (not shown) and SSD memory banks are understood by those skilled in the art, and thus a detailed description thereof is omitted here for brevity. Rather, the operational description presented later herein is primarily focused on inventive aspects relating to various embodiments of the invention.

Still referring to FIG. 19, the non-volatile storage media 6400 of this example includes a high-speed non-volatile memory (NVM) 6410 and a low-speed non-volatile memory (NVM) 6420. However, the embodiments herein are not limited configurations containing dual-speed memories. That is, the non-volatile storage media 6400 may instead be composed of a single type of memory operating at a single speed.

As the names suggest, the high-speed NVM 6410 is capable of operating at a relatively higher speed (e.g., random write speed) when compared to the low-speed NVM 6420.

In an exemplary embodiment, the high-speed NVM 6410 is single-level cell (SLC) flash memory, and the low-speed NVM 6420 is multi-level cell (MLC) flash memory. However, the invention is not limited in this respect. For example, the high-speed NVM 6410 may instead be comprised of phase-change random access memory (PRAM), or MLC flash memory in which one bit per cell is utilized. Also, the high-speed NVM 6410 and the low-speed NVM 6420 may be comprised of the same type of memory (e.g., SLC or MLC or PRAM), where the operational speed is differentiated by fine-grain mapping in the high-speed NVM 6410 and coarse-grain mapping in the low-speed NVM 6420.

Generally, the high-speed NVM 6410 is utilized to store frequently accessed (written) data such as metadata, and the low-speed NVM 6420 is utilized to store less frequently accessed (written) data such as media data. In other words, as will discussed later herein, a write frequency of data in the high-speed NVM 6410 is statistically higher than a write frequency of data in the low-speed NVM 6420. Also, due to the nature of the respective data being stored, the storage capacity of the low-speed NVM 6420 will typically be much higher than that of the high-speed NVM 6410. Again, however, the embodiments herein are not limited to the use of two or more memories operating at different speeds.

Figure 20:
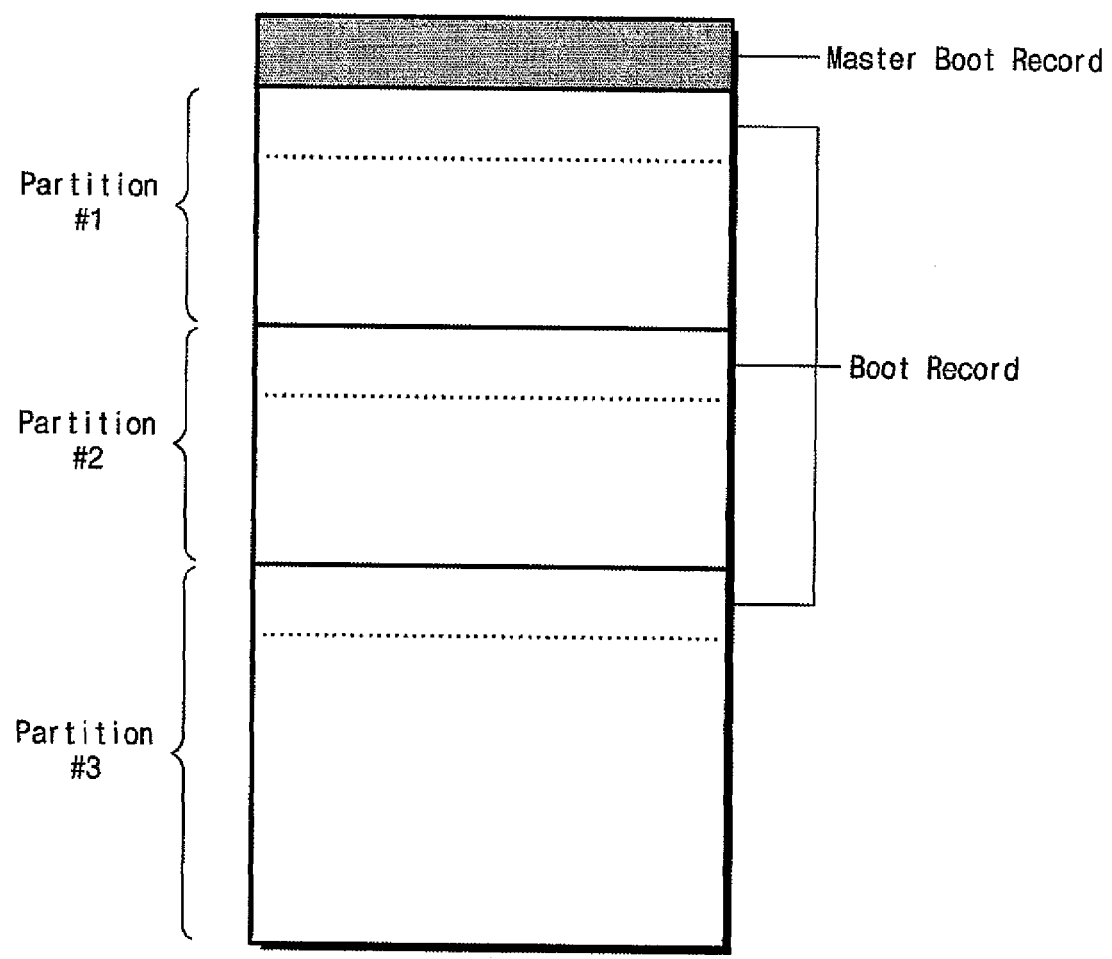
FIG. 20 is a schematic diagram illustrating the logical partitioning of a memory of a solid state drive (SSD)

FIG. 20 illustrates an example of the logical partitioning of the non-volatile storage media 6400. As shown, the first "sector" of the solid-state memory contains a master boot record (MBR), and remaining sectors of the memory are divided into a number of partitions. In addition, each partition generally includes a boot record at a logical front end thereof FIG. 21 illustrates a well-known 512-byte example of the MBR shown in FIG. 20. Generally, the MBR is utilized, for example, to maintain the primary partition table of the solid-state memory. It may also be used in bootstrapping operations after the computer system's BIOS transfers execution to machine code instructions contained within the MBR. The MBR may also be used to uniquely identify individual storage media.

FIG. 22 illustrates an example of the layout of a single 16-byte partition record of the MBR illustrated in FIG. 21. In the example of the IBM Partition Table standard, four (4) of the partition records illustrated in FIG. 4 are contained with the partition table of the MBR.

FIG. 23 is a table illustrating partition types and corresponding ID values. In this respect, the Operating System (O/S) of can additionally create a plurality of partition in specified primary partition. These partitions are referred to as "Extended Partition". Each partition created on extended partition is called as logical partition, and each logical partition can adapt the same or different file system.

It is noted here that the above-described MBR scheme represents just one of several standards in an ever-evolving industry. For example, the Extensible Firmware Interface (EFI) standard has been proposed as a replacement for the PC BIOS standard. Whereas PC BIOS utilizes the MBR scheme as described above, the EFI standard utilizes a GUID Partition Table (GPT) as the standard for the layout of a partition table in a logically partitioned solid-state drive. The inventive concepts is not limited to any particular partitioning standard.

Data contained in the MBR's (or GUID) partitioning table of FIG. 21 is an example of "storage-level" metadata, i.e., metadata associated with logical storage areas of the solid state memory. This is in contrast with "file system level" metadata which is metadata associated with the file system of the user device (or computer system). File system examples include File Allocation Table (FAT), New Technology File System (NTFS), Second and Third Extended File Systems (ext2 and ext3).

That is, when a user deletes a file in the non-volatile storage media 6400, the file system running on the system processes the delete command and, from the user's point of view, appears to remove the file from the non-volatile storage media 6400. In reality, however, conventional file systems leave the file data in physical memory, and instead, the data is deemed "invalid". A host system includes an application program that communicates with a file system. A Flash Translation Layer (FTL) keeps track of the physical location of memory units associated with files in the non-volatile storage media 6400 so the file system need only reference logical memory units.

As will be explained in more detail below, embodiments of inventive concepts are at least partially directed to monitoring updated metadata in order locate the positions of invalid data stored in the solid state memory system.

The metadata that is monitored may be storage level metadata or file system level metadata. In the case of storage level metadata, for example, the metadata may be contained in a partition table, and invalid data is located in accordance with changes in the metadata of the partition table.

In one embodiment, for example, a determination is made as whether partition metadata of the solid state memory has changed, and if so, the partition metadata is analyzed to locate invalid data stored in the solid state memory. This analysis may include determining that a file system type of a partition has changed, and invalidating data in response to the changed file system type. Alternately, or in addition, the analysis may include determining that a partition has changed, and invalidating data in response to the changed partition.

Figure 24:
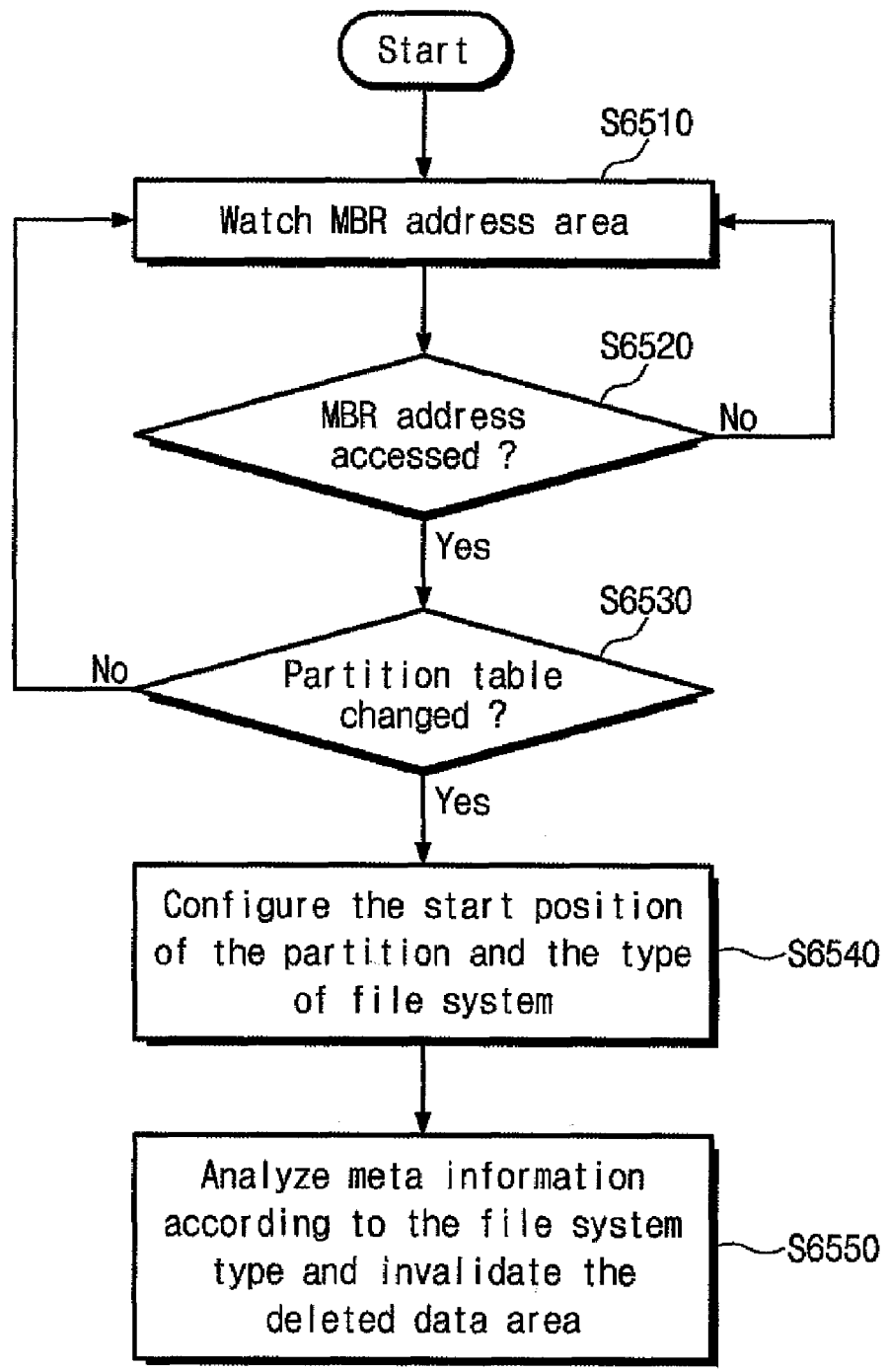
FIGS. 24 and 25 are a flowchart and schematic diagram, respectively, for use in describing a method of locating invalid data area according to one or more embodiments of the inventive concepts.
Figure 25:
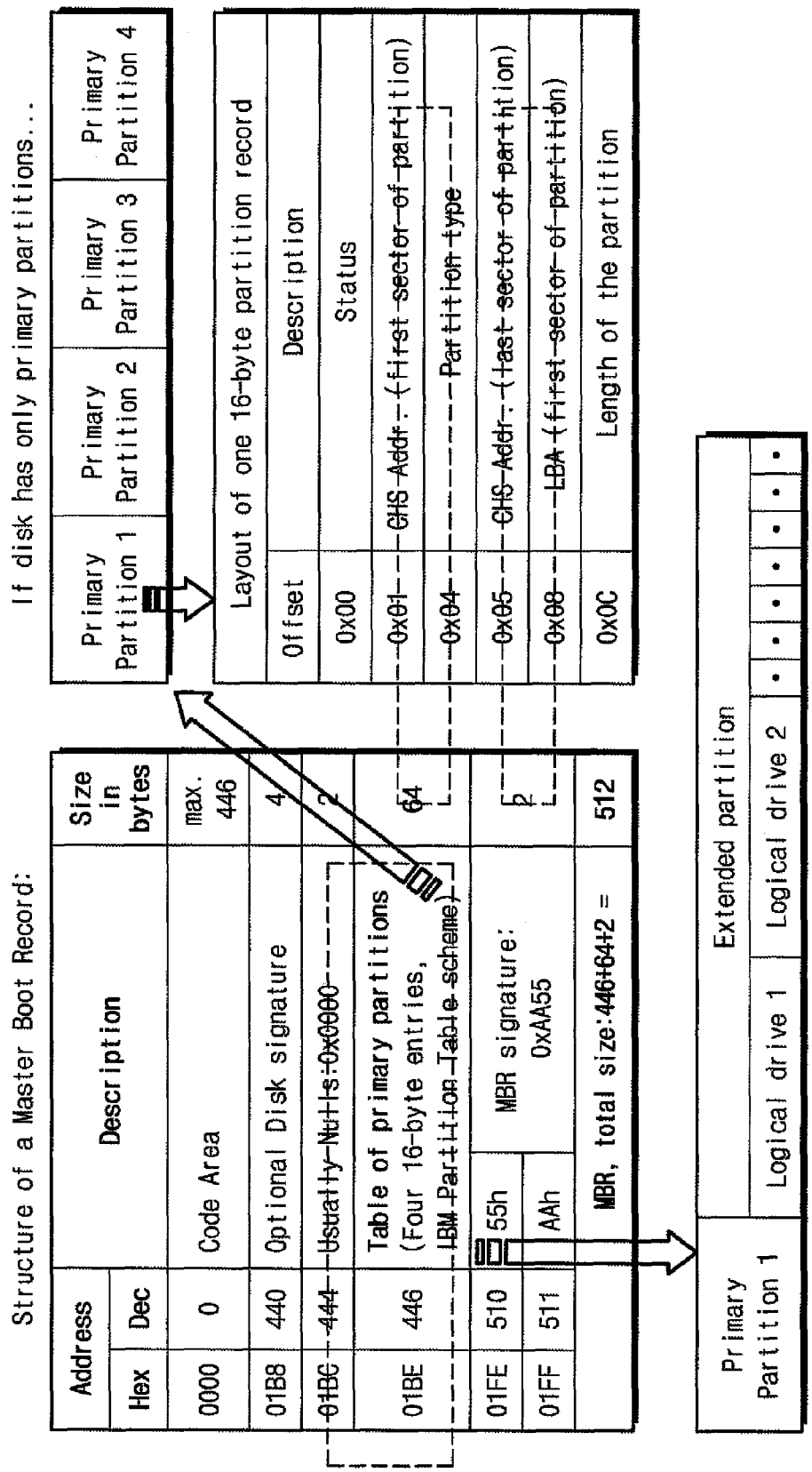

Reference is now made to FIGS. 24 and 25 with respect to method of invalidating a deleted data area of a solid state memory according to an embodiment of the inventive concepts.

Generally, this embodiment relates to the monitoring of metadata contained in a partition table, such as the standard Table of Primary Partitions of an MBR in a BIOS system. In step S6510 and S6520 of FIG. 24, the MBR address area is monitored to determine whether an MBR address has been accessed. Examples of the MBR, primary partitions, and partition record are illustrated in FIG. 25.

Once it has been determined that an MBR address has been accessed, a determination is made at step S6530 as to whether the Partition Table has been changed. For example, the Partition Table may be altered in the situation where a partition is divided. In this case, all data in the divided partition becomes invalid.

In the case of an affirmative determination at step S6530, the start position of the partition and the type of file system (partition type) are configured in step S6540 of FIG. 24. Then, at step S6550, the metadata is analyzed according to the file system type, and the deleted data area is invalidated.

Figure 26:
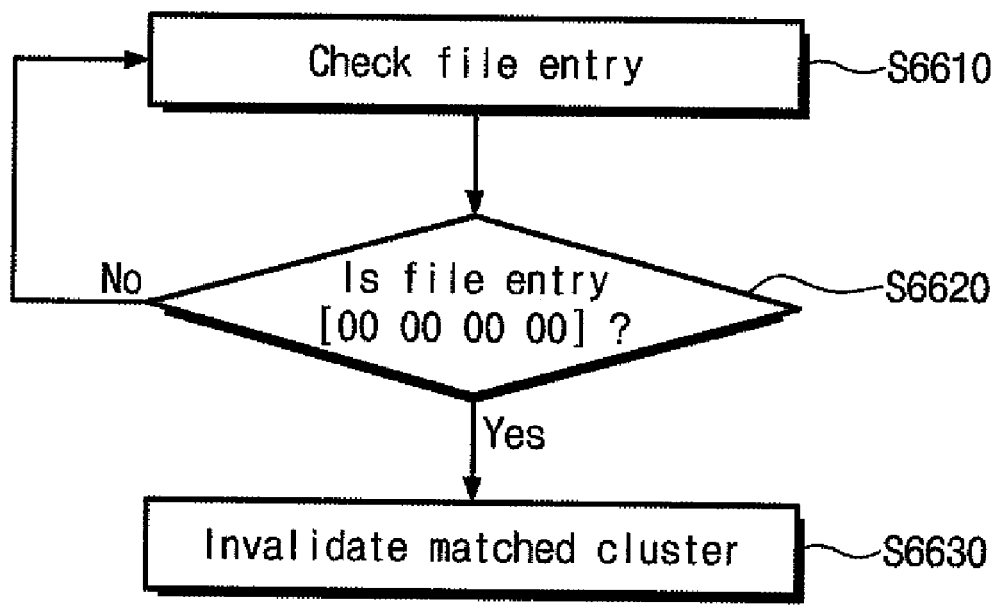
FIGS. 26 and 27 are a flowchart and schematic diagram, respectively, for use in describing a method of locating invalid data area according to an embodiment of the inventive concepts.
Figure 27:
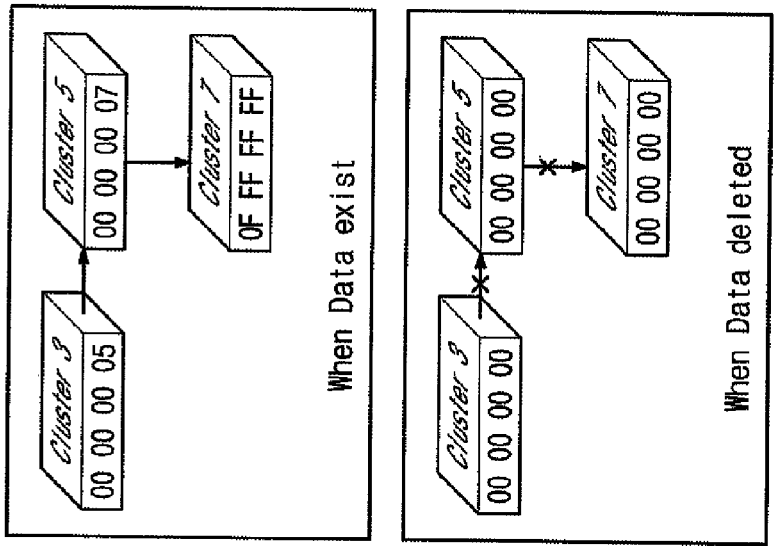

Reference is now made to FIGS. 26 and 27 with respect to method of invalidating a deleted data area of a solid state memory according to an embodiment of the inventive concepts.

Generally, this embodiment relates to the monitoring of metadata contained in a File Allocation Table (FAT). In particular, by examining cluster linkages (or lack thereof), a determination is made as to whether data associated with the clusters is deleted data.

Generally, a file system that may be used to store files in a flash type solid state memory have a unit of memory allocation defined that specifies the smallest logical amount of disk space that can be allocated to hold a file. For example, the MS-DOS file system known as the File Allocation Table (FAT) calls this unit of memory allocation a cluster.

In the method of FIG. 26, the file entry is initially checked at step S6610, and at step S6620, a determination is made as to whether the file entry is [00 00 00 00]. If the determination at step S6620 is affirmative, the matched clusters are not linked and the data thereof is invalidated at step S6630.

Figure 28:
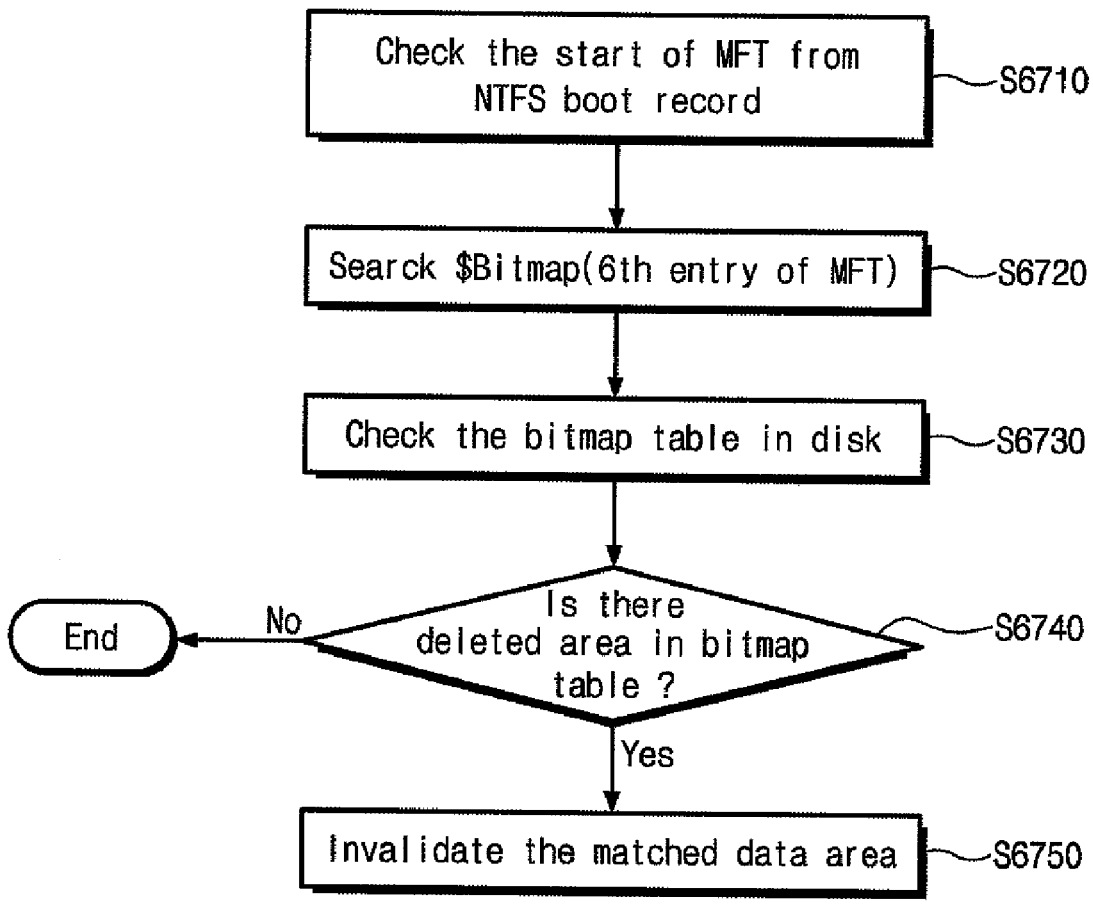
FIGS. 28 and 29 are a flowchart and schematic diagram, respectively, for use in describing a method of locating invalid data area according to one or more embodiments of the inventive concepts.
Figure 29:
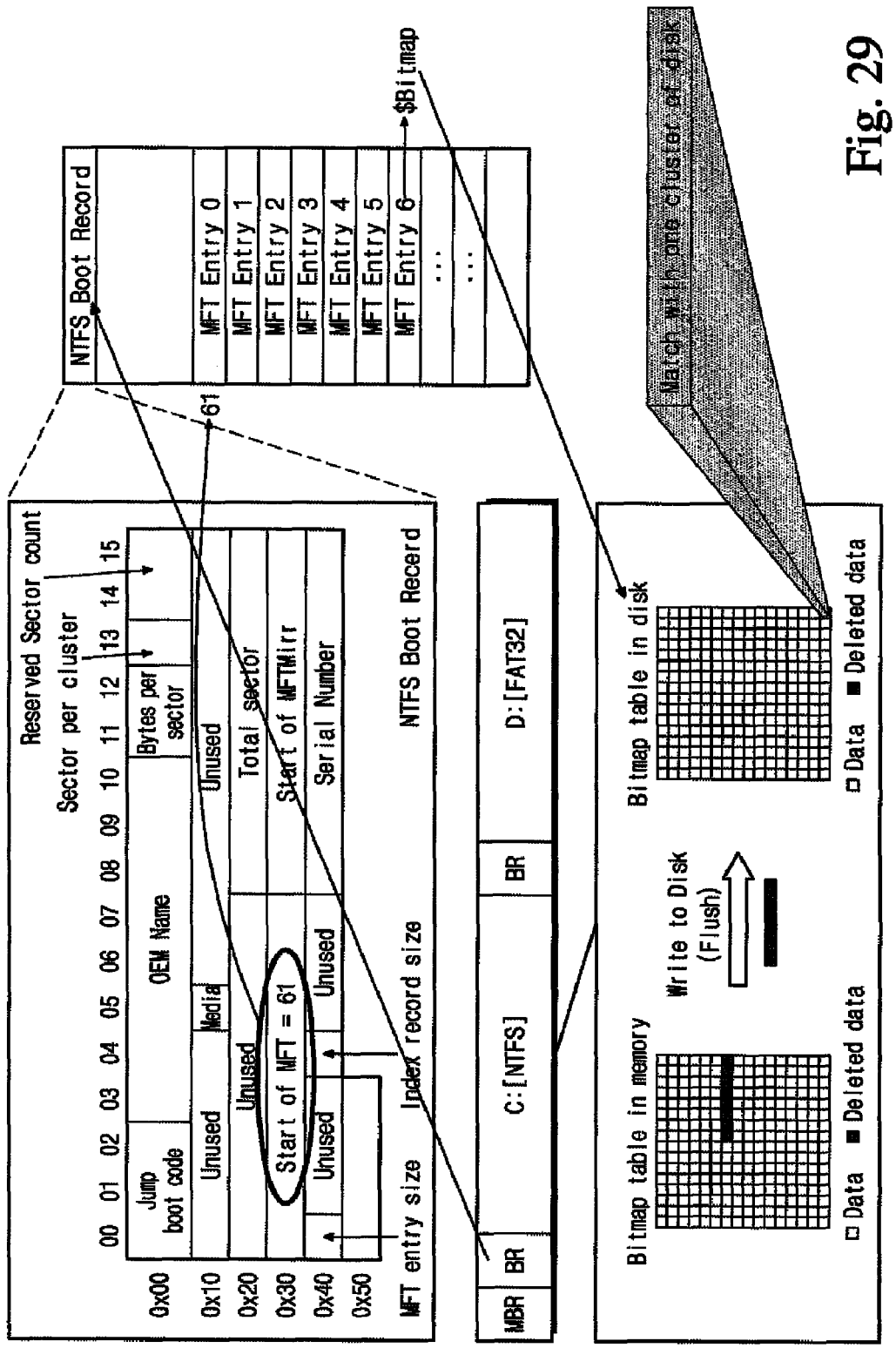

Reference is now made to FIGS. 28 and 29 with respect to method of invalidating a deleted data area of a solid state memory according to an embodiment of the inventive concepts.

Generally, this embodiment relates to the monitoring of metadata contained in the New Technology File System (NTFS). In an initial step 6710, the start of the Master File Table (MFT) from the NTFS boot record is checked. In this example, the $Bitmap which is the sixth (6th) entry of the MFT is then searched at step S6720, and then the bitmap table is checked at step S6730. A determination is then made as to whether a deleted area exists in the bitmap table at step S6740, and if the answer is affirmative, the matched data area is invalidated.

By invalidating data or data areas as described above, it becomes possible to execute a merge operation in the solid state disk (SSD) drive without copying the invalid data. In addition, for example, garbage collection systems can be made more efficient.

Figure 30:
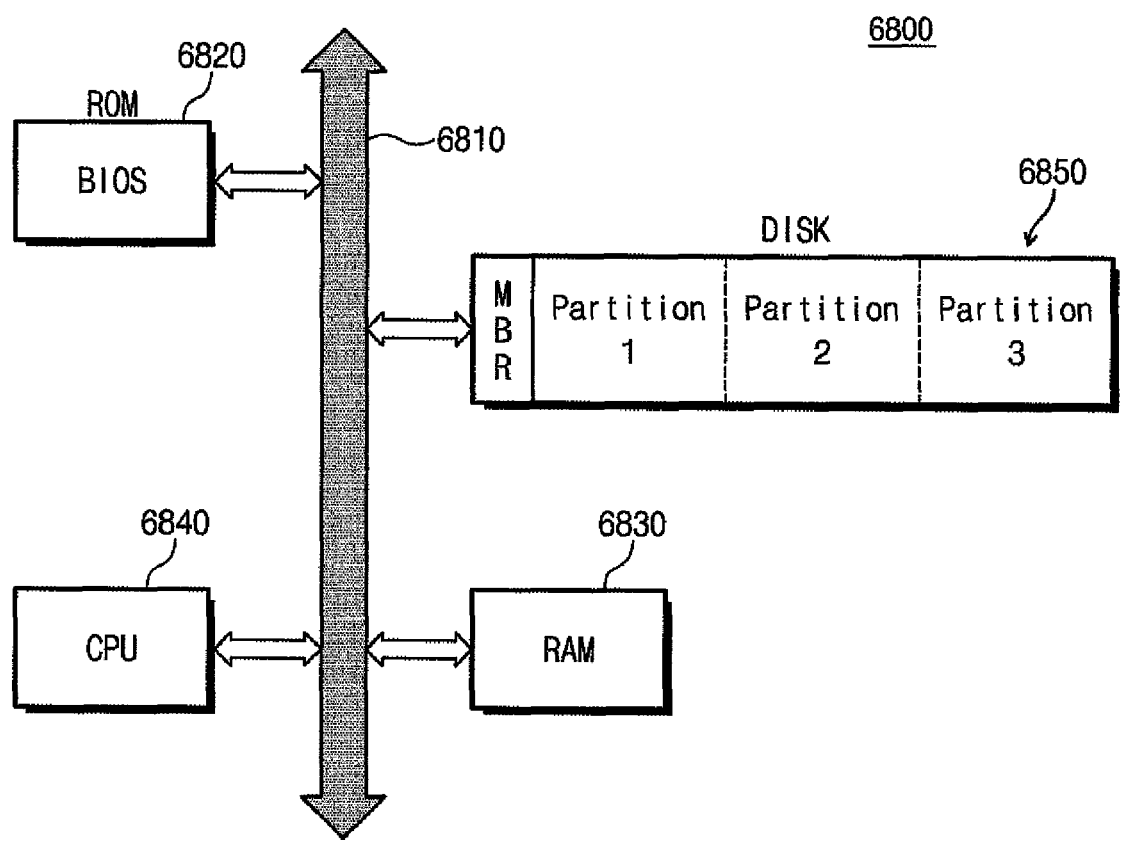
FIG. 30 is a system level diagram of a memory system according to one or more embodiments of the inventive concepts.

FIG. 30 is a block diagram of a user device (or, computer system) according to an embodiment of the inventive concepts. As shown, the user device 6800 includes a bus system 6810, and a read-only memory (ROM) 6820 which is connected to the bus system 6810 and stores software (e.g., BIOS) utilized to initialize the user device. The user device 6800 also includes a random access memory 6830 which functions as a working memory, a central processing unit 6840, and a solid state memory system 6850 all connected to the bus system 6810. The solid state memory system 6850 includes solid state memory and a controller (e.g., see FIG. 19). Also, in the example illustrated in FIG. 30, the solid state memory system 6850 includes a Master Boot Record and is logically divided into plural partitions. As described in connection with previous embodiments herein, the controller of the solid state memory system 6850 is configured to logically partition the solid state memory, update metadata of the logically partitioned solid state memory, and monitor the updated metadata to locate invalid data stored in the solid state memory system 6850.

The user device 6000 shown in FIG. 19 may also perform an invalidation operation using later-described logging scheme (described in connection with FIGS. 43-47). That is, the user device 6000 may apply a logging scheme by which a position of an area to be deleted is recorded when the size of data to be deleted exceeds a reference size. On the other hand, the user device 6000 may directly invalidate data to be deleted when the size of the data does not exceed a reference size. Moreover, as described later (in connection with FIG. 47), the user device 6000 may perform an invalidation operation depending on whether general data is deleted or security data is deleted.

Embodiments in accordance with one or more of the inventive concepts will be now be described with reference to FIGS. 31-42 in which a user device executes a recovery operation.

The data stored in the hard disk or the semiconductor memory device may be erased by command of the user. In general, erasing of the data is performed in order to increase storage capacity of the hard disk or the semiconductor memory device. However, there occur cases where the erased data should be recovered. For example, the data may be accidentally erased by the user.

Typically, an erase operation is performed by the file system (e.g. FAT). The file system supplies an erase command to the hard disk and/or the semiconductor memory device. However, after the erase command is issued, the user may desire to recover the erased data.

Figure 31:
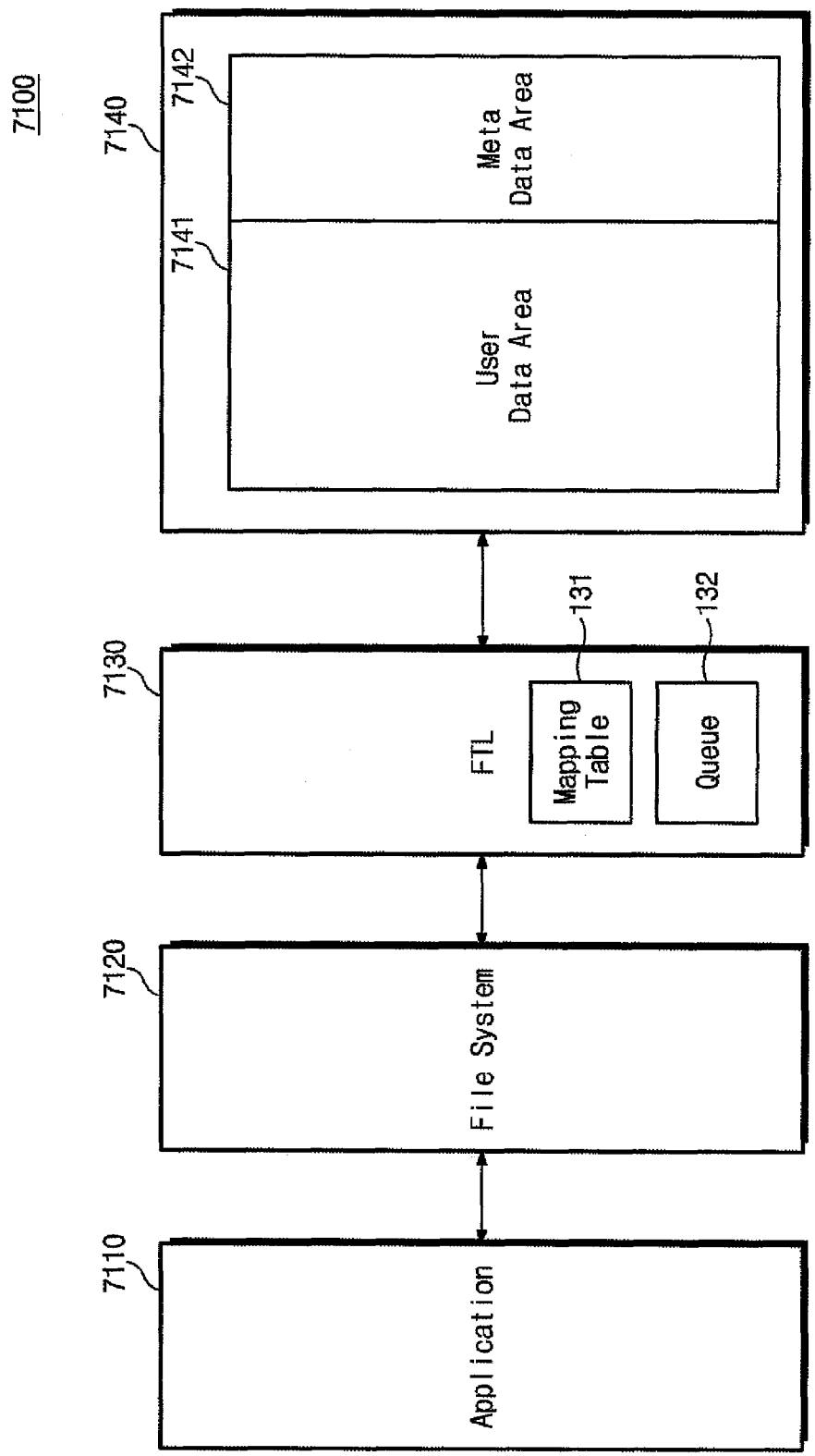
FIG. 31 illustrates a block diagram of a software structure of a memory system according to one or more embodiments of the inventive concepts.
Figure 32:
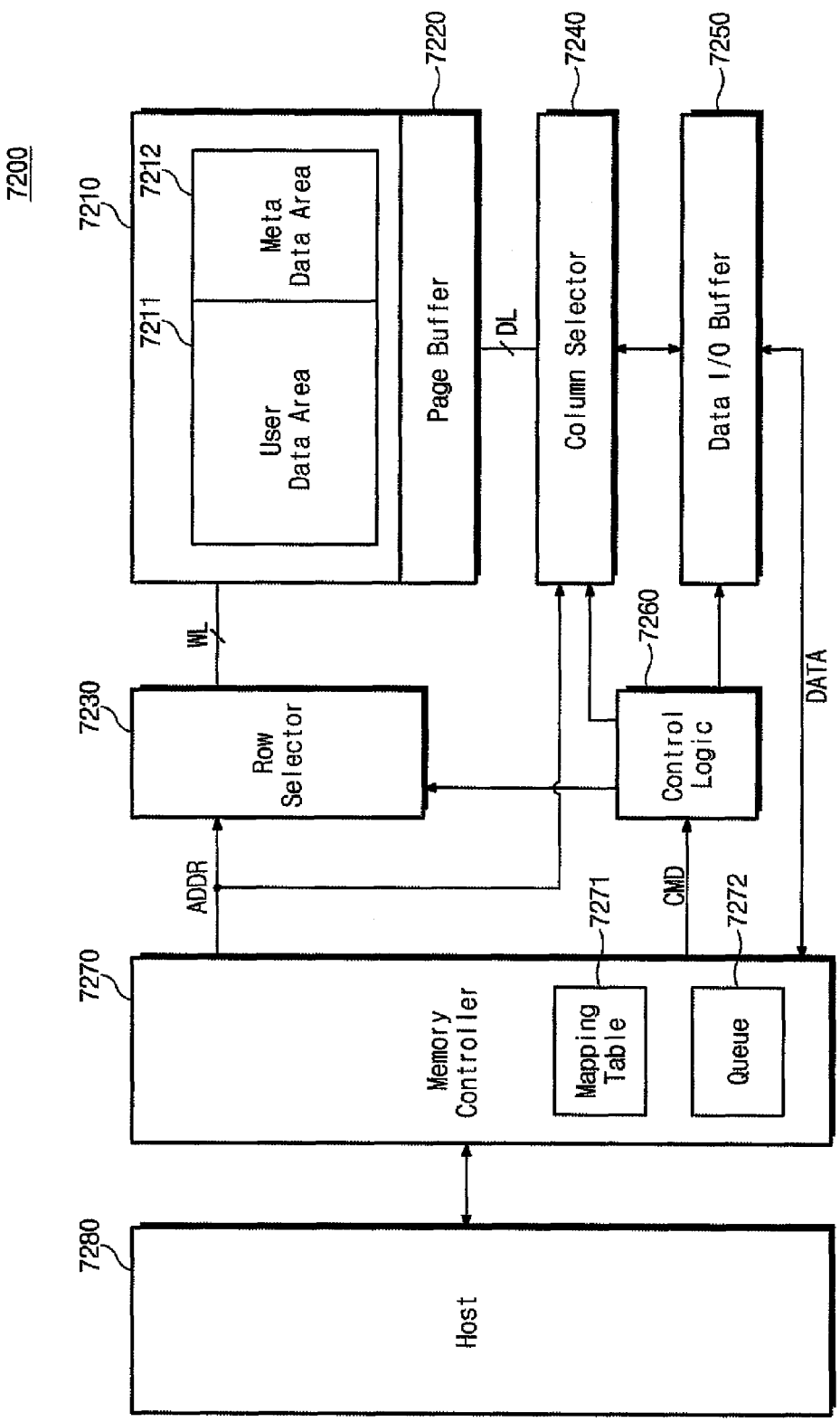
FIG. 32 illustrates a block diagram of a hardware structure of a memory system including a semiconductor memory device according to one or more embodiments of the inventive concepts.

FIGS. 31 and 32 illustrate a user device according to an embodiment as software and hardware diagrams, respectively. In particular, FIG. 31 illustrates a block diagram of a software structure of the user device, and FIG. 32 illustrates a block diagram of a hardware structure of the user device including a semiconductor memory device according to an embodiment. The semiconductor memory device may be a flash memory that employs block erase, and each block may include a plurality of physical sectors.

Referring to FIG. 31, the user device may include a file system 7120, which may provide file management for an application 7110. The user device may further include a flash translation layer 7130 and a flash memory 7140. The flash translation layer (FTL) 7130 may be software, firmware, etc., and may help manage the flash memory. The flash translation layer 7130 receives a logical address from the file system 7120, and translates it into a physical address. Here, the logical address may be an address used by the file system 7120, and the physical address may be an address used in the flash memory 7140.

The file system 7120 may receive a command from the application 7110. The command from the application 7110 may include, e.g., a data store command, a data read command, a data move command, a data delete command, a data recover command, etc. The file system 7120 may transfer a logical address of data to be processed to the flash translation layer 7130.

The flash translation layer 7130 may receive the logical address from the file system 7120. The flash translation layer 7130 may translate the logical address into a physical address. The flash translation layer 7130 may make reference to an address mapping table for the address translation. The address mapping table may include a plurality of mapping data, each of the mapping data defining a correspondence relation between logical and physical addresses. The physical address may be supplied to the flash memory 7140.

The flash memory 7140 may be divided into a meta data area 7142 and a user data area 7141. User data, e.g., text, image, and voice data, may be stored in the user data area 7141. Information associated with the user data may be stored in the meta data area 7142. For example, location information of the user data may be stored in the meta data area 7142. The file system 7120 may make reference to the meta data area 7142 to find the storage location of the user data.

According to an exemplary embodiment, the flash translation layer 7130 may include a queue 7132. The queue 7132 may be a type of buffer that processes data in a first-in-first-out (FIFO) manner, such that data that is input first is output first. In an implementation, data registered in the queue, i.e., already input to the queue, may be cancelled from the queue prior to being output, as described in detail below. According to an embodiment, the flash translation layer 7130 may use the queue 7132 to prevent data from being destroyed due to a merge and/or erase operation, as described in detail below with reference to the drawings.

Referring to FIG. 32, a user device 7200 includes a host 7280, a memory controller 7270, and at least one flash memory device. The flash memory device may include a memory cell array 7210, a page buffer 7220, a row selector 7230, a column selector 7240, a data input/output circuit 7250, and a control logic 7260.

The memory cell array 7210 may include a plurality of memory cells. The memory cell array 7210 may be divided into a user data area 7211 and a meta data area 7212. User data such as text, voice and image may be stored in the user data area 7211. Meta data associated with the user data may be stored in the meta data area 7212. For example, the meta data area 7212 may store location information of the user data. The memory cell array 7210 may include memory cells arranged in a matrix of rows (word lines) and columns (bit lines). The memory cells may be arranged to have a NAND structure or a NOR structure.

The page buffer 7220 may operate as a sense amplifier or a write driver. During a read operation, the page buffer 7220 may read data from the memory cell array 7210. During a program operation, the page buffer 7220 may drive the bit lines with the power voltage or the ground voltage according to data input via the column selector 7240, respectively.

The row selector 7230 may be connected to the memory cell array 7210 via the word lines. The row selector 7230 may be controlled by the control logic 7260. The row selector 7230 may drive a selected row and unselected rows to corresponding word line voltages in response to the row address. For example, during a program operation, the row selector 7230 may drive the selected row with a program voltage Vpgm and drive the unselected rows with a pass voltage Vpass, respectively. During a read operation, the row selector 7230 may drive the selected row to a read voltage Vread and drive the unselected rows to a pass voltage Vpass, respectively.

The column selector 7240 may transfer data from the data input/output buffer 7250 to the page buffer 7220, or from the page buffer 7220 to the data input/output buffer 7250, in response to the column address supplied from a column address generator (not shown).

The data input/output buffer 7250 may transfer data input from the memory controller 7270 to the column selector 7240, or the data input/output buffer 7250 may transfer data input from the column selector 7240 to the memory controller 7270.

The control logic 7260 may be configured to control the entire operation of the flash memory device. For example, the control logic 7260 may be configured to control program, read, and erase operations of the flash memory device.

The memory controller 7270 may include a mapping table 7271 and a queue 7272. The flash translation layer 7130 of FIG. 31 may be performed in the form of firmware in the memory controller 7270. The mapping table 7271 may store relationships setting forth the correspondence between the logical address and the physical address. The mapping table 7271 may be used so that the flash translation layer 7130 can translate the logical address input from the host 7280 into the physical address. The flash translation layer 7130 may transfer the physical address to the flash memory device.

The queue 7272 may be a type of buffer for storing data according to a first-in-first-out (FIFO) manner, such that data input first in the queue 7272 is output first. The size of the queue 7272 may be varied according to the particular implementation. According to an embodiment, the queue 7272 may be used to delay invalidation of the mapping data, and/or to prevent data loss due to merge and/or erase operations.

According to the above described configuration, the user device 7200 according to an embodiment may be used to recover deleted data. A data recovery method according to an embodiment is described below with reference to the drawings.

Figure 33:
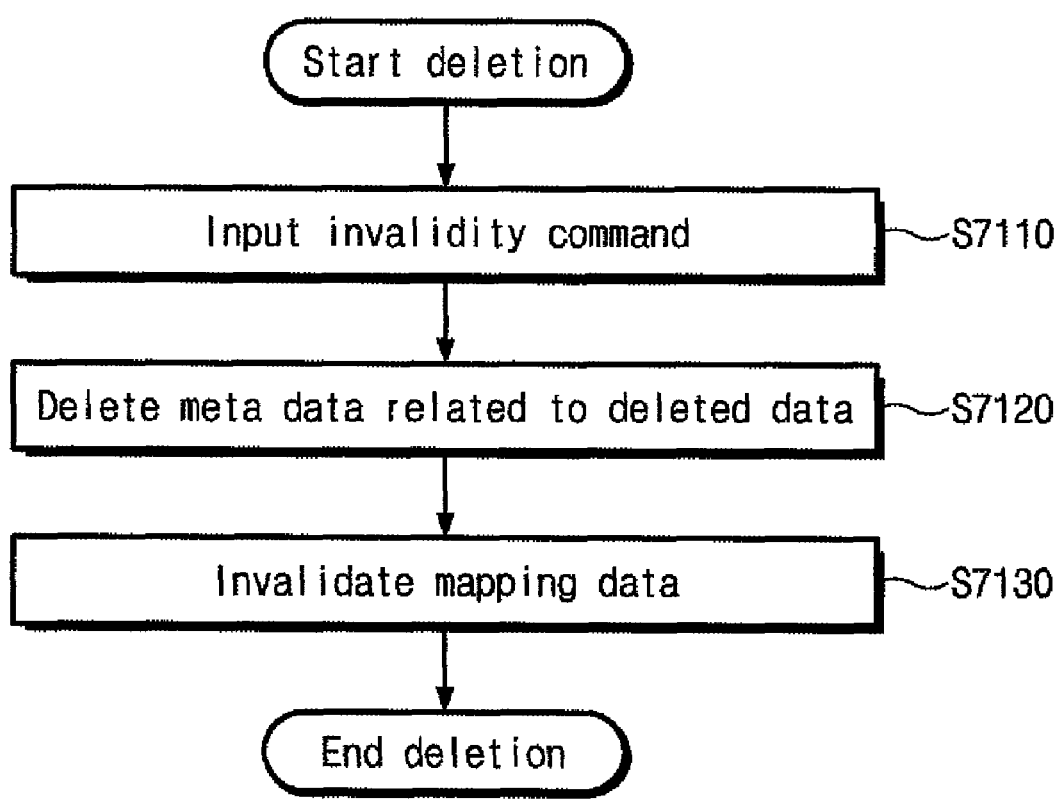
FIG. 33 illustrates a flowchart of a data delete operation according to one or more embodiments of the inventive concepts.

FIG. 33 illustrates a flowchart of a data delete operation. Referring to FIG. 33, the data erase operation may include three operations S7110 to S7130. In operation S7110, an Invalidity Command may be input from the application 7110 executing on the host 7280 of FIG. 32. In operation S7120, the file system 7120 deletes the meta data of data to be deleted in response to the Invalidity Command. The file system 7120 may be performed on the host 7280 of FIG. 32, e.g., the file system 7120 may be included in the operating system. In operation S7130, the flash translation layer 7130 invalidates mapping table location(s) corresponding to data to be deleted. The method in which the meta data is deleted and the method in which the mapping data (data to be deleted) is invalidated are described below with reference to the drawings.

Figure 34:
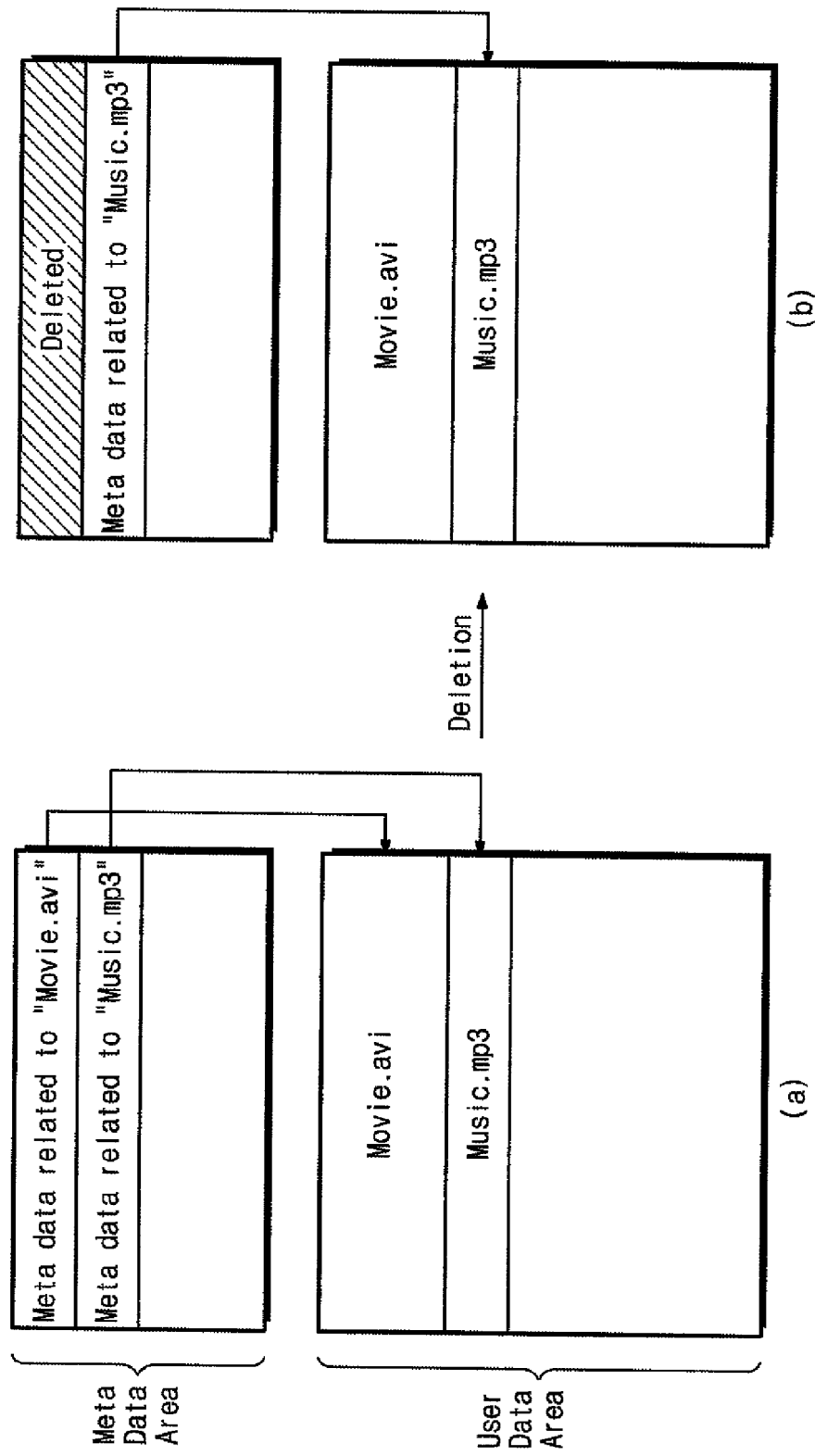
FIG. 34 illustrates a concept map of a method in which meta data is deleted during a data deletion according to one or more embodiments of the inventive concepts.

FIG. 34 illustrates a concept map of a method in which meta data is deleted during data deletion. Side (a) of FIG. 34 is before the meta data is deleted, and side (b) of FIG. 34 is after the meta data is deleted. Referring to side (a), user data titled "Movie.avi" and "Music.mp3" are stored in the user data area. The respective meta data corresponding to the user data are stored in the meta data area. The respective meta data may include data regarding the storage location of the user data. Accordingly, the file system 7120 may manage user data with reference to the corresponding meta data.

In the case that a command for deletion of the user data titled "Movie.avi" is input from the application 7110, the file system 7120 may delete only the meta data corresponding to the user data. The file system 7120 does not delete the user data at this point. Thus, referring to side (b) of FIG. 34, it can be seen that only meta data is deleted. From the perspective of the file system 7120, the user data titled "Movie.avi" is deleted. However, the user data remains in the user data area even after it is deleted, and is managed as described below. As set forth above, only the corresponding relation between the meta data and the user data is destroyed. Therefore, in case the data is to be recovered, the user data may be accessed normally, e.g., if the deleted meta data is recovered.

FIG. 35 illustrates a block diagram of a method in which mapping data corresponding to the data to be deleted is invalidated during a data delete operation. Side (s) of FIG. 35 illustrates a mapping table before data deletion, and side (b) of FIG. 35 illustrates the mapping table after data deletion. In the illustrated example, it is assumed that physical sectors PSN 1 to PSN 10 correspond to data to be deleted, i.e.,, the data to be deleted is stored in the physical sectors PSN 1 to PSN 10. Referring to side (a), the flash translation layer 7130 matches the logical sector number with the physical sector number with reference to the mapping table 131 (FIG. 31). For example, the logical sector LSN 1 corresponds to the physical sector PSN 1. Also, the mapping table 7131 stores information indicating whether the physical sector is valid. For example, the physical sectors PSN 1 to PSN 10 are designated as valid.

In the case that a delete command for the data is input from the file system 7120, the flash translation layer 7130 invalidates the mapping data that correspond to the data to be deleted. Referring to side (b) of FIG. 35, it can be seen the physical sectors PSN 1 to PSN 10 are invalidated in the illustrated example. Accordingly, the flash translation layer 7130 cannot translate the logical sectors LSN 1 to LSN 10 into physical sectors PSN 1 to PSN 10, respectively. Also, this means that the flash translation layer 7130 can allot the physical sectors 1 to 10 to store other data.

Since only the physical sector may be invalidated by a delete operation, data stored in the physical sector is not actually erased at this point. Therefore, the data still exists for a period of time after the delete command is performed. Thus, if recovery for the data is required, the data may be recovered normally, e.g., if the invalidated physical sector is validated, i.e., un-invalidated.

As described above, in the case that the data is deleted, the deletion of the meta data by the file system 7120 and the invalidation of the mapping data by the flash translation layer 7130 may be performed simultaneously. As a result, the user data may not actually be deleted. Rather, the delete operation may result in deletion of the meta data and invalidation of the mapping data. Accordingly, the user data may be recovered, e.g., by recovering the meta data and validating the mapping data.

When the invalidated physical sector increases, the capacity of the flash memory device decreases. In order to increase the storage capacity, the flash memory device collects valid physical sectors internally, stores data in collected physical sectors in another physical sector, and erases the invalidated physical sectors. This is called a merge operation. The merge operation may result in the loss of data in an invalidated physical sector. Also, the data stored in the physical sector may be lost by a delete command issued from an external source.

Figure 36:
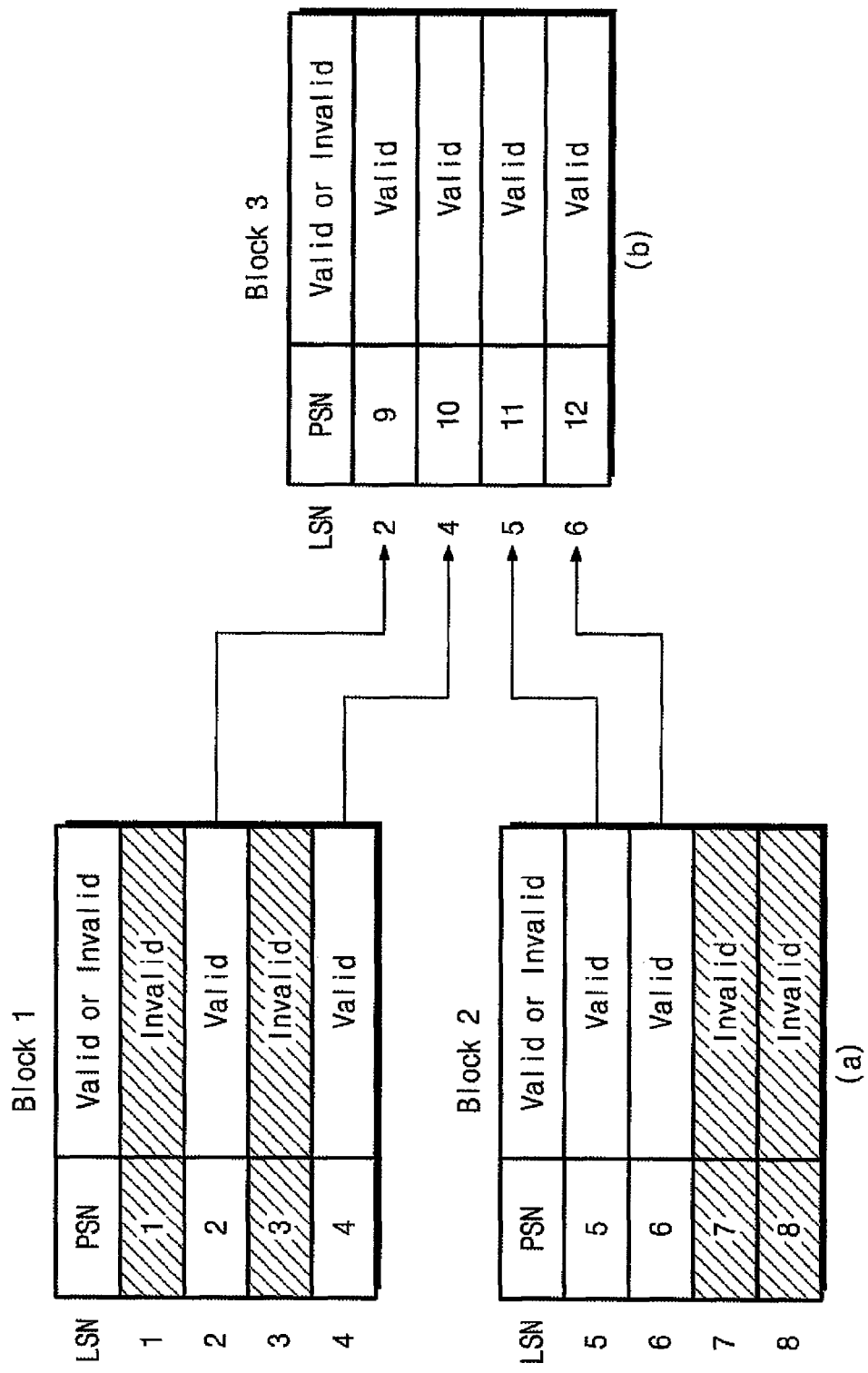
FIG. 36 illustrates concept maps of a merge operation, where side-a of the figure illustrates a mapping table before the merge operation, and side-b of the figure illustrates a mapping table after the merge operation, according to one or more embodiments of the inventive concepts.

FIG. 36 illustrates a concept map of a merge operation. Side (a) of FIG. 36 illustrates a mapping table before the merge operation, and side (b) of FIG. 36 illustrates a mapping table after the merge operation. Referring to side (a), in the illustrated example, the first and third physical sectors of the first block Block 1 and the seventh and eighth physical sectors of the second bock Block 2 are assumed to be invalidated. The invalidated blocks are to be merged.

Referring to side (b) of FIG. 36, only valid sectors of Block 1 and Block 2 are stored in Block 3 by the merge operation. Block 1 and Block 2 are then erased. In the case that the physical sector is erased by a merge operation, previously stored data is lost permanently. The erased blocks may be allotted to store other data by the flash translation layer 7130.

The merge operation may be performed without interaction with the file system 7120. For example, the merge operation may be performed in the background time with no command from the file system 7120, in order to improve performance of the system. Accordingly, the invalidated sector is in danger of being erased by the merge operation at any time. Accordingly, in order to recover the data stored in the physical sector, the merge operation for the physical sector should be controlled to delay data destruction.

The semiconductor memory device according to an embodiment may delay invalidation of mapping data, and/or delay erase and/or merge operations on the invalidated physical sector.

According to embodiments, an invalid delay queue may be used in order to delay invalidation of the mapping data. Physical sectors to be invalidated may be registered sequentially in the invalid delay queue. When the invalid delay queue is full and an additional physical sector is to be registered, the first-registered physical sector may be unregistered in the FIFO sequence. The unregistered physical sector is invalidated. By delaying invalidation of the mapping data according to an embodiment, the data stored in the physical sector may be recoverable for a period of time after the execution of a delete command. The size of the invalid delay queue may be varied according to the particular implementation. For example, if the size of the invalid delay queue is larger, then the invalidation of mapping data may be delayed for a longer period of time. If the size of the invalid delay queue is smaller, then the invalidation of mapping data may be delayed for a shorter period of time.

Figure 37:
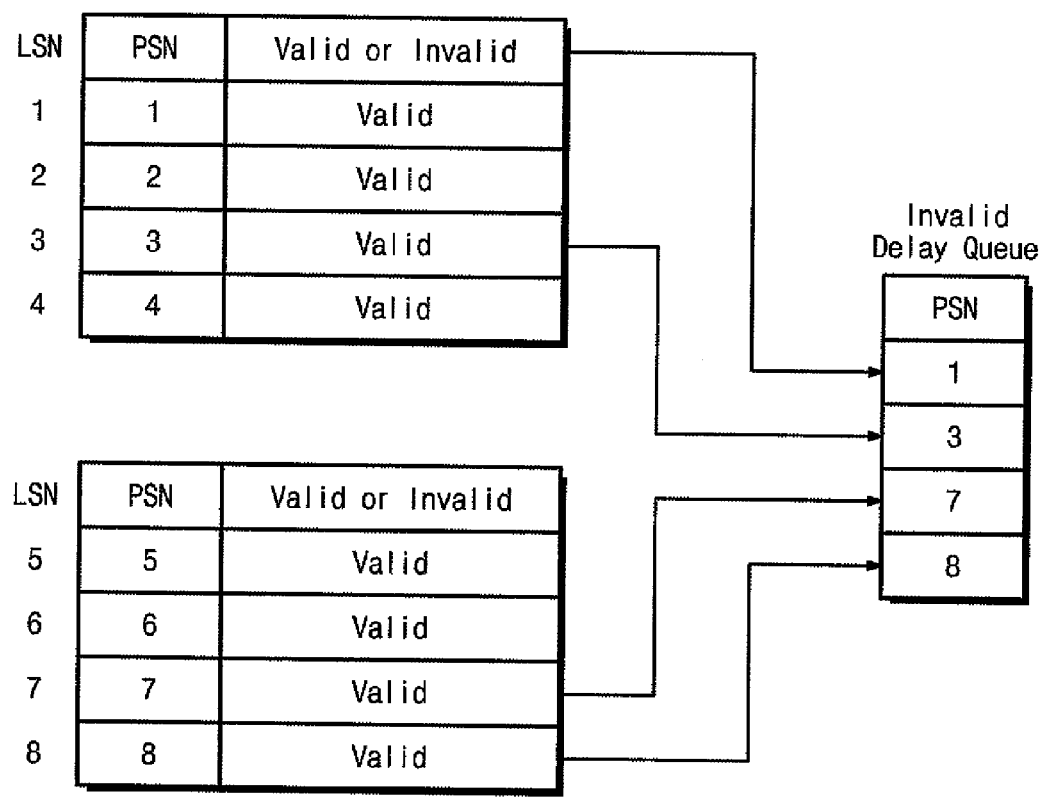
FIG. 37 illustrates a concept map of a management method of an invalid delay queue according to one or more embodiments of the inventive concepts.

FIG. 37 illustrates a concept map of a management method of an invalid delay queue. Referring to FIG. 37, it is assumed that physical sectors PSN 1, PSN 3, PSN 7, and PSN 8 are invalidated sequentially by a data delete operation in the illustrated example. According to an embodiment, the physical sectors PSN 1, PSN 3, PSN 7, and PSN 8 are not invalidated immediately by a delete operation, but rather are registered in the invalid delay queue. In detail, the physical sector PSN 1 is registered in the invalid delay queue. Here, the invalid delay queue stores not the data stored in the physical sector PSN 1, but only the location of the physical sector. The physical sectors PSN 3, PSN 7, and PSN 8 are registered in the invalid delay queue sequentially in the same way.

The flash translation layer 7130 does not invalidate the physical sectors that are registered in the invalid delay queue. Accordingly, the physical sectors PSN 1, PSN 3, PSN 7, and PSN 8 are maintained to be valid while in the invalid delay queue. When the invalid delay queue is full and another physical sector is to be registered therein, the first-registered physical sector PSN 1 is unregistered in the FIFO order. The physical sector that is unregistered from the invalid delay queue is invalidated. After being unregistered from the invalid delay queue, the invalidated physical sector may then be merged or erased.

Figure 38:
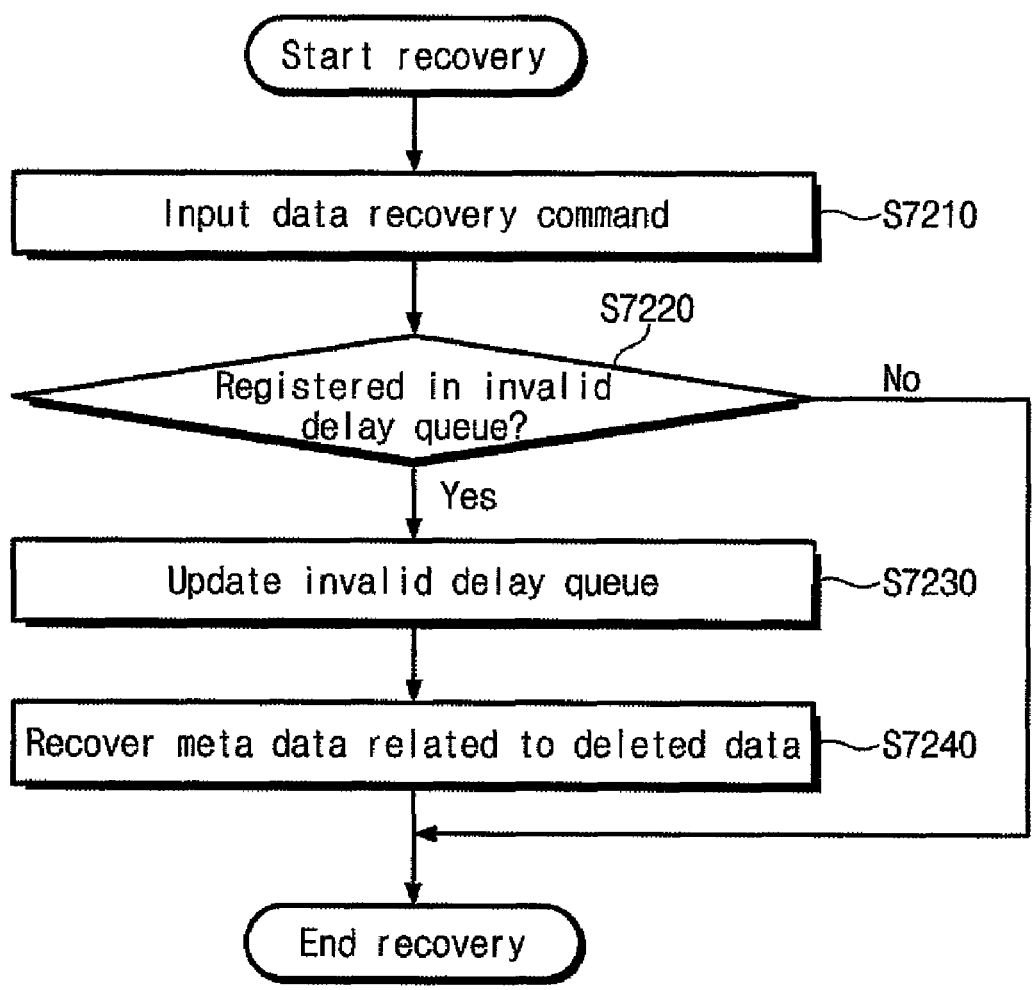
FIG. 38 illustrates a flowchart of a data recovery method using the invalid delay queue of FIG. 37 according to one or more embodiments of the inventive concepts.

FIG. 38 illustrates a flowchart of a data recovery method using the invalid delay queue. Referring to FIG. 38, the data recovery method according to an embodiment may include four operations S7210 to S7240.

In operation S7210, a data recovery command may be provided to the file system 7120, e.g., by the application 7110. The file system 7120 transfers a data recovery command to the flash translation layer 7130. In operation S7220, the flash translation layer 7130 determines whether the mapping data corresponding to data to be recovered is registered in the invalid delay queue. In the case that the mapping data corresponding to the data to be recovered is determined to be registered in the invalid delay queue, the procedure goes to operation S7230. If the mapping data is not registered in the invalid delay queue, the data recovery is completed, and the data may not be recoverable. In the operation S7230, the flash translation layer 7130 cancels registration of the mapping data corresponding to the data to be recovered from the invalid delay queue. In operation S7240, the file system 7120 recovers meta data of the data to be recovered.

By recovering the meta data corresponding to the deleted data by the above described method, the user data may be recovered stably. The order of performing meta data recovery and the renewal of the invalid delay queue may be varied. For example, the invalid delay queue may be renewed after the meta data is first recovered.

In the above embodiment, the invalidation of the mapping data is delayed using the invalid delay queue. However, in the case of an already-invalidated physical sector, the data stored in the physical sector may also be protected by preventing merge and/or erase operations from being performed thereon. In particular, in another embodiment, a merge/erase prevention queue is used to prevent merge and/or erase operations for the invalidated physical sector. The invalidated physical sector may be registered in the merge/erase prevention queue and, while registered in the merge/erase prevention queue, is not merged or erased. Accordingly, the data stored in the physical sector may be maintained for a period of time. The size of the merge/erase prevention queue may be varied according to the particular implementation. For example, if the size of the merge/erase prevention queue is larger, the merge and erase operation of the invalidated physical sector may be delayed for a longer period of time. If the size of the merge/erase prevention queue is smaller, the merge or erase operations of the invalidated physical sector may be delayed for a shorter period of time.

Figure 39:
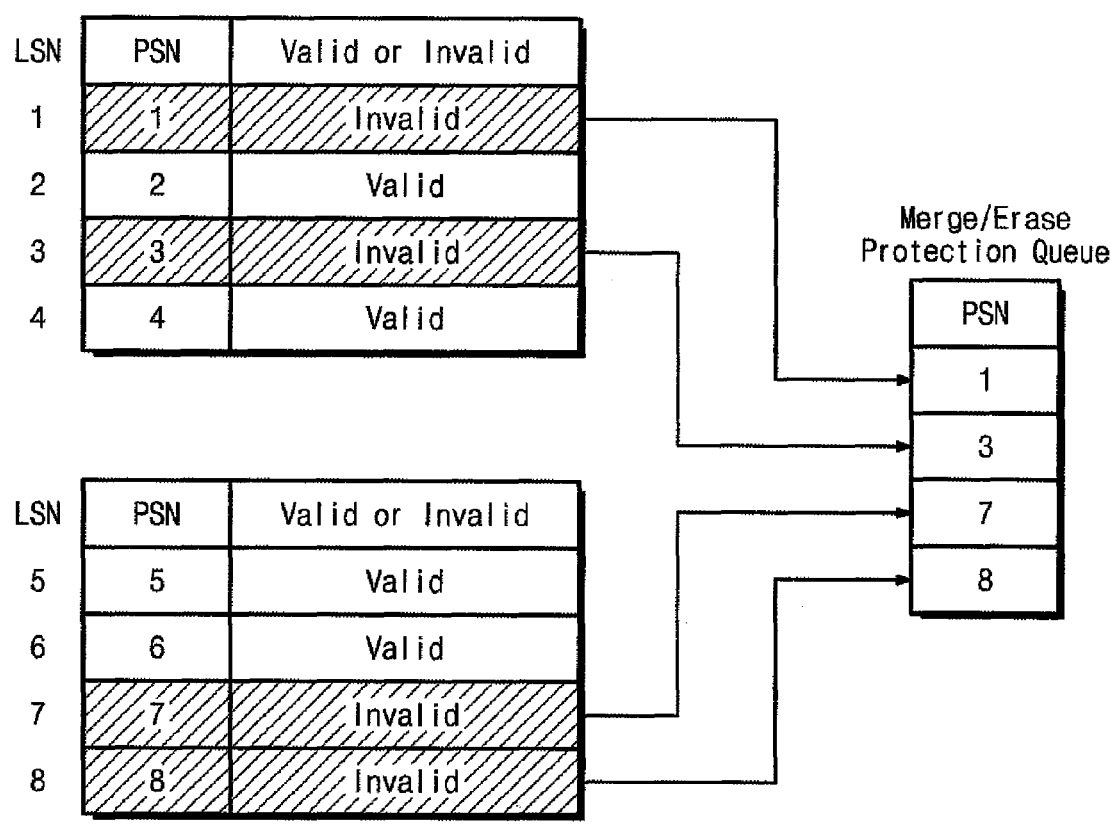
FIG. 39 illustrates a concept map of a management method of a merge/erase prevention queue according to one or more embodiments of the inventive concepts.

FIG. 39 illustrates a concept map of a management method of the merge/erase prevention queue. Referring to FIG. 39, it is assumed that physical sectors PSN 1, PSN 3, PSN 7, and PSN 8 are invalidated sequentially by a data delete operation in the illustrated example. According to an embodiment, the physical sectors PSN 1, PSN 3, PSN 7, and PSN 8 are not invalidated immediately by a delete operation, but rather are registered in the invalid delay queue. In the illustrated example, the physical sector PSN 1 is registered in the invalid delay queue. Here, the invalid delay queue stores not the data stored in the physical sector PSN 1, but rather the location of the physical sector. The physical sectors PSN 3, PSN 7, and PSN 8 are sequentially registered in the invalid delay queue in the same way as PSN 1.

The flash translation layer 7130 does not invalidate physical sectors while they are registered in the invalid delay queue. Accordingly, the physical sectors PSN 1, PSN 3, PSN 7, and PSN 8 are maintained to be valid. When the invalid delay queue is full and another physical sector is to be registered therein, the registration of the first-registered physical sector PSN 1 is cancelled in the FIFO order. The physical sector cancelled from the invalid delay queue is invalidated. The invalidated physical sector is to be merged or erased.

Figure 40:
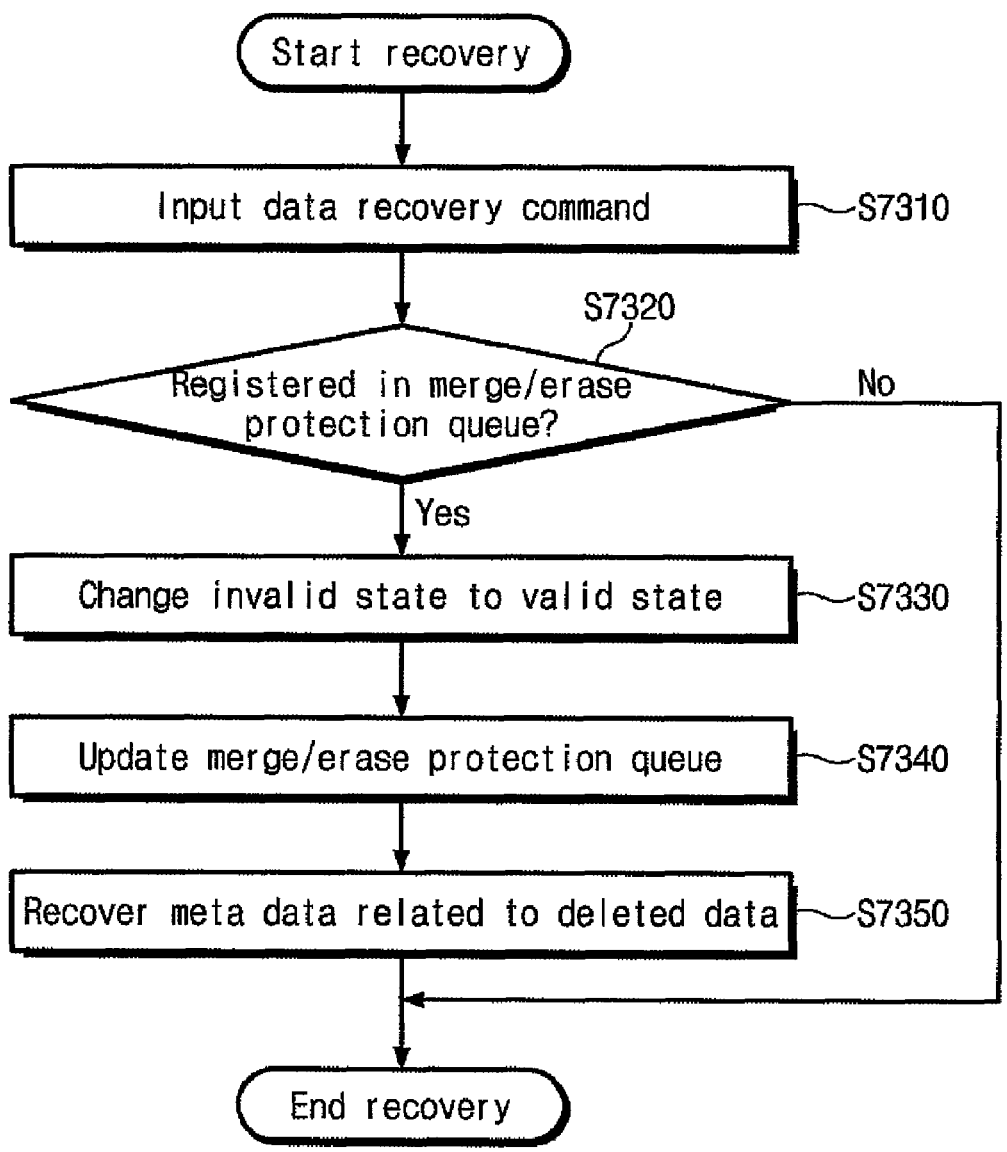
FIG. 40 illustrates a flowchart of a data recovery method using the merge/erase prevention queue of FIG. 39 according to one or more embodiments of the inventive concepts.

FIG. 40 illustrates a flowchart for a data recovery method using the merge/erase prevention queue of FIG. 39. Referring to FIG. 40, the data recovery method may include five operations.

In operation S7310, a data recovery command may be input to the file system 7120, e.g., from the application 7110. The file system 7120 may transfer the data recovery command to the flash translation layer 7130. In operation S7320, the flash translation layer 7130 determines whether mapping data corresponding to data to be recovered is registered in the merge/erase prevention queue. If the mapping data corresponding to the data to be recovered is registered in the merge/erase prevention queue, the procedure goes to operation S7330. If not registered, a data recovery operation is ended, and the data may not be recoverable.

In the operation S7330, the flash translation layer 7130 validates the mapping data corresponding to the data to be recovered via the mapping table. In the operation S7340, the flash translation layer 7130 cancels registration of mapping data corresponding to the data to be recovered from the merge/erase prevention queue. In the operation S7350, the file system 7120 recovers the deleted meta data of the data to be recovered. By delaying the merge and erase operations of the invalidated physical sector according to the above described method, data loss may be prevented. Accordingly, the user data may be recovered stably.

In another embodiment, the invalidated delay queue and the merge/erase prevention queue may be used together. Initially, the invalidation of mapping data may be delayed by the invalid delay queue. Then, by registering the invalidated physical sector in the merge/erase prevention queue, the merge and/or erase operations for the invalidated physical sector may be delayed.

Figure 41:
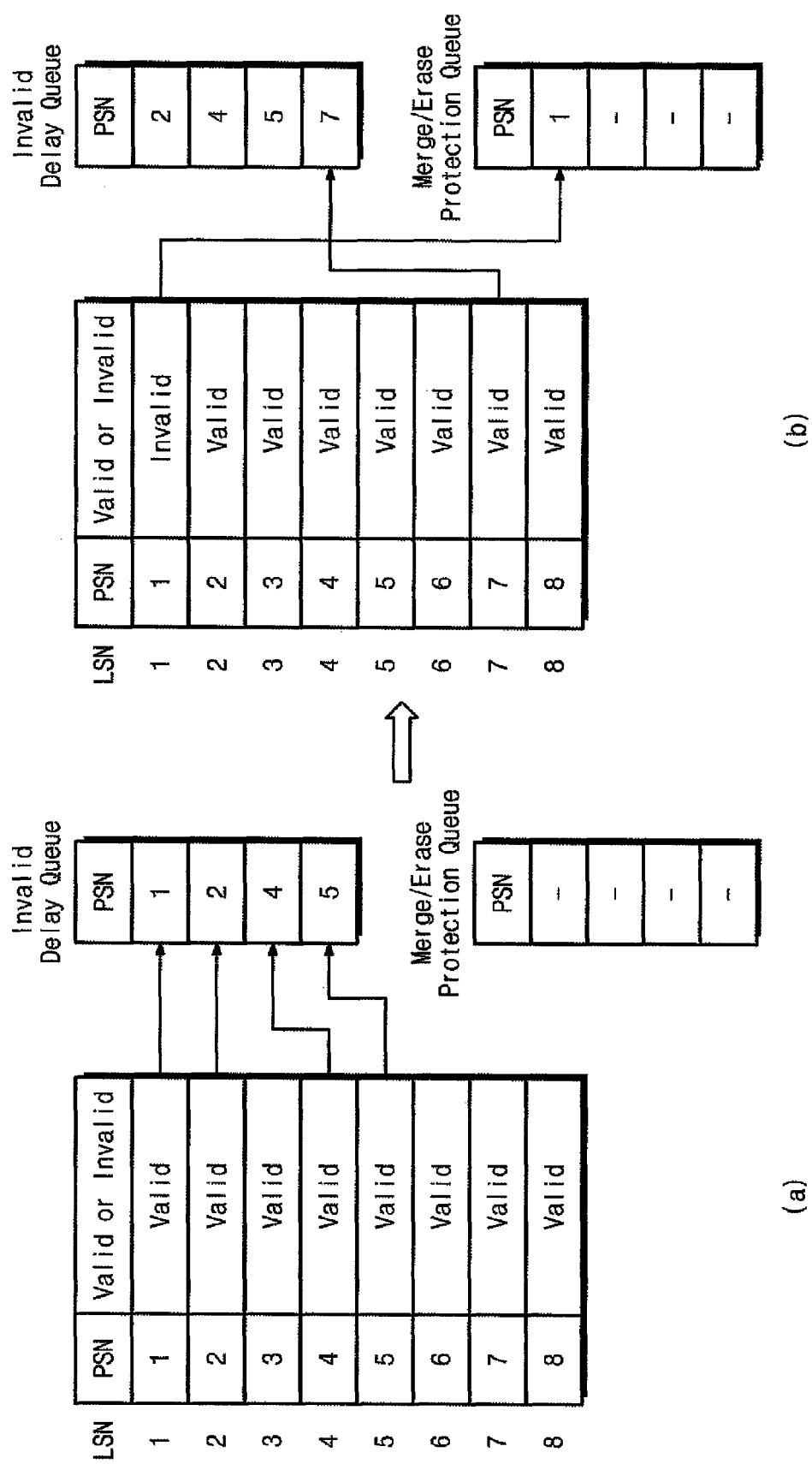
FIG. 41 illustrates concept maps for using an invalidated delay queue and a merge/erase prevention queue together, where side-a of the figure illustrates the case where only the invalid delay queue is used, and side-b illustrates the case where the invalid delay queue and the merge/erase prevention queue are used together, according to one or more embodiments of the inventive concepts.

FIG. 41 illustrates a concept map for a managing method in the case that the invalidated delay queue and the merge/erase prevention queue are used together. Side (a) of FIG. 41 illustrates the case where only the invalid delay queue is used, and side (b) of FIG. 41 illustrates the case where the invalid delay queue and the merge/erase prevention queue area are used together.

In the present embodiment, mapping data corresponding to data to be deleted is registered in the invalid delay queue in order to delay the invalidation. If the invalid delay queue becomes full and additional mapping data is to be registered therein, the registration of the first-registered physical sector may be cancelled sequentially according to a FIFO order. The mapping data whose registration is cancelled from the invalid delay queue may then be registered in the merge/erase prevention queue. The mapping data registered in the invalid delay queue is not to be merged or erased while registered in the invalid delay queue. Accordingly, the data stored in the physical sector is not lost by merge and/or erase operations for a period of time.

In the example illustrated in side (a) of FIG. 41, physical sectors PSN 1, PSN 2, PSN 4, and PSN 5 are invalidated sequentially. According to an embodiment, the physical sectors may be registered in the invalid delay queue before being invalidated. The physical sectors registered in the invalid delay queue are not invalidated while registered in the invalid delay queue. Here, the merge/erase prevention queue is not used yet.

Side (b) of FIG. 41 illustrates the case that the physical sector PSN 7 is registered in the invalid delay queue. If the invalid delay queue becomes full and another physical sector is to be registered therein, the first registered physical sector PSN 1 is canceled according to a FIFO order. The physical sector PSN 1 whose registration is canceled from the invalid delay queue is invalidated. The invalidated physical sector PSN 1 is registered in the merge/erase prevention queue. The physical sector registered in the merge/erase prevention queue is excluded from being merged or erased while registered in the merge/erase prevention queue.

Figure 42:
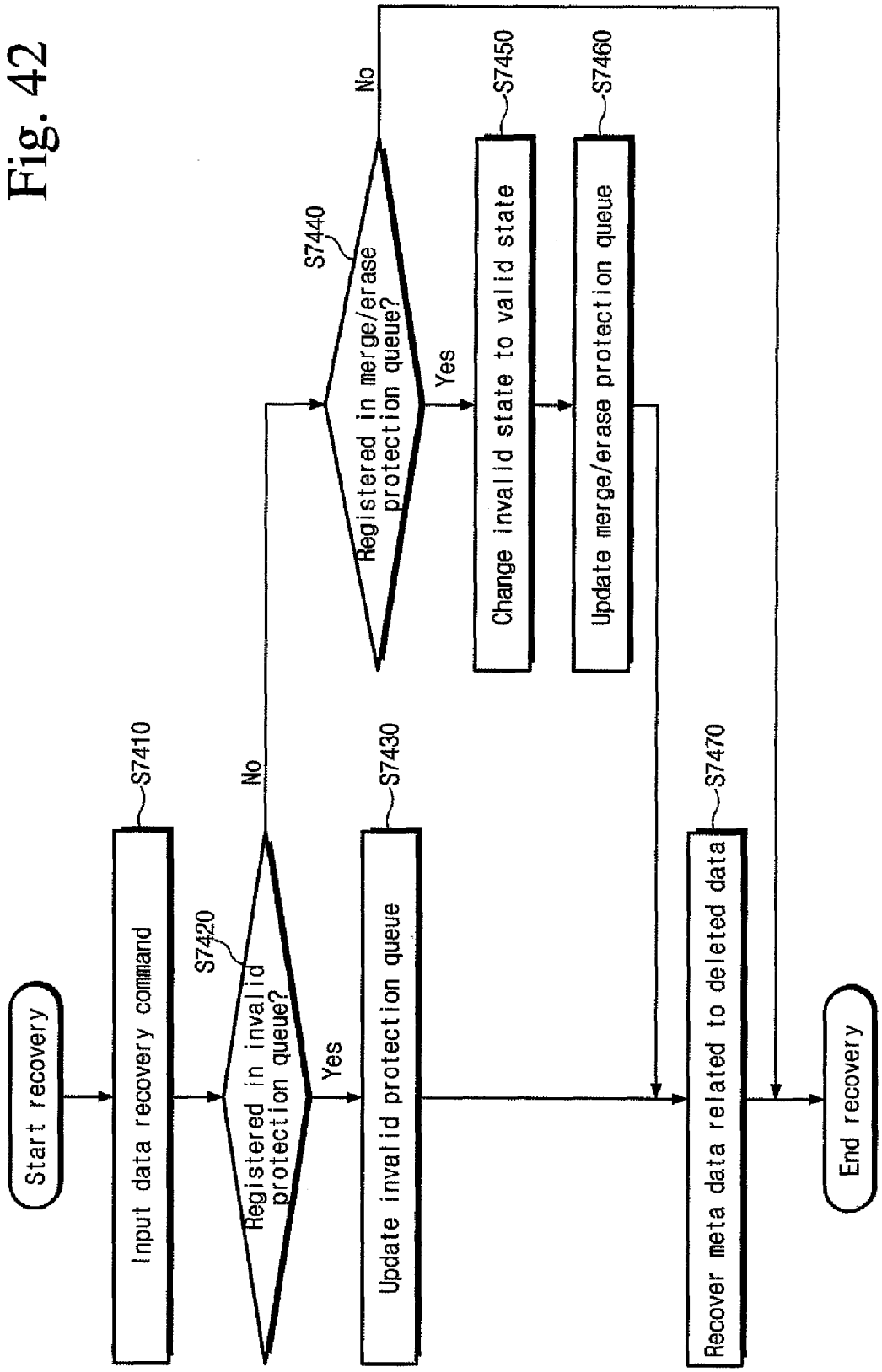
FIG. 42 illustrates a flowchart of a data recovery method using both the invalid delay queue and the merge/erase delay queue of FIG. 41 according to one or more embodiments of the inventive concepts.

FIG. 42 illustrates a flowchart for a data recovery method using both the invalid delay queue and the merge/erase prevention queue. Referring to FIG. 42, the data recovery method according to this embodiment may include seven operations.

In operation S7410, a data recovery command is input to the file system 7120, e.g., from the application 7110. The file system 7120 transfers the data recovery command to the flash translation layer 7130. In operation S7420, the flash translation layer 7130 determines whether mapping data corresponding to data to be recovered is registered in the invalid delay queue. In the case that the mapping data corresponding to the data to be recovered is registered in the invalid delay queue, the procedure goes to operation S7430. If not registered, the procedure goes to operation S7440.

In operation S7430, the flash translation layer 7130 cancels mapping data corresponding to the data to be recovered from the invalid delay queue. In operation S7440, it is determined whether the mapping data corresponding to the data to be recovered is registered in the merge/erase prevention queue. In the case that the mapping data corresponding to the data to be recovered is registered in the merge/erase prevention queue, the procedure goes to operation S7450. If not registered a data recovery is ended, and the data may not be recoverable.

In operation S7450, the flash translation layer 7130 validates the invalidated physical sectors through the mapping table. In operation S7460, the flash translation layer 7130 cancels mapping data corresponding to the data to be recovered from the merge/erase prevention queue. In operation S7470, the file system 7120 recovers the deleted meta data of the data to be recovered.

Data may be recovered by delaying the invalidation of the block corresponding to the deleted data and by delaying merge and erase operations of the physical sector corresponding to the invalidated data, via the above-described method. Thus, a stable data recovery may be achieved. In case of a hard disk that is directly controlled by the file system, the erased data may be restored by a recovery command of the file system, except for the cases that the erased data is physically overwritten. However, in case of a flash memory device, the erase operation may be performed by both the file system and the flash translation layer. Cases that data is not recovered at the system level may occur although the data is recoverable at the flash translation layer level. According to embodiments, a semiconductor memory device like a flash memory device using a translation layer may be provided with a data recovery method.

Embodiments in accordance with one or more of the inventive concepts will be now be described with reference to FIGS. 43-47 in which a user device executes an invalidity operation through utilization of a logging scheme.

Figure 43:
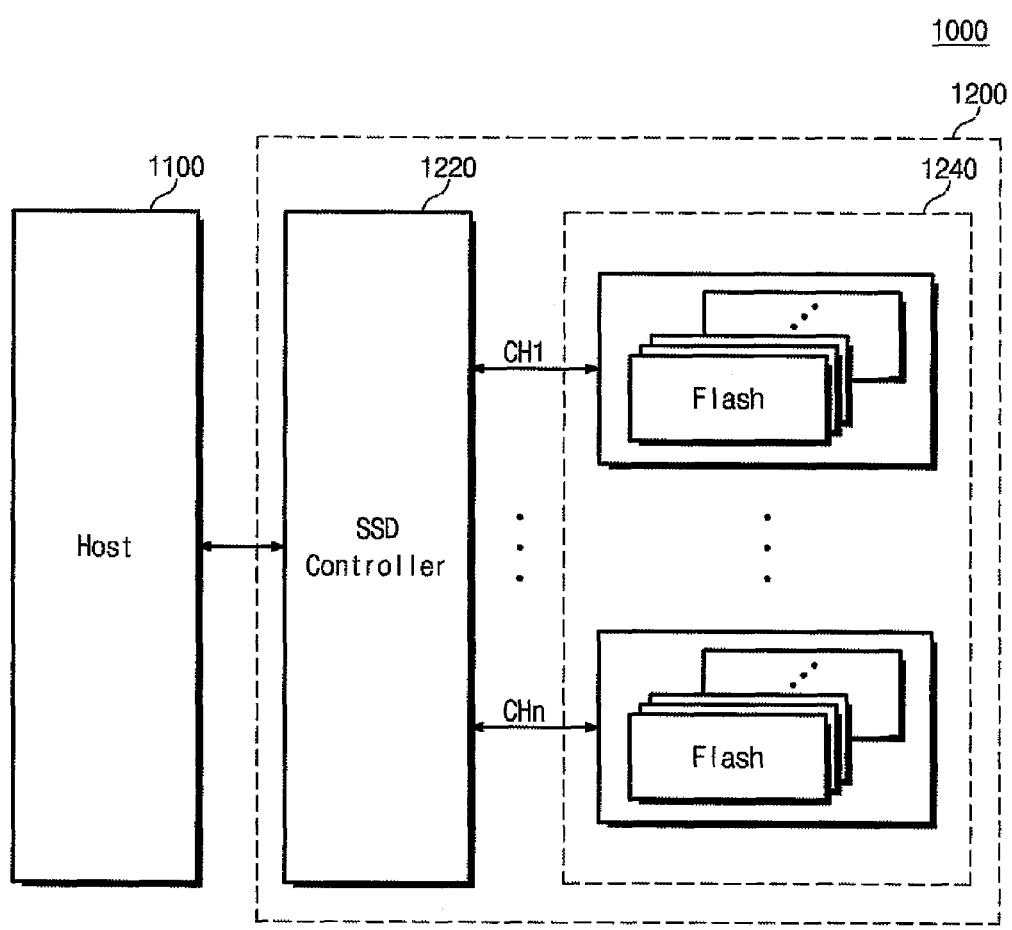
FIG. 43 is a block diagram schematically illustrating a computing system according to one or more embodiments of the inventive concepts.

FIG. 43 is a block diagram schematically illustrating a user device according to one or more embodiments of the inventive concepts.

Referring to FIG. 43, the user device 1000 of the illustrated embodiment includes a host 1100 and a storage device 1200 which operates under control of the host 1100. For example, the host 1100 may include portable electronic devices such as personal/portable computers, personal digital assistants (PDA), portable multimedia players (PMP) and MP3 players, high definition televisions (HDTV) and similar such devices.

In the example of this embodiment, the storage device 1200 is a solid state drive (SSD) including an SSD controller 1220 and flash memory 1240. However, the inventive concepts are not limited to an SSD, and the storage device 1200 may instead be implemented by a flash card, USB memory card, and the like.

In the example of FIG. 43, the flash memory 1240 includes a plurality of flash memory chips which respectively exchange data with the SSD controller 1220 over a number (n) of channels CH1 through CHn. Each of the flash memory chips configuring the memory 1240 may store 1-bit data memory cell or M-bit data per memory cell (M is an integer of two or more). However, the embodiment is not limited to flash memory, and the memory 1240 may instead be configured with other nonvolatile memory chips (e.g., Phase-change Random Access Memory (PRAM), Ferroelectric Random Access Memory (FRAM) and Magnetoresistive Random Access Memory (MRAM)).

The host 1100 may, for example, communicate with the storage device 1200 using a standardized interface, such as PATA, SCSI, ESDI, PCI-Express, SATA, wired USB, wireless USB, and/or IDE interfaces. It will be appreciated that other types of interfaces, including nonstandard interfaces, may be used as well.

When the content (e.g., files) of data stored in the storage device 1200 is deleted at the host 1100, the host 1100 processes metadata associated with the file of the deleted content, thereby invalidating the file of the deleted content. The host 1100 also informs the storage device 1200 of the invalidity or deletion of files. This may be achieved by transmitting a specific command from the host 1100 to the storage device 1200. Hereinafter, this specific command is referred to as an Invalidity Command. The Invalidity Command includes information (e.g., logic address information) for designating a region to be deleted. The Invalidity Command may be referred to by a variety of different names in the industry, including a file delete command, a trim command, an unwrite command and a deletion command.

The processing of metadata for a file to be deleted is performed by the file system of the host 1100. The file system does not delete the actual content of a file, but instead signifies deletion in the metadata of the file. In the example of FAT file systems, a special code is used as the initial character of a file name for indicating a deleted file. For example, the hexadecimal byte code 'E5h' is placed at the position of the initial character of a deleted file name. When the metadata of a file to be deleted is processed in this manner by the file system, it is also necessary for the host 1100 to provide an Invalidity Command to the storage device 1200 so that the content of a deleted file may be invalidated in the storage device 1200.

As will be explained in more detail later herein, when an Invalidity Command is provided from the host 1100, the storage device 1200 records/stores the location of a region (or files) to be deleted according to the Invalidity Command and informs the host 1100 that the execution of a requested command has been completed. The storage device 1200 does not immediately invalidate the regions of the files to be deleted, but instead records/stores the locations of the regions of invalid files.

Figure 44:
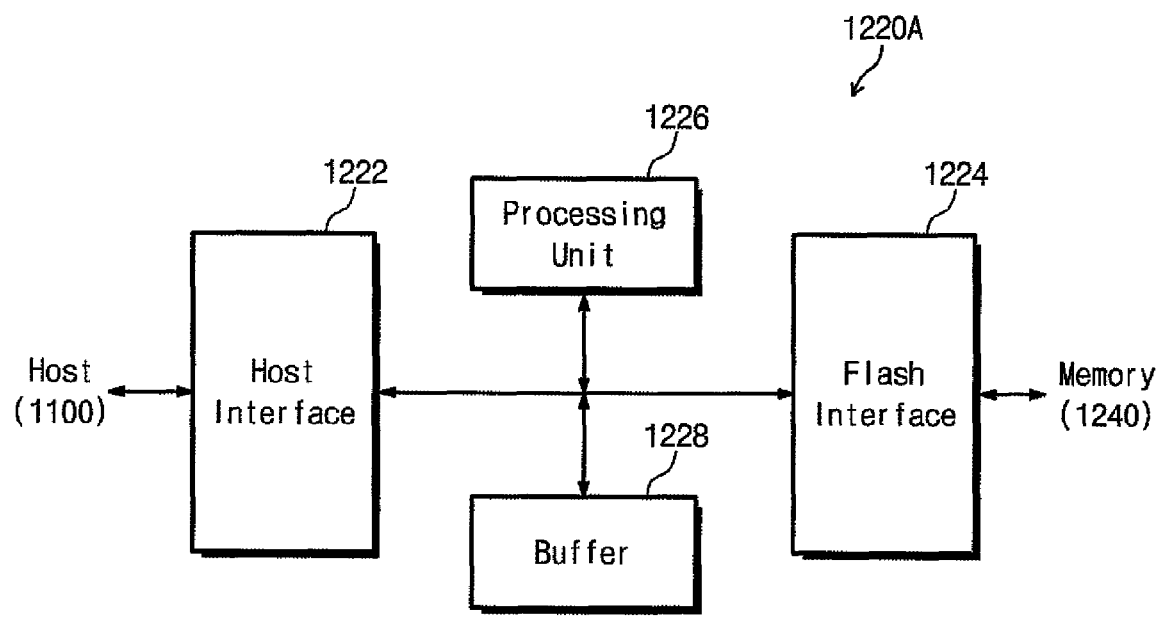
FIG. 44 is a block diagram schematically illustrating controller in FIG. 43 according to one or more embodiments of the inventive concepts.

FIG. 44 is a block diagram schematically illustrating one embodiment of the SDD controller 1220 shown in FIG. 43.

Referring to FIG. 2, the SSD controller 1220A of this example includes a host interface 1222, a flash interface 1224, a processing unit 1226, and a buffer memory 1228. The SSD controller 1220A may include other elements, such as, for example, an error correction unit for detecting and correcting errors in data stored in the memory 1240. The host interface 1222 functions as an interface with the host 1100, and the flash interface 1224 functions as an interface with the memory 1240. The processing unit 1226 controls an overall operation of the SSD controller 1220A, and the buffer memory temporarily stores data to be stored in the memory 1240 and/or data that are read from the memory 1240.

Figure 45:
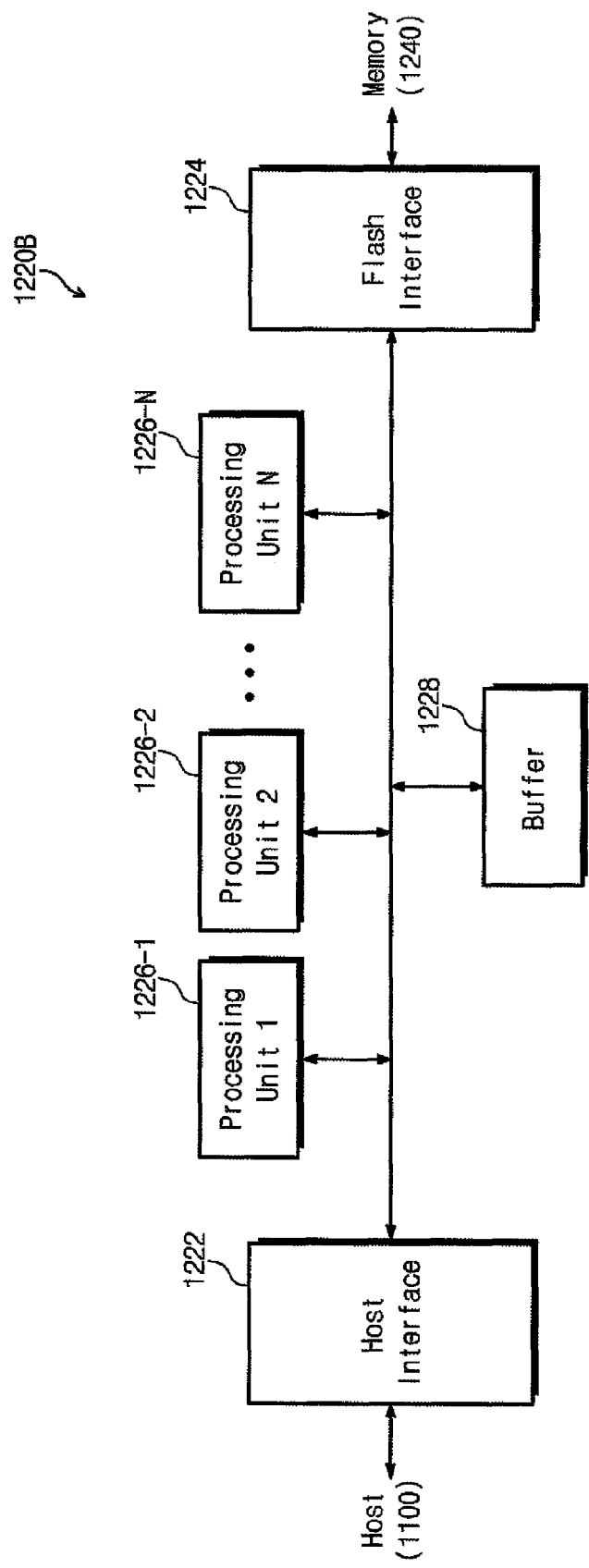
FIG. 45 is a block diagram schematically illustrating another controller in FIG. 43 according to one or more embodiments of the inventive concepts.

FIG. 45 is a block diagram illustrating another example of the controller shown in FIG. 43. Referring to FIG. 45, a SSD controller 1220B may include a host interface 1222, a flash interface 1224, a plurality of processing units 1226-1, 1226-2, . . . , 1226-N, and a buffer memory 1228. The processing units 1226-1, 1226-2, . . . , 1226-N control an overall operation of the SSD controller 1220B. To increase operating speed relative to the example of FIG. 44, processing units 1226-1, 1226-2, . . . , 1226-N of this embodiment operate in parallel to carry out respective control operations of the SSD controller 1220B.

The host interface 1222, the flash interface 1224, the processing units 1226-1, 1226-2, . . . , 1226-N, and the buffer memory 1228 of FIG. 45 are substantially the same as the components described above in connection with FIG. 44. Also, as with the example of FIG. 44, it will be understood that the SSD controller 1220B of FIG. 45 may further include, for example, an error correction code (ECC) unit for detecting and correcting errors in data stored in the storage medium 1240.

Figure 46:
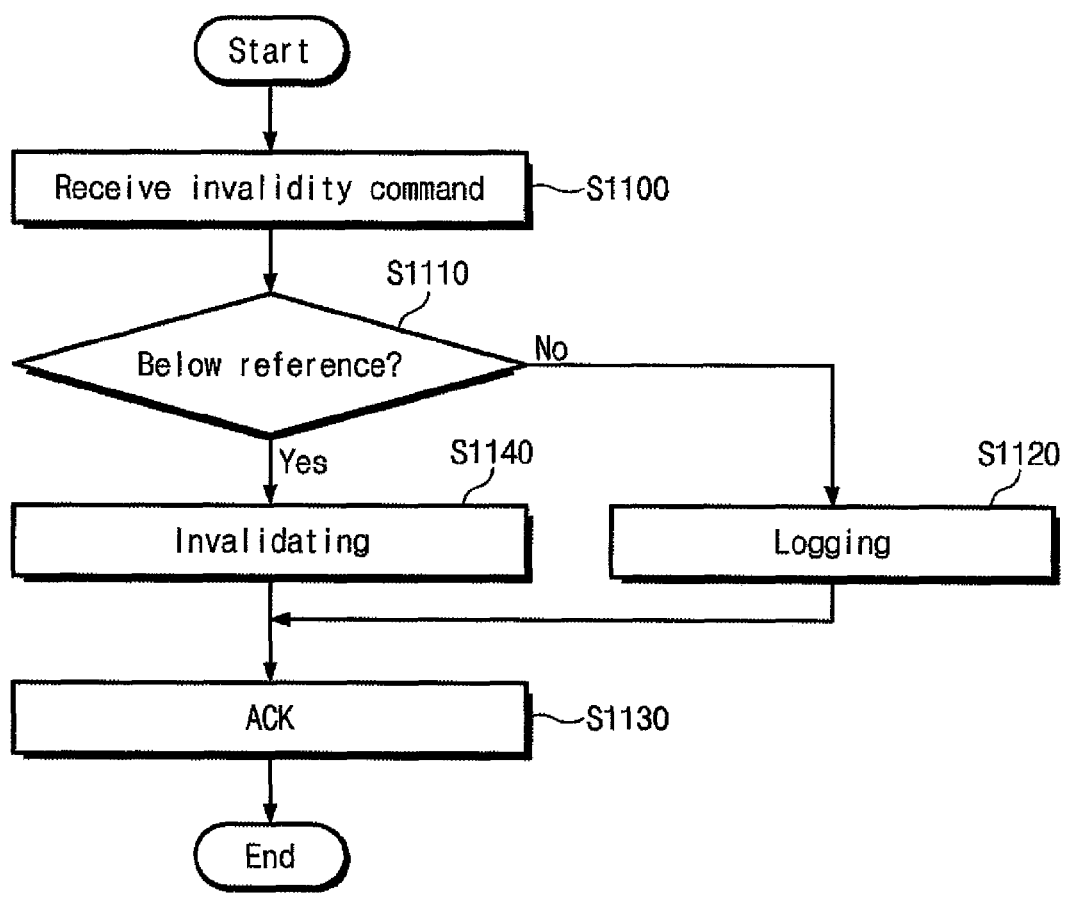
FIG. 46 is a flowchart for describing the operation of a computing system according to one or more embodiments of the inventive concepts.

FIG. 46 is a flowchart for describing an operation of a storage system according to one or more embodiments of the inventive concepts.

As described above, the host 1100 transmits an Invalidity Command to the storage device 1200 when it is necessary to invalidate data stored in the storage device 1200. At operation S 1100, the Invalidity Command is received by the storage device 1200. The Invalidity Command includes information (e.g., logical address information) that indicates the regions of files having invalid content.

At operation S1110, the storage device 1200, i.e., the SSD controller 1220 determines whether the capacity of a region to be deleted exceeds a reference capacity according to the received Invalidity Command.

When the capacity of the region to be deleted exceeds the reference capacity, the SSD controller 1220 records/stores the location of the region to be deleted in operation S 1120. This operation is referred to herein as "logging." After the location of the region to be deleted is recorded, the SSD controller 1220 notifies the host 1100 of that the execution of the Invalidity Command has been completed (ACK) in operation S1130.

The logged information may, for example, be stored in the buffer memory 1228 (e.g., DRAM) of the SSD controller 1220, in the flash memory 1240, or in a separate register. Preferably, however, the logged information is stored in nonvolatile memory to so that the information is not loss in a power-interruption.

The data format of the logged information is not limited. As an example, the logged information may be recorded using a bitmap structure in which each bit position represents a different memory region and in which the value of each bit represents that the region is to be deleted. As another example, the address information of a region to be deleted as indicated by the Invalidity Command may be recorded.

The logged information may, for example, be loaded in the SSD controller 1220 upon power on for execution of the invalidity process original associated with the Invalidity Command(s). Alternatively, or in addition, the logged information may be loaded into the SSD controller 1220 during an idle state of the storage device 1200.

Herein, the invalidity process denotes that data recorded in a region to be deleted are processed as invalid data. The particularities of the invalidity process are not limited, and techniques associated with other relevant embodiments of the inventive concepts may be adopted as part of the invalidity process. For example, the invalidity process may be performed by managing a mapping table in which the mapping between physical blocks and logical blocks is recorded. The invalidity process may be performed by mapping out mapping information for a region to be deleted from the mapping table or marking the region to be deleted on the mapping table. The flash memory chips configuring the memory 1240 may be managed by a Flash Transition Layer (FTL) that is executed by the SSD controller 1220. The management of the mapping table, for example, may be performed by the FTL. The invalidated region of the memory 1240, i.e., invalidated memory blocks may be erased under management of the FTL.

The value of the reference capacity may be variable and may be set in hardware or in software. For example, the reference capacity may be set to vary by updating the firmware (e.g., the FTL) of the storage device 1200. Alternatively, the reference capacity may be variably set by the host 1100. In this case, by storing a specific value that represents a reference capacity in a register (which is used to store the reference capacity) of the host interface 1222 during the recognition operation between the host 1100 and the storage device 1200, the reference capacity may be set. A region to be deleted represents a logical region, and may be changed into a physical region of the memory 1240 by the FTL.

In an exemplary embodiment, the capacity of a region to be deleted according to the Invalidity Command may be limited with the storage device 1200. In this case, the maximum capacity of the region to be deleted according to the Invalidity Command is recorded in the storage device 1200. The host 1100 generates the Invalidity Command on the basis information representing the maximum capacity of the region (which is recorded in the storage device 1200) to be deleted.

Returning to FIG. 46, when the capacity of the region to be deleted does not exceed the reference capacity, the computing system proceeds to operation S1140. The SSD controller 1220 immediately processes data, which are recorded in the region to be deleted, as invalid data without recording (logging) the location of the region to be deleted in operation S 1140. As described above, this invalidity process may be performed by mapping out mapping information for the region to be deleted from the mapping table or marking the region to be deleted on the mapping table. After the invalidity processing, the SSD controller 1220 notifies the host 1100 that execution of the Invalidity Command has been completed (ACK) in operation S1130.

The storage device 1200 may quickly process the Invalidity Command within the given/limited time (e.g., time taken in processing a command from the host 1100) of the host 1100 regardless of the capacity of the region to be deleted, through the above-described logging scheme. Moreover, programming and erasing operations for an invalidated region may be prevented from being unnecessarily performed. The storage device 1200 may perform a background operation during a spare time (i.e., the difference between given/limited time and substantial command processing time) that occurs when quickly processing a command within the given/limited time of the host 1100. In this case, a response (ACK) to a requested command may be performed before the given/limited time elapses.

In a case where the storage device 1200 is configured with flash memory chips, although data stored in the specific region of the memory 1240 are invalidated according to a request (e.g., the Invalidity Command), data stored in the specific region of the memory 1240 are substantially maintained as-is due to the characteristic of the memory 1240 that does not support overwriting. This is because the physical region of the memory 1240 is not substantially managed, but only mapping information is managed through the FTL. The storage device 1200 may be used in devices (e.g., printers) requiring security. In this case, the data requiring security are processed, and the data may be maintained in the storage device 1200 "as is". This means that secure data may be unnecessarily exposed. In a case of deletion of security data, the host 1100 in the user device 1000 provides a Secure Invalidity Command or an Invalidity Command including information that indicates the deletion of secure data, to the storage device 1200. This will be described below in detail with reference to FIG. 47.

Figure 47:
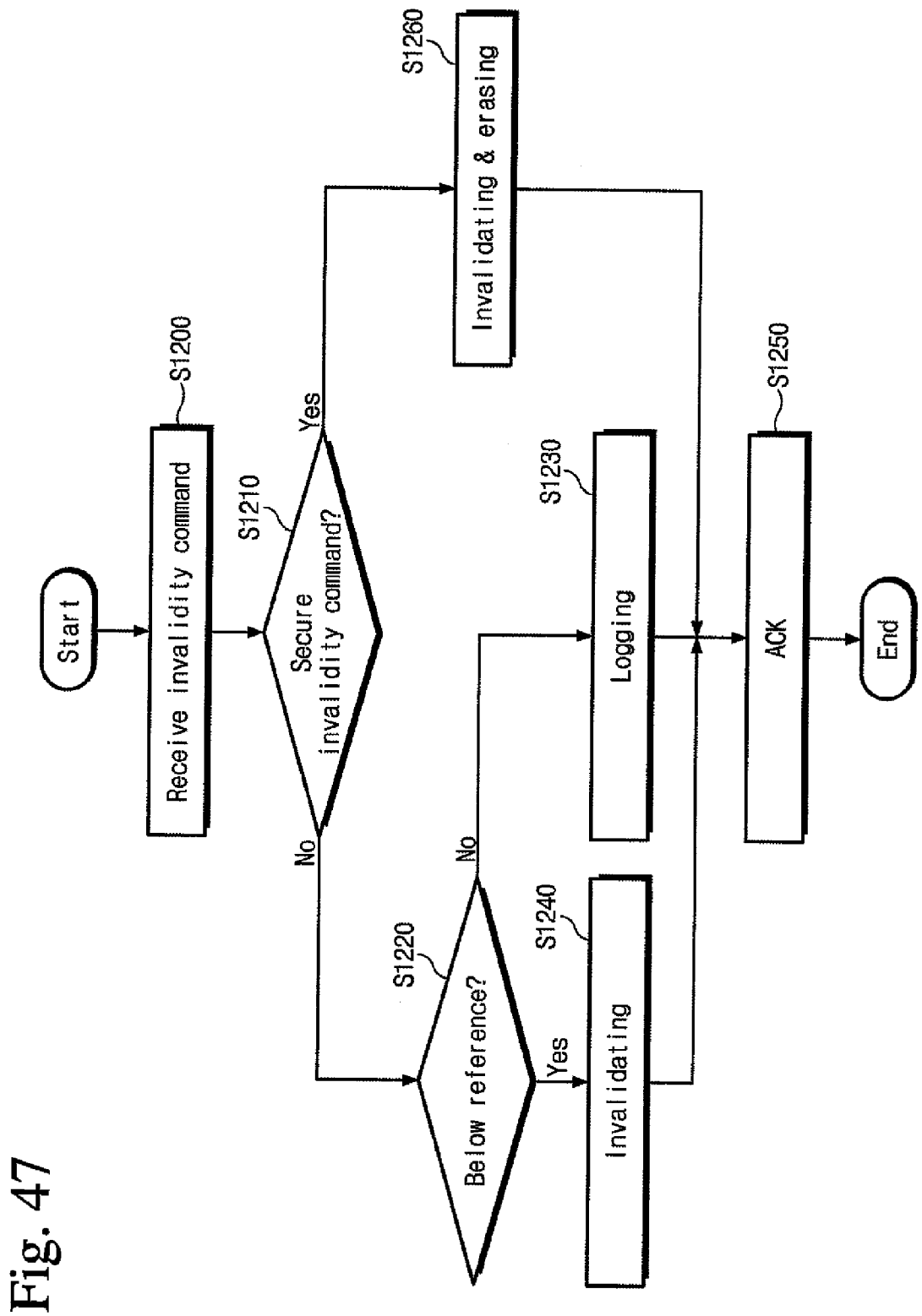
FIG. 47 is a flowchart for describing another operation of a computing system according to one or more embodiments of the inventive concepts.

FIG. 47 is a flowchart for describing the operation of a computing system according to one or more other embodiments of the inventive concepts.

At operation S 1200, the storage device 1200 receives an Invalidity Command from the host 1100. In this embodiment, the Invalidity Command selectively includes an indicator of some kind that the data to be deleted is "secure data." For example, two separate commands may be utilized, i.e., a Secure Invalidity Command and a normal Invalidity Command. Alternatively, a single Invalidity Command may be utilized which includes one or more bit fields indicating whether the data to be deleted is secure data.

At operation 1210, the SSD controller 1220 determines with the Invalidity Command is associated with secure data.

When the Invalidity Command the Invalidity Command is not associated with secure data (i.e., the data to be deleted is non-secure data), the process proceeds to operations S1220, S1230, S1240 and S1250 of FIG. 47. These operations are the same as operations S1110, S1120, S1140 and S1130 of FIG. 46, and accordingly, a detailed description thereof is omitted here to avoid redundancy.

When the Invalidity Command the Invalidity Command is associated with secure data (i.e., the data to be deleted is secure data), the process proceeds to operation 1260. In the case, the SSD controller 1220 immediately processes executes the invalidation operation with respect to the secure data, and further, actually erases memory block(s) of the memory 1240 corresponding to the region to be deleted. In this manner, the secure data stored in the memory 1240 is erased. Subsequently, the SSD controller 1220 notifies the host 1100 of that the execution of the Invalidity Command has been completed (ACK) in operation S1250. Subsequently, a series of operations are ended.

It is noted that the reference capacity may be zero (0) in the embodiments of FIGS. 46 and 47, in which case the storage device 1200 logs the location of the region to be deleted irrespective of the capacity of the region to be deleted. In this case, the comparison operations S1110 and S1220 may optionally be omitted. In other words, the storage device 1200 may record the location of the region to be deleted in the buffer memory every time the Invalidity Command is inputted. Execution of the invalidity process associated with logged region(s) may then occur during an idle state or upon power-up.

In another exemplary embodiment, the above-described invalidity process may be optionally accompanied by an operation in which information representing an invalid block is recorded in the memory block(s) of the memory 1240 corresponding to the region to be deleted. Alternatively, the above-described invalidity process may be accompanied by an operation in which information representing an invalid block is recorded in the memory block(s) of the memory 1240 corresponding to the region to be deleted.

According to these one or more embodiments of the inventive concepts, the storage device and the user device can improve a response speed to a host command and prevent secure data from being exposed.

Figure 48:
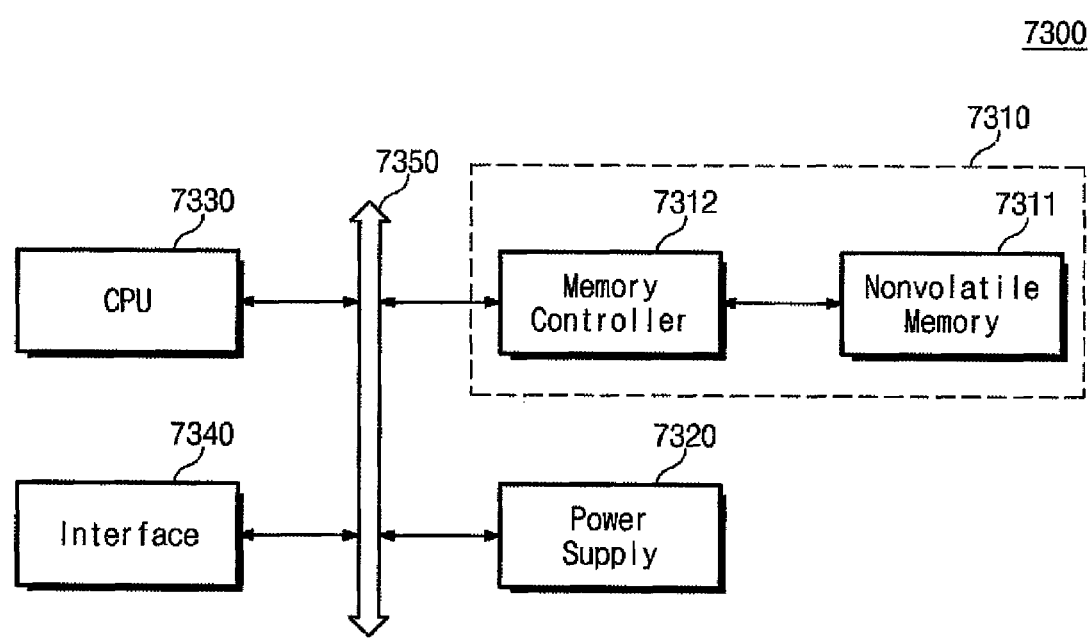
FIG. 48 illustrates a schematic block diagram of a memory system including a semiconductor memory device according to one or more embodiments of the inventive concepts.

FIG. 48 illustrates a block diagram of a user device 7300 including a semiconductor memory device which may be configured to adopt any one or more embodiments of the inventive concepts as described herein. Referring to FIG. 48, the memory system 300 includes a semiconductor memory device 7310 formed of a nonvolatile memory device 7311 and a memory controller 7312, a CPU 7330 electrically connected to a system bus 7350, an interface 7340 such as a user interface, and a power supplier 7320.

Data provided via the interface 7340 and/or processed by the CPU 7330 may be stored in the non-volatile memory device 7311 via the memory controller 7312. The semiconductor memory device 7310 may be part of a solid state disk/drive (SSD) that supports recovery of deleted data. Solid state drive (SSD) products are becoming popular in the next generation memory market. The SSD products are expected to replace the hard disk drive (HDD). The SSD is high-speed and is resistant against external impact, compared to the HDD which operates mechanically. The SSD also consumes little power.

The memory system may further include, e.g., an application chipset, camera image sensor (CIS) and/or processor, mobile DRAM, etc. (not shown).

The flash memory and/or the controller according to embodiments may be mounted using various forms of packages. The flash memory and/or the controller may be mounted using packages such as PoP (Package on Package), Ball Grid Arrays (BGAs), Chip Scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), etc.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the inventive concepts as set forth in the following claims.

What is claimed is:

1. A storage device, comprising:
a host interface configured to receive storage data and an invalidation command, wherein the invalidation command is indicative of invalid data among the storage data received by the host interface;
a buffer memory configured to temporarily store the storage data received by the host interface;
a storage medium;
a controller configured to execute a transcribe operation in which the storage data temporarily stored in the buffer memory is selectively stored in the storage medium;
wherein the controller is responsive to receipt of the invalidation command to execute a logging process when a memory capacity of the invalid data indicated by the invalidation command is equal to or greater than a reference capacity, and to execute an invalidation process when the memory capacity of the invalid data is less than the reference capacity,
wherein the logging process comprises logging a location of the invalid data, and wherein the invalidation process comprises invalidating the invalid data.

2. A storage device of claim 1, wherein the controller is further configured to invalidate the invalid data, after execution of the logging process, with reference to the logged location of the invalid data.

3. The storage device of claim 2, wherein invalidation of the invalid data with reference to the logged location of the invalid data occurs during an idle state of the storage device.

4. The storage device of claim 1, wherein the controller is further responsive to the invalidation command to transmit an acknowledgment via the host interface.

5. The storage device of claim 1, wherein the controller logs the location of the invalid data using a bitmap index identifying logical units of memory.

6. The storage device of claim 5, wherein the logical units of memory are memory sectors.

7. The storage device of claim 1, wherein the controller logs the location of the invalid data by storing a logical address of the invalid data.

8. The storage device of claim 2, wherein the controller manages a mapping table containing write state information, and wherein invalidating the invalid data comprises updating the write state information contained in the mapping table according to the invalidation command received by the host interface.

9. The storage device of claim 8, wherein the controller is configured to execute the transcribe operation with reference to the updated write state information contained in the mapping table such that storage data indicated as valid by the updated write state information is transcribed from the buffer memory to a memory location in the storage medium specified by the mapping table, and storage data indicated as invalid by the updated write state information is not transcribed from the buffer memory to the storage medium.

10. The storage device of claim 1, wherein the host interfaces further receives a secure invalidation command, and wherein the controller is responsive to the secure invalidation command to execute the invalidation process independently of a memory capacity of invalid data indicated by the secure invalidation command.

11. The storage device of claim 1, wherein the reference capacity is variably set in firmware or in response to a host command received via the host interface.

12. The storage device of claim 1, wherein the storage medium is non-volatile memory.

13. The storage device of claim 12, wherein the storage device is a Solid State Drive (SSD).

14. The storage device of claim 1, wherein the host interface includes at least one of a Parallel AT Attachment (PATA) interface, a Serial AT Attachment (SATA) interface, and a Universal Serial Bus (USB) interface.

15. A memory system, comprising:

a host device comprising a processor and a main memory, wherein the host device is configured to transmit storage data and to transmit an Invalidity Command, wherein the invalidation command is indicative of invalid data among transmitted storage data;

a storage device operatively connected to the host device, wherein the storage device comprises a buffer memory configured to temporarily store the storage data transmitted by the host, a storage medium, and a controller configured to execute a transcribe operation in which the storage data temporarily stored in the buffer memory is selectively stored in the storage medium;

wherein the controller is responsive to the invalidation command to execute a logging process when a memory capacity of the invalid data indicated by the invalidation command is equal to or greater than a reference capacity, and to execute an invalidation process when the memory capacity of the invalid data is less than the reference capacity, wherein the logging process comprises logging a location of the invalid data, and wherein the invalidation process comprises invalidating the invalid data.

16. The memory system of claim 15, wherein the controller is further configured to invalidate the invalid data, after execution of the logging process, with reference to the logged location of the invalid data.

17. The memory system of claim 16, wherein invalidation of the invalid data with reference to the logged location of the invalid data occurs during an idle state of the storage device.

18. The memory system of claim 15, wherein the controller is further responsive to the invalidation command to transmit an acknowledgment via the host interface.

19. The memory system of claim 15, wherein storage device is operatively coupled to the host device via at least one of a Parallel AT Attachment (PATA) interface, a Serial AT Attachment (SATA) interface and a Universal Serial Bus (USB) interface, and wherein the storage device is a Solid State Drive (SSD).

20. A method of controlling a storage device, the storage device including a host interface, a buffer memory, a storage medium, and a controller, said method comprising:

receiving storage data and an invalidation command via the host interface, wherein the invalidation command is indicative of invalid data among storage data received by the host interface;

temporarily storing the storage data in the buffer memory;

executing a transcribe operation in which the storage data temporarily stored in the buffer memory is selectively stored in the storage medium;

executing a logging process in response to the invalidation command when a memory capacity of the invalid data indicated by the invalidation command is equal to or greater than a reference capacity; and executing an invalidation process in response to the invalidation command when the memory capacity of the invalid data is less than the reference capacity, wherein the logging process comprises logging a location of the invalid data, and wherein the invalidation process comprises invalidating the invalid data.

* * * * *